United States Patent
Park et al.

(10) Patent No.: US 12,177,837 B2
(45) Date of Patent: Dec. 24, 2024

(54) METHOD AND APPARATUS FOR TRANSMITTING/RECEIVING SIGNALS FOR GROUPCAST IN WIRELESS COMMUNICATION SYSTEM

(71) Applicant: SAMSUNG ELECTRONICS CO., LTD., Suwon-si (KR)

(72) Inventors: Sungjin Park, Suwon-si (KR); Youngbum Kim, Suwon-si (KR); Hyunseok Ryu, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 17/662,801

(22) Filed: May 10, 2022

(65) Prior Publication Data

US 2022/0377771 A1    Nov. 24, 2022

(30) Foreign Application Priority Data

May 10, 2021    (KR) .......................... 10-2021-0060081

(51) Int. Cl.
*H04W 72/1273*    (2023.01)
*H04L 1/00*    (2006.01)
(Continued)

(52) U.S. Cl.
CPC ....... *H04W 72/1273* (2013.01); *H04L 1/0025* (2013.01); *H04L 1/1812* (2013.01);
(Continued)

(58) Field of Classification Search
CPC ............... H04W 72/1273; H04W 4/06; H04W 72/0446; H04W 72/20; H04W 72/121;
(Continued)

(56) References Cited

U.S. PATENT DOCUMENTS

| | | | |
|---|---|---|---|
| 2010/0278093 A1 | 11/2010 | Wang et al. | |
| 2015/0365925 A1* | 12/2015 | Fu .......................... | H04W 72/21 370/329 |

(Continued)

OTHER PUBLICATIONS

3GPP TS 38.214 V16.5.0 (Mar. 2021) Technical Specification; 3rd Generation Partnership Project; Technical Specification Group Radio Access Network; NR; Physical layer procedures for data (Release 16); 171 pages.

(Continued)

*Primary Examiner* — Afshawn M Towfighi

(57) ABSTRACT

Disclosed are a communication scheme and a system thereof for converging IoT technology and a 5G communication system for supporting a higher data transmission rate beyond that of a 4G system. The disclosure can be applied to intelligent services (for example, services related to smart homes, smart buildings, smart cities, smart cars, connected cars, health care, digital education, retail business, security, and safety) based on the 5G communication technology and the IoT-related technology. Further, disclosed is a 5G or 6G communication system for supporting a higher data transmission rate than a post-4G communication system such as LTE.

20 Claims, 14 Drawing Sheets

(51) Int. Cl.
*H04L 1/1812* (2023.01)
*H04L 5/00* (2006.01)
*H04W 4/06* (2009.01)
*H04W 72/0446* (2023.01)
*H04W 72/20* (2023.01)

(52) U.S. Cl.
CPC ............ *H04L 5/0053* (2013.01); *H04W 4/06* (2013.01); *H04W 72/0446* (2013.01); *H04W 72/20* (2023.01)

(58) Field of Classification Search
CPC ... H04L 1/0025; H04L 1/1812; H04L 5/0053; H04L 1/1671; H04L 1/1861; H04L 1/1864; H04L 1/1835; H04L 1/1845; H04L 1/1822; H04L 5/0055; Y02D 30/70
See application file for complete search history.

(56) References Cited

U.S. PATENT DOCUMENTS

| | | | |
|---|---|---|---|
| 2018/0027582 A1* | 1/2018 | Yerramalli | H04W 52/0216 370/336 |
| 2020/0008097 A1 | 1/2020 | Fujishiro et al. | |
| 2020/0204329 A1* | 6/2020 | Fujishiro | H04L 1/1861 |
| 2020/0351032 A1* | 11/2020 | Wu | H04W 72/56 |
| 2024/0195537 A1* | 6/2024 | Zhu | H04L 1/18 |

OTHER PUBLICATIONS

3GPP TS 38.213 V16.5.0 (Mar. 2021) Technical Specification; 3rd Generation Partnership Project; Technical Specification Group Radio Access Network; NR; Physical layer procedures for control (Release 16); 183 pages.
International Search Report and Written Opinion of the International Searching Authority dated Aug. 11, 2022, in connection with International Application No. PCT/KR2022/006623, 6 pages.
Nokia et al., "Reliability Improvements for RRC_CONNECTED UEs", R1-2102656, 3GPP TSG RAN WG1 Meeting #104bis-e, Apr. 6, 2021, 30 pages.
Zte, "Discussion on mechanisms to Improve Reliability for RRC_CONNECTED UEs", R1-2102502, 3GPP TSG RAN WG1 Meeting #104b-e, Apr. 7, 2021, 11 pages.
Intel Corporation, "Mechanisms to Improve Reliability of NR MBS for RRC_CONNECTED UEs", R1-2103051, 3GPP TSG RAN WG1 Meeting #104bis-e, Apr. 7, 2021, 7 pages.
Supplementary European Search Report dated Sep. 12, 2024, in connection with European Patent Application No. 22807769.9, 8 pages.

* cited by examiner

METHOD AND APPARATUS FOR TRANSMITTING/RECEIVING SIGNALS FOR GROUPCAST IN WIRELESS COMMUNICATION SYSTEM

CROSS-REFERENCE TO RELATED APPLICATION

This application is based on and claims priority under 35 U.S.C. § 119 to Korean Patent Application No. 10-2021-0060081, filed on May 10, 2021, in the Korean Intellectual Property Office, the disclosure of which is herein incorporated by reference in its entirety.

BACKGROUND

1. Field

The disclosure relates to a wireless communication system and, more particularly, to a method and an apparatus for transmitting/receiving signals for groupcast and/or multicast.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

A review of the development of wireless communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as "beyond-5G" systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

SUMMARY

In a wireless communication system, a base station (BS) may provide a groupcast service and/or a multicast service by transmitting the same data to a plurality of user equipments (UEs). At this time, provision of the groupcast service and/or the multicast service to each UE through separate data transmission/reception may cause efficiency of frequency resources and time resources. Accordingly, there is a need to provide a method and an apparatus for efficiently performing data transmission/reception in order to provide the groupcast service and/or the multicast service.

In accordance with an aspect of the disclosure, a terminal in a communication system is provided. The terminal includes a transceiver; and a controller configured to: receive a physical downlink shared channel (PDSCH) from a base station, identify hybrid automatic repeat request-acknowledgement (HARQ-ACK) information for the PDSCH; identify a HARQ-ACK reporting mode between a first HARQ-ACK reporting mode and a second HARQ-ACK reporting mode, based on whether the HARQ-ACK information is multiplexed with a first physical uplink control channel (PUCCH) or a physical uplink shared channel (PUSCH); and transmit the HARQ-ACK information according to the first HARQ-ACK reporting mode in the first PUCCH or the PUSCH, in case that the HARQ-ACK information is multiplexed with the first PUCCH or the PUSCH.

In accordance with another aspect of the disclosure, a method performed by a terminal in a communication system is provided. The method includes receiving a physical downlink shared channel (PDSCH) from a base station, identifying hybrid automatic repeat request-acknowledgement (HARQ-ACK) information for the PDSCH; identifying a HARQ-ACK reporting mode between a first HARQ-ACK reporting mode and a second HARQ-ACK reporting mode, based on whether the HARQ-ACK information is multiplexed with a first physical uplink control channel (PUCCH) or a physical uplink shared channel (PUSCH); and transmitting the HARQ-ACK information according to the first HARQ-ACK reporting mode in the first PUCCH or the PUSCH, in case that the HARQ-ACK information is multiplexed with the first PUCCH or the PUSCH.

In accordance with another aspect of the disclosure, a base station in a communication system in provided. The base station includes a transceiver; and a controller configured to: transmit a physical downlink shared channel (PDSCH) to a terminal, and receive hybrid automatic repeat request-acknowledgement (HARQ-ACK) information for the PDSCH according to a first HARQ-ACK reporting mode or a second HARQ-ACK reporting mode, wherein the HARQ-ACK information is received according to the first HARQ-ACK reporting mode in a first physical uplink control channel (PUCCH) or a physical uplink shared channel), in case that the HARQ-ACK information is multiplexed with the first PUCCH or the PUSCH.

In accordance with another aspect of the disclosure, a method performed by a base station in a communication system is provided. The method includes transmitting a physical downlink shared channel (PDSCH) to a terminal; and receiving hybrid automatic repeat request-acknowledgement (HARQ-ACK) information for the PDSCH according to a first HARQ-ACK reporting mode or a second HARQ-ACK reporting mode, wherein the HARQ-ACK information is received according to the first HARQ-ACK reporting mode in a first physical uplink control channel (PUCCH) or a physical uplink shared channel), in case that the HARQ-ACK information is multiplexed with the first PUCCH or the PUSCH.

An aspect of the disclosure has an effect of providing a method and an apparatus for transmitting and receiving signals for groupcast and/or multicast in a wireless communication system.

Another aspect of the disclosure has an effect of providing a method and an apparatus for transmitting/receiving HARQ feedback information for data for groupcast and/or multicast in a wireless communication system.

Another aspect of the disclosure has an effect of providing a method and an apparatus for transmitting/receiving signals in consideration of the relation between data for groupcast and/or multicast and data for unicast and/or broadcast in a wireless communication system.

Another aspect of the disclosure has an effect of providing a method and an apparatus for processing data of an RRC_connected UE and transmitting/receiving HARQ feedback information when data for groupcast and/or multicast and data for unicast and/or broadcast are received together in a wireless communication system.

Another aspect of the disclosure has an effect of providing a method and an apparatus for receiving data for groupcast and/or multicast according to a capability of the RRC_connected UE by the RRC_connected UE receiving the data for groupcast and/or multicast in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
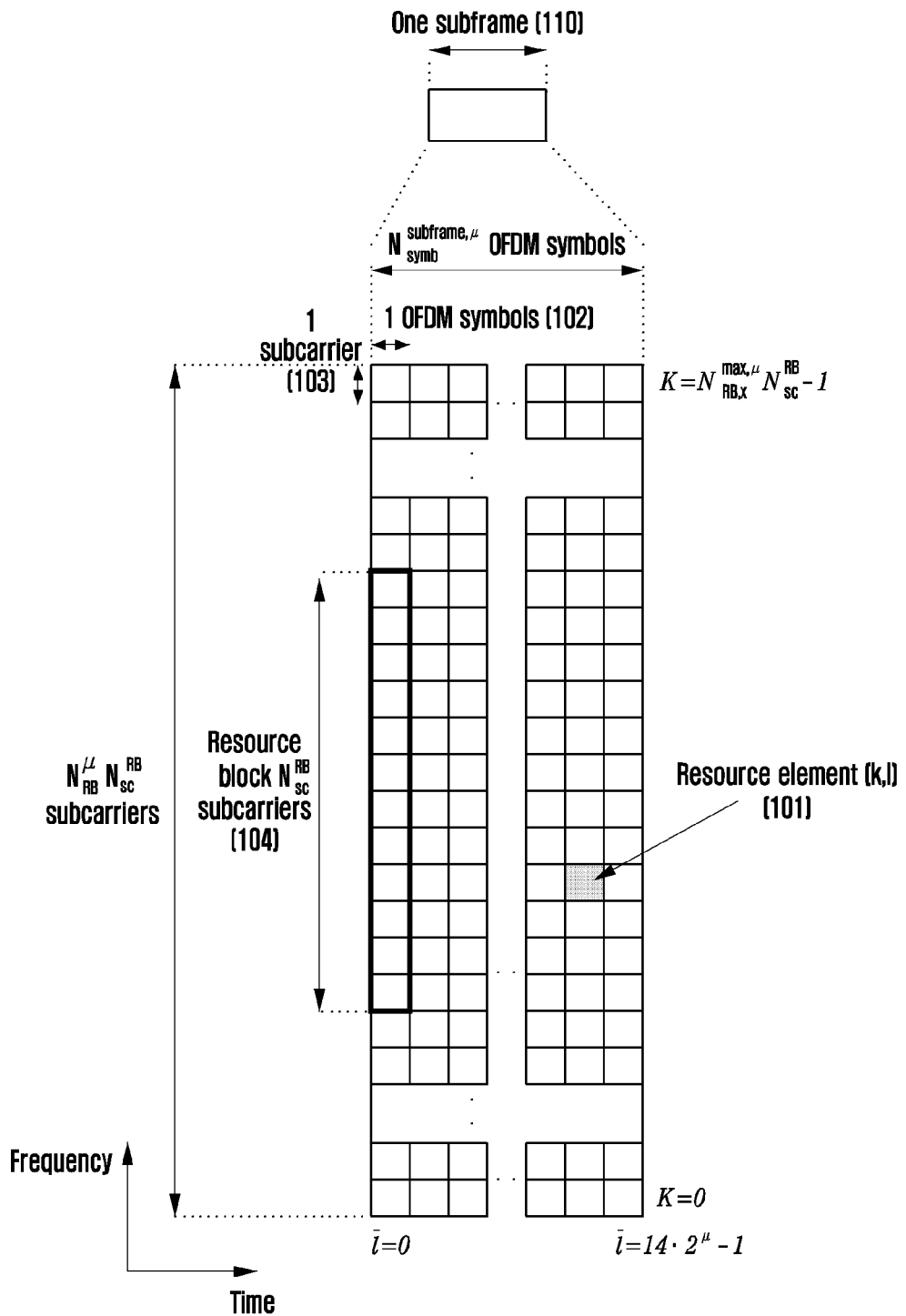
FIG. 1 illustrates the basic structure of time-frequency domains in a wireless communication system according to an embodiment of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

New radio access technology (NR) that is new 5G communication is designed to freely multiplex various services in time and frequency resources, and accordingly waveform/numerology and reference signals may be dynamically or freely allocated according to a need of the corresponding service. In order to provide an optimal service to a user equipment (UE) in wireless communication, optimized data transmission through measurement of a channel quality and an amount of interference is important, and thus it is necessary to accurately measure a channel state. However, unlike 4G communication in which channel and interference characteristics are not largely changed according to frequency resources, channel and interference characteristics are largely changed according to a service in the case of a 5G channel, so that a subset of frequency resource groups (FRGs) for performing measurement according to divided services should be supported. Meanwhile, in the NR system, supported service types may be divided into categories such as enhanced mobile broadband (eMBB), massive machine type communications (mMTC), ultra-reliable and low-latency communications (URLLC), and the like. The eMBB may be a service aiming at high-speed transmission of high-capacity data, the mMTC may be a service aiming at minimization of UE power and access of a plurality of UEs, and the URLLC may be a service aiming at high reliability and low latency. Different requirements may be applied according to the type of service applied to the UE.

As described above, a plurality of services may be provided to a user in a communication system, and in order to provide the plurality of services to the user, a method of providing each service in the same time interval according to a characteristic thereof and an apparatus using the same are needed.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services. As 5th generation wireless communication systems, 5G or new radio (NR) communication standards are also under discussion.

As a typical example of the broadband wireless communication system, an NR system employs an orthogonal frequency division multiplexing (OFDM) scheme in a downlink (DL) and an uplink (UL). However, more specifically, the NR system employs a cyclic-prefix OFDM (CP-OFDM) scheme in a downlink (DL) and employs two schemes, that is, CP-OFDM and discrete Fourier transform spreading OFDM (DFT-S-OFDM) schemes in an uplink (UL). The uplink indicates a radio link through which a user equipment (UE) {or a mobile station (MS)} transmits data or control signals to a base station (BS) (gNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

If decoding fails at the initial transmission, the NR system employs a hybrid automatic repeat request (HARQ) scheme of retransmitting the corresponding data in a physical layer. In the HARQ scheme, when a receiver does not accurately decode data, the receiver transmits information (negative acknowledge: NACK) informing the transmitter of decoding failure and thus the transmitter may re-transmit the corresponding data on the physical layer. The receiver may combine data retransmitted from the transmitter and previous data, the decoding of which failed, whereby data reception performance may increase. When the receiver accurately decodes data, the receiver transmits information (acknowledgement: ACK) indicating decoding success to the transmitter and thus the transmitter may transmit new data.

[NR Time-Frequency Resources]

Hereinafter, a frame structure of the 5G system is described in more detail with reference to the drawings.

FIG. 1 illustrates the basic structure of time-frequency domains that are radio resource areas in which data or control channels are transmitted in a 5G system.

In FIG. 1, the horizontal axis indicates the time domain and the vertical axis indicates the frequency domain. A basic unit of resources in the time and frequency domains is a resource element (RE) 101 and may be defined as one orthogonal frequency division multiplexing (OFDM) symbol 102 in the time axis and one subcarrier 103 in the frequency axis. In the frequency domain, $N_{sc}^{RB}$ (for example, 12) consecutive REs may constitute one resource block (RB) 104.

Figure 2:
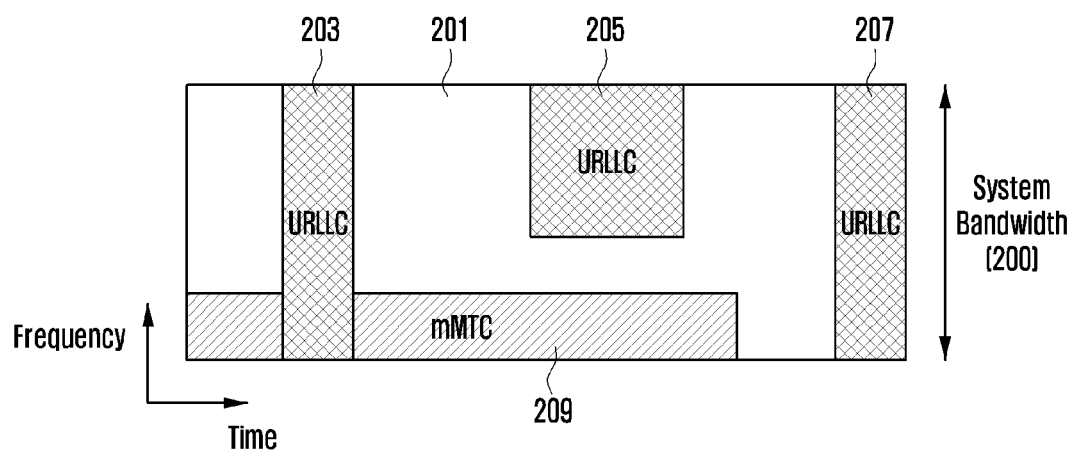
FIG. 2 illustrates the structure of a frame, a subframe, and a slot in a wireless communication system according to an embodiment of the present disclosure.

FIG. 2 illustrates the frame, subframe, and slot structure in a wireless communication system according to an embodiment of the present disclosure.

In FIG. 2, an example of the structure of a frame 200, a subframe 201, and a slot 202 is illustrated. One frame 200 may be defined as 10 ms. One subframe 201 may be defined as 1 ms, and accordingly one frame 200 may include a total of 10 subframes 201. One slot 202 or 203 may be defined as 14 OFDM symbols (that is, the number symbols $N_{symb}^{slot}$) per slot=14). One subframe 201 may include one or a plurality of slots 202 or 203, and the number of slots 202 or 203 per subframe 201 may vary depending on a set value p 204 or 205 for subcarrier spacing. In the example of FIG. 2, the case in which the subcarrier spacing set values µ=0 204 and µ=1 205 is illustrated. In the case of µ=0 204, one subframe 201 may consist of one slot 202. In the case of µ=1 205, one subframe 201 may consist of two slots 203. That is, the number of slots ($N_{slot}^{subframe,\mu}$) per subframe may be different according to the set value µ for subcarrier spacing, and accordingly, the number of slots ($N_{slot}^{frame,\mu}$) per frame may be different. $N_{slot}^{subframe,\mu}$ and $N_{slot}^{frame,\mu}$ according to each subcarrier spacing configuration µ may be defined as shown in [Table 1] below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| µ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

[PDCCH: DCI-Related]

Subsequently, downlink control information (DCI) in the 5G system will be described in detail.

In the 5G system, scheduling information for uplink data (or a physical uplink data channel (physical uplink shared channel (PUSCH)) or downlink data (or physical downlink data channel (physical downlink shared channel (PDSCH)) is transmitted from the BS to the UE through DCI. The UE may monitor a fallback DCI format and a non-fallback DCI format for the PUSCH or the PDSCH. The fallback DCI format may include a predefined fixed field between the BS and the UE, and the non-fallback DCI format may include a configurable field.

The DCI may be transmitted through a physical downlink control channel (PDCCH) after passing through a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled with an SFI-RNTI. DCI for notifying of transmit power control (TPC) may be scrambled with a TPC-RNTI. DCI for scheduling a UE-specific PDSCH or PUSCH may be scrambled with a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information.

TABLE 2

- Identifier for DCI formats - [1] bit
- Frequency domain resource assignment -[⌈log $_2(N_{RB}^{UL,BWP}(N_{RB}^{UL,BWP}$ +1) / 2) ⌉] bits
- Time domain resource assignment - X bits
- Frequency hopping flag - 1 bit
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- Uplink (UL)/supplementary UL (SUL) indicator - 0 or 1 bit DCI format 0_1 may be used for non-fallback DCI for scheduling a PUSCH in which case the CRC may be scrambled with a C-RNTI. DCI format 0_1 in which the CRC is scrambled by the C-RNTI may include, for example, the following information.

TABLE 3

-- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
  • For resource allocation type 0, $\lceil N_{RB}^{UL,BWP} / P \rceil$ bits
  • For resource allocation type 1, $\lceil \log_2(N_{RB}^{UL,BWP}(N_{RB}^{UL,BWP} +1)/2) \rceil$ bits
- Time domain resource assignment -1, 2, 3, or 4 bits
- Virtual resource block (VRB)-to-physical resource block (PRB) mapping - 0 or 1 bit, only for resource allocation type 1.
  • 0 bit if only resource allocation type 0 is configured;
  • 1 bit otherwise.
- Frequency hopping flag – 0 or 1 bit, only for resource allocation type 1.
  • 0 bit if only resource allocation type 0 is configured;
  • 1 bit otherwise.
- Modulation and coding scheme – 5 bits
- New data indicator – 1 bit
- Redundancy version – 2 bits
- HARQ process number – 4 bits
- 1st downlink assignment index - 1 or 2 bits
  • 1 bit for semi-static HARQ-ACK codebook;
  • 2 bits for dynamic HARQ-ACK codebook with single HARQ-ACK codebook.

TABLE 3-continued

- 2nd downlink assignment index - 0 or 2 bits
  • 2 bits for dynamic HARQ-ACK codebook with two HARQ-ACK sub-codebooks;
  • 0 bit otherwise.
-TPC command for scheduled PUSCH – 2 bits

- SRS resource indicator $-\left\lceil \log_2\left(\sum_{k=1}^{L_{max}} \binom{N_{SRS}}{k}\right) \right\rceil$ or $\lceil \log_2(N_{SRS}) \rceil$ bits

• $\left\lceil \log_2\left(\sum_{k=1}^{L_{max}} \binom{N_{SRS}}{k}\right) \right\rceil$ bits for non-codebook based PUSCH transmission;

• $\lceil \log_2(N_{SRS}) \rceil$ bits for codebook based PUSCH transmission.
- Precoding information and number of layers –up to 6 bits
- Antenna ports - up to 5 bits
- SRS request - 2 bits
- Channel state information (CSI) request - 0, 1, 2, 3, 4, 5, or 6 bits
- Code block group (CBG) transmission information - 0, 2, 4, 6, or 8 bits
- Phase tracking reference signal (PTRS)-demodulation reference signal (DMRS) association - 0 or 2 bits.
- beta_offset indicator - 0 or 2 bits
- DMRS sequence initialization - 0 or 1 bitor 1 bit DCI format 1_0 may be used for fallback DCI for scheduling a PDSCH in which case the CRC may be scrambled with a C-RNTI. DCI format 1_0 in which the CRC is scrambled by the C-RNTI may include, for example, the following information.

TABLE 4

- Identifier for DCI formats - [1] bit
- Frequency domain resource assignment -$\lceil \log_2(N_{RB}^{DL,BWP}(N_{RB}^{DL,BWP} +1) / 2) \rceil$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits DCI format 1_1 may be used for non-fallback DCI for scheduling a PUSCH in which case the CRC may be scrambled with a C-RNTI. DCI format 1_1 in which the CRC is scrambled by the C-RNTI may include, for example, the following information.

TABLE 5

- Carrier indicator - 0 or 3 bits
- Identifier for DCI formats - [1] bits
- Bandwidth part indicator - 0, 1 or 2 bits
- Frequency domain resource assignment
  • For resource allocation type 0, $\lceil N_{RB}^{DL,BWP} / P \rceil$ bits
  • For resource allocation type 1, $\lceil \log_2(N_{RB}^{DL,BWP}(N_{RB}^{DL,BWP} +1) / 2) \rceil$ bits
- Time domain resource assignment –1, 2, 3, or 4 bits
- VRB-to-PRB mapping - 0 or 1 bit, only for resource allocation type 1.
  • 0 bit if only resource allocation type 0 is configured;
  • 1 bit otherwise.
- Physical resource block (PRB) bundling size indicator - 0 or 1 bit
- Rate matching indicator - 0, 1, or 2 bits
- Zero power (ZP) channel state information (CSI)-reference signal (RS) trigger - 0, 1, or 2 bits
For transport block 1:
- Modulation and coding scheme - 5 bits
- New data indicator - 1 bit
- Redundancy version - 2 bits TABLE 5-continued For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- Code block group (CBG) flushing out information - 0 or 1 bit
- DMRS sequence initialization - 1 bit

[General: eMBB, mMTC, and URLLC Services]

FIG. 2 illustrates an example of allocating data for eMBB, URLLC, and mMTC which are services considered in the 5G or NR system in frequency-time resources.

Referring to FIG. 2, a scheme in which frequency and time resources are allocated for information transmission in each system may be identified.

FIG. 2 illustrates an example of allocation of eMBB, URLLC, and mMTC data in an entire system frequency band. First, in FIG. 2, data for eMBB, URLLC, and mMTC is allocated in an entire system frequency band 200. When URLLC data 203, 205, and 207 are generated and are required to be transmitted while eMBB 201 and mMTC 209 are allocated to specific frequency bands and transmitted, a part to which the eMBB 201 and the mMTC 209 have been already allocated may be emptied or, without transmission thereof, the URLLC data 203, 205, and 207 may be transmitted. Among the services, the URLLC needs to reduce a delay time, so that the URLLC data may be allocated to and transmitted as indicated by reference numeral 203, 205, and 207 in a portion of the resources 201 to which the eMBB has been allocated. Of course, when the URLLC is additionally allocated and transmitted in resources to which the eMBB is allocated, eMBB data may not be transmitted in duplicate frequency-time resources, and accordingly, the performance of eMBB data transmission may be reduced. That is, in the above case, eMBB data transmission may fail due to URLLC allocation.

Terms "physical channel" and "signal" in the NR system may be used to describe the method and the apparatus provided by embodiments. However, the disclosure may be applied to a wireless communication system rather than the NR system.

Hereinafter, embodiments of the disclosure are described in detail along with the accompanying drawings. In a description of the disclosure, when it is determined that a detailed description of a relevant function or configuration makes the subject of the disclosure unclear, the detailed description is omitted. The terms which will be described below are terms defined in consideration of the functions in the present disclosure, and may be different according to users, intentions of the users, or customs. Therefore, the definitions of the terms should be made based on the contents throughout the specification.

In the disclosure, "downlink (DL)" refers to a wireless transmission path of a signal that the BS transmits to the UE, and "uplink (UL)" refers to a wireless transmission path of a signal that the UE transmits to the BS.

Hereinafter, embodiments of the disclosure are described with an NR system as an example, but the embodiments of the disclosure can be applied to other communication systems having a similar technical background or channel form. Further, the embodiments of the disclosure can be applied to other communication systems through some modifications without departing from the scope of the disclosure on the basis of determination of those skilled in the art.

In the disclosure, the conventional terms "physical channel" and "signal" may be interchangeably used with "data" or "control signal." For example, a PDSCH is a physical channel for transmitting data, but may be data in the disclosure.

Hereinafter, in the disclosure, higher signaling is a method of transmitting a signal from the BS to the UE through a downlink data channel of a physical layer or a signal from the UE to the BS through an uplink data channel of a physical layer, and may be referred to as RRC signaling or a MAC control element (CE).

[PDSCH: Processing Time]

Subsequently, a PDSCH processing time (PDSCH processing procedure time) is described. When the BS schedules to transmit a PDSCH to the UE through DCI format 1_0, 1_1, or 1_2, the UE may need a PDSCH processing time for receiving the PDSCH by applying a transmission method indicated through DCI (modulation/demodulation and coding indication index (MCS), demodulation reference signal-related information, and time and frequency resource allocation information). In NR, a PDSCH processing time is defined in consideration thereof. The PDSCH processing time of the UE may follow [Equation 1] below.

$$T_{proc,1}=(N_1+d_{1,1}+d_2)(2048+144)\kappa 2^{-\mu}T_c+T_{ext} \quad \text{[Equation 1]}$$

In Tproc,1 of [Equation 1], respective variables may have the following meaning:

N1: the number of symbols determined according to UE processing capability 1 or 2 based on a UE capability and numerology μ. N1 may have a value in [Table 6] when UE processing capability 1 is reported according to a UE capability report and may have a value in [Table 7] when UE processing capability 2 is reported and information indicating that UE processing capability 2 can be used is configured through higher-layer signaling. The numerology μ may correspond to a minimum value among μPDCCH, μPDSCH, and μUL to maximize Tproc,1, and μPDCCH, μPDSCH, and μUL may be numerology of a PDCCH scheduling a PDSCH, numerology of a scheduled PDSCH, and numerology of an uplink channel to transmit HARQ-ACK, respectively.

TABLE 6

PDSCH processing time in PDSCH processing capability 1

PDSCH decoding time $N_1$ [symbols]

| μ | In the case in which dmrs-AdditionalPosition = pos0 within DMRS-DownlinkConfig in which both PDSCH mapping types A and B are higher-layer signaling | Case in which AdditionalPosition ≠ pos0 within DMRS-DownlinkConfig that is higher-layer signaling or a higher-layer parameter is not configured in both PDSCH mapping types A and B |
|---|---|---|
| 0 | 8 | $N_{1,0}$ |
| 1 | 10 | 13 |
| 2 | 17 | 20 |
| 3 | 20 | 24 |

TABLE 7

PDSCH processing time in PDSCH processing capability 2

PDSCH decoding time $N_1$ [symbols]
In the case in which dmrs-AdditionalPosition = pos0 within DMRS-DownlinkConfig in which both PDSCH mapping types A and B are higher-layer signaling

| μ | |
|---|---|
| 0 | 3 |
| 1 | 4.5 |
| 2 | 9 for frequency range 1 |

Text: the UE may calculate Text and apply the same to a PDSCH processing time when the UE uses a shared spectrum channel access scheme. Otherwise, it is assumed that Text is 0.

When 11 indicating a location value of a PDSCH DMRS is 12, N1,0 in [Table 6] has a value of 14 and, otherwise, has a value of 13.

When the last symbol of the PDSCH is an ith symbol in a slot for transmitting the PDSCH and i<7 for PDSCH mapping type A, d1,1 is 7-i and, otherwise, d1,1 is 0.

d2: d2 of a PUCCH having a high priority index may be configured as a value reported from the UE when the PUCCH having the high priority index and a PUCCH or PUSCH having a low priority index overlap in the time. Otherwise, d2 is 0.

d1,1 may be determined according to the number L of symbols of the scheduled PDSCH and the number d of overlapping symbols between the PDCCH scheduling the PDSCH and the scheduled PDSCH as described below when PDSCH mapping type B is used for UE processing capability 1.

If L≥7, d1,1=0.

If L≥4 and L≤6, d1,1=7−L.

if L=3, d1,1=min (d, 1).

If L=2, d1,1=3+d.

d1,1 may be determined according to the number L of symbols of the scheduled PDSCH and the number d of overlapping symbols between the PDCCH scheduling the PDSCH and the scheduled PDSCH as described below when PDSCH mapping type B is used for UE processing capability 2.

If L≥7, d1,1=0.

If L≥4 and L≤6, d1,1=7−L.

In the case of L=2, if the PDCCH performing scheduling exists within a CORESET including 3 symbols and the corresponding CORESET and the scheduled PDSCH have the same start symbol, d1,1=3.

Otherwise, d1,1=d.

A UE supporting capability 2 within a given serving cell may apply a PDSCH processing time according to UE processing capability 2 when processingType2Enabled that is higher-layer signaling is configured as enable for the corresponding cell.

When a location of a first uplink transmission symbol of a PUCCH including HARQ-ACK information (the corresponding location may consider K1 defined as a transmission time point of HARQ-ACK, PUCCH resources used for HARQ-ACK transmission, and a timing advance effect) does not start earlier than a first uplink transmission symbol appearing after a time of Tproc,1 from a last symbol of a PDSCH, the UE may transmit a valid HARQ-ACK message. That is, the UE may transmit the PUCCH including HARQ-ACK only when the PDSCH processing time is sufficient. Otherwise, the UE cannot provide the BS with valid HARQ-ACK information corresponding to the scheduled PDSCH. Tproc,1 may be used for all of the normal or expanded CP. When the number of PDSCH transmission locations within one slot is 2, d1,1 is calculated on the basis of the first PDSCH transmission location within the corresponding slot.

[PDSCH: Reception Preparation Time in Cross-Carrier Scheduling]

Hereinafter, in the case of cross-carrier scheduling in which numerology μPDCCH for transmitting the PDCCH performing scheduling and numerology μPDSCH for transmitting the PDSCH scheduling the corresponding PDCCH are different from each other, a PDSCH reception preparation time Npdsch of the UE defined for a time interval between the PDCCH and the PDSCH is described.

When μPDCCH<μPDSCH, the scheduled PDSCH cannot be transmitted earlier than the first symbol of the slot existing after Npdsch symbols from the last symbol of the PDCCH scheduling the corresponding PDSCH. Transmission symbols of the corresponding PDSCH may include a DM-RS.

When μPDCCH>μPDSCH, the scheduled PDSCH may be transmitted after Npdsch symbols from the last symbol of the PDCCH scheduling the corresponding PDSCH. Transmission symbols of the corresponding PDSCH may include a DM-RS.

TABLE 8

$N_{pdsch}$ according to subcarrier spacing of scheduled PDCCH

| $μ_{PDCCH}$ | $N_{pdsch}$ [symbols] |
|---|---|
| 0 | 4 |
| 1 | 5 |
| 2 | 10 |
| 3 | 14 |

[PUSCH: Transmission Scheme-Related]

Subsequently, a scheduling scheme of PUSCH transmission is described. PUSCH transmission may be dynamically scheduled by a UL grant within DCI or may operate by configured grant Type 1 or Type 2. Dynamic scheduling of PUSCH transmission can be indicated by DCI format 0_0 or 0_1.

Configured grant Type 1 PUSCH transmission may be semi-statically configured through reception of configuredGrantConfig including rrc-ConfiguredUplinkGrant in [Table 9] through higher-layer signaling without reception of a UL grant within DCI. Configured grant Type 2 PUSCH transmission may be semi-persistently scheduled by a UL grant within DCI after reception of configuredGrantConfig which does not include rrc-ConfiguredUplinkGrant in [Table 9] through higher-layer signaling. When PUSCH transmission operates by a configured grant, parameters applied to PUSCH transmission are applied through configuredGrantConfig which is higher-layer signaling of [Table 9] except for dataScramblingIdentityPUSCH, txConfig, codebookSubset, maxRank, and scaling of UCI-OnPUSCH provided as pusch-Config of [Table 10] which is higher-layer signaling. When the UE receives transformPrecoder within configuredGrantConfig which is higher-layer signaling of [Table 9], the UE applies tp-pi2BPSK within pusch-Config of [Table 10] to PUSCH transmission operating by the configured grant.

TABLE 9

```
ConfiguredGrantConfig ::=                   SEQUENCE{
    frequencyHopping                            ENUMERATED {intraSlot, interSlot}
OPTIONAL, -- Need S,
    cg-DMRS-Configuration                   DMRS-UplinkConfig,
    mcs-Table                                   ENUMERATED {qam256, qam64LowSE}
OPTIONAL, -- Need S
    mcs-TableTransformPrecoder                  ENUMERATED {qam256, qam64LowSE}
OPTIONAL, -- Need S
    uci-OnPUSCH                             SetupRelease { CG-UCI-OnPUSCH }
OPTIONAL, -- Need M
    resourceAllocation                      ENUMERATED { resourceAllocationType0,
resourceAllocationType1, dynamicSwitch },
    rbg-Size                                ENUMERATED {config2}
OPTIONAL, -- Need S
    powerControlLoopToUse                   ENUMERATED {n0, n1},
    p0-PUSCH-Alpha                          P0-PUSCH-AlphaSetId,
    transformPrecoder                           ENUMERATED {enabled, disabled}
OPTIONAL, -- Need S
    nrofHARQ-Processes                      INTEGER(1..16),
    repK                                ENUMERATED {n1, n2, n4, n8},
    repK-RV                                     ENUMERATED {s1-0231, s2-0303, s3-0000}
OPTIONAL, -- Need R
    periodicity                             ENUMERATED {
                                            sym2, sym7, sym1x14, sym2x14, sym4x14, sym5x14,
sym8x14, sym10x14, sym16x14, sym20x14,
                                            sym32x14, sym40x14, sym64x14, sym80x14, sym128x14,
sym160x14, sym256x14, sym320x14, sym512x14,
                                            sym640x14, sym1024x14, sym1280x14, sym2560x14,
sym5120x14,
                                            sym6, sym1x12, sym2x12, sym4x12, sym5x12, sym8x12,
sym10x12, sym16x12, sym20x12, sym32x12,
                                            sym40x12, sym64x12, sym80x12, sym128x12, sym160x12,
sym256x12, sym320x12, sym512x12, sym640x12,
                                            sym1280x12, sym2560x12
    },
    configuredGrantTimer                        INTEGER (1..64)
OPTIONAL, -- Need R
rrc-ConfiguredUplinkGrant                   SEQUENCE {
    timeDomainOffset                        INTEGER (0..5119),
    timeDomainAllocation                    INTEGER (0..15),
    frequencyDomainAllocation               BIT STRING (SIZE(18)),
    antennaPort                             INTEGER (0..31),
    dmrs-SeqInitialization                          INTEGER (0..1),
OPTIONAL, -- Need R
    precodingAndNumberOfLayers              INTEGER (0..63),
    srs-ResourceIndicator                       INTEGER (0..15)
OPTIONAL, -- Need R
    mcsAndTBS                               INTEGER (0..31),
    frequencyHoppingOffset                  INTEGER (1.. maxNrofPhysicalResourceBlocks-
1)      OPTIONAL, -- NeedR
    pathlossReferenceIndex                      INTEGER (0..maxNrofPUSCH-
PathlossReferenceRSs-1),
    ...
}                                                   OPTIONAL, --
    Need R
    ...
}
```

Subsequently, a PUSCH transmission method is described. A DMRS antenna port for PUSCH transmission is the same as an antenna port for SRS transmission. PUSCH transmission may follow each of a codebook-based transmission method and a non-codebook-based transmission method according to whether a value of txConfig within pusch-Config of [Table 10] which is higher-layer signaling is "codebook" or "nonCodebook."

As described above, PUSCH transmission may be dynamically scheduled through DCI format 0_0 or 0_1 or semi-statically configured by the configured grant. When the UE receives an indication of scheduling of PUSCH transmission through DCI format 0_0, the UE performs a beam configuration for PUSCH transmission by using pucch-spatialRelationInfoID corresponding to a UE-specific PUCCH resource corresponding to a minimum ID within the activated uplink BWP in the serving cell in which case the PUSCH transmission is based on a single antenna port. The UE does not expect scheduling of PUSCH transmission through DCI format 0_0 within a BWP in which the PUCCH resource including pucch-spatialRelationInfo is not configured. When the UE does not receive a configuration of txConfig within pusch-Config of [Table 10], the UE does not expect reception of scheduling through DCI format 0_1.

or is semi-statically configured by the configured grant, the UE determines a precoder for PUSCH transmission on the basis of an SRS resource indicator (SRI), a transmission precoding matrix indicator (TPMI), and a transmission rank (the number of PUSCH transmission layers).

At this time, the SRI may be given through an SRS resource indicator field within DCI or may be configured through srs-ResourceIndicator which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field precoding information and number of layers within DCI or may be configured through precodingAndNumberOfLayers which is higher-layer signaling. The TPMI is used to indicate a precoder applied to PUSCH transmission. When the UE receives a configuration of one SRS resource, the TPMI is used to indicate a precoder to be applied to the one

TABLE 10

```
PUSCH-Config ::=                            SEQUENCE {
    dataScramblingIdentityPUSCH                      INTEGER (0..1023)
OPTIONAL, -- Need S
    txConfig                                ENUMERATED {codebook, nonCodebook}
OPTIONAL, -- Need S
    dmrs-UplinkForPUSCH-MappingTypeA                SetupRelease { DMRS-
UplinkConfig }                              OPTIONAL, -- Need M
    dmrs-UplinkForPUSCH-MappingTypeB                SetupRelease { DMRS-
UplinkConfig }                              OPTIONAL, -- Need M
    pusch-PowerControl                              PUSCH-PowerControl
OPTIONAL, -- Need M
    frequencyHopping                        ENUMERATED {intraSlot, interSlot}
OPTIONAL, -- Need S
    frequencyHoppingOffsetLists             SEQUENCE (SIZE (1..4)) OF INTEGER
(1.. maxNrofPhysicalResourceBlocks-1)
                                                    OPTIONAL,
-- Need M
    resourceAllocation                      ENUMERATED { resourceAllocationType0,
resourceAllocationType1, dynamic Switch},
    pusch-TimeDomainAllocationList                  SetupRelease { PUSCH-
TimeDomainResourceAllocationList }          OPTIONAL, -- Need M
    pusch-AggregationFactor                         ENUMERATED { n2, n4, n8 }
OPTIONAL, -- Need S
    mcs-Table                               ENUMERATED {qam256, qam64LowSE}
OPTIONAL, -- Need S
    mcs-TableTransformPrecoder              ENUMERATED {qam256, qam64LowSE}
OPTIONAL, -- Need S
    transformPrecoder                       ENUMERATED {enabled, disabled}
OPTIONAL, -- Need S
    codebookSubset                                  ENUMERATED
{fully AndPartialAndNonCoherent, partialAndNonCoherent, noncoherent}
                                                    OPTIONAL, --
Cond codebookBased
    maxRank                                         INTEGER (1..4)
OPTIONAL, -- Cond codebookBased
    rbg-Size                                ENUMERATED { config2}
OPTIONAL, -- Need S
    uci-OnPUSCH                                     SetupRelease { UCI-OnPUSCH}
OPTIONAL, -- Need M
    tp-pi2BPSK                                      ENUMERATED {enabled}
OPTIONAL, -- Need S
    ...
}
```

Codebook-based PUSCH transmission may be dynamically scheduled through DCI format 0_0 or 0_1 or semi-statically operate by the configured grant. When codebook-based PUSCH is dynamically scheduled by DCI format 0_1 configured SRS resource. When the UE received a configuration of a plurality of SRS resources, the TPMI is used to indicate a precoder to be applied to SRS resources indicated through the SRI.

The precoder to be used for PUSCH transmission is selected from an uplink codebook having the number of antenna ports which is the same as a value of nrofSRS-Ports within SRS-Config which is higher-layer signaling. In codebook-based PUSCH transmission, the UE determines a codebook subset on the basis of the TPMI and a codebook-Subset within pusch-Config which is higher-layer signaling. The codebookSubset within pusch-Config which is higher-layer signaling may be configured as one of "fullyAndPartialAndNonCoherent," "partialAndNonCoherent," or "nonCoherent" on the basis of the UE capability which the UE reports to the BS. When the UE reports "partialAndNonCoherent" as the UE capability, the UE does not expect a configuration of the value of the codebookSubset which is higher-layer signaling as "fullyAndPartialAndNonCoherent." Further, when the UE reports "nonCoherent" as the UE capability, the UE does not expect a configuration of the value of the codebookSubset which is higher-layer signaling as "fullyAndPartialAndNonCoherent" or "partialAndNonCoherent." When nrofSRS-Ports within SRS-ResourceSet which is higher-layer signaling indicate two SRS antenna ports, the UE does not expect a configuration of the value of the codebookSubset which is higher-layer signaling as "partialAndNonCoherent."

The UE may receive a configuration of one SRS resource set having a value of usage within SRS-ResourceSet which is higher-layer signaling configured as "codebook," and one SRS resource may be indicated through the SRI within the corresponding SRS resource set. When several SRS resources are configured within the SRS resource set having the value of usage within SRS-ResourceSet which is higher-layer signaling configured as "codebook," the UE expects a configuration of the same value of nrofSRS-Ports within the SRS-Resource which is higher-layer signaling for all SRS resources.

The UE may transmit one or a plurality of SRS resources included in the SRS resource set having the value of usage configured as "codebook" to the BS according to higher-layer signaling, and the BS may select one of the SRS resources transmitted by the UE and instruct the UE to perform PUSCH transmission by using transmission beam information of the corresponding SRS resource. At this time, in codebook-based PUSCH transmission, the SRI is used as information for selecting an index of one SRS resource and is included in DCI. In addition, the BS may insert information indicating the TPMI and the rank to be used for PUSCH transmission by the UE into DCI. The UE performs PUSCH transmission by applying a precoder indicated by the rank and the TPMI indicated on the basis of the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as "nonCodebook" within SRS-ResourceSet which is higher-layer signaling, the UE may receive scheduling of non-codebook-based PUSCH transmission through DCI format 0_1.

For the SRS resource set having the value of usage configured as "nonCodebook" within SRS-ResourceSet which is higher-layer signaling, the UE may receive a configuration of one connected non-zero power CSI-RS (NZP CSI-RS). The UE may calculate a precoder for SRS transmission through measurement for the NZP CSI-RS resource connected to the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for SRS transmission.

When the value of resource Type within SRS-ResourceSet which is higher-layer signaling is configured as "aperiodic," the connected NZP CSI-RS is indicated by an SRS request which is a field within DCI format 0_1 or 1_1. At this time, when the connected NZP CSI-RS resource is an aperiodic NZP CSI-RS resource, the case in which the value of the SRS request field within DCI format 0_1 or 1_1 is not "00" indicates the existence of the connected NZP CSI-RS. At this time, the corresponding DCI may not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. At this time, TCI states configured in the scheduled subcarrier are not configured as QCL-TypeD.

When the periodic or semi-persistent SRS resource set is configured, the connected NZP CSI-RS may be indicated through an associatedCSI-RS within SRS-ResourceSet which is higher-layer signaling. For non-codebook-based transmission, the UE does not expect configurations of both spatialRelationInfo which is higher layer signaling for the SRS resource and associatedCSI-RS within SRS-ResourceSet which is higher-layer signaling.

When the UE receives a configuration of a plurality of SRS resources, the UE may determine a precoder and a transmission rank to be applied to PUSCH transmission on the basis of an SRI indicated by the BS. At this time, the SRI may be indicated through an SRS resource indicator field within DCI or may be configured through srs-ResourceIndicator which is higher-layer signaling. Like the codebook-based PUSCH transmission, when the UE receives the SRI through DCI, the SRS resource indicated by the corresponding SRI is the SRS resource corresponding to the SRI among SRS resources transmitted earlier than the PDCCH including the corresponding SRI. The UE may use one or a plurality of SRS resources for SRS transmission, and the maximum number of SRS resources which can be simultaneously transmitted in the same symbol within one SRS resource set and the maximum number of SRS resources are determined by the UE capability which the UE reports to the BS. At this time, SRS resources which the UE simultaneously transmits occupy the same RB. The UE configures one SRS port for each SRS resource. The number of SRS resource sets having the value of usage configured as "nonCodebook" within SRS-ResourceSet which is higher-layer signaling is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set on the basis of the measurement result when the corresponding NZP-CSI-RS is received. When transmitting one or a plurality of SRS resources within the SRS resource set having usage configured as "nonCodebook" to the BS, the UE applies the calculated precoder and the BS selects one or a plurality of SRS resources from among the one or plurality of received SRS resources. At this time, in non-codebook-based PUSCH transmission, the SRI indicates an index which may express one SRS resource or r a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

[PUSCH: Preparation Process Time]

Subsequently, a PUSCH preparation process time (PUSCH preparation procedure time) is described. When the BS schedules to transmit a PUSCH to the UE by using DCI format 0_0, 0_1, or 0_2, the UE may need a PUSCH preparation process time for transmitting a PUSCH by applying a transmission method (a transmission precoding method of SRS resources, the number of transmission layers, and a spatial domain transmission filter) indicated through DCI. In NR, the PUSCH preparation process time considering the same is defined. The PUSCH preparation process time of the UE may follow [Equation 2] below:

$$T_{proc,2} = \max((N_2+d_{2,1}+d_2)(2048+144)\kappa 2^{-\mu}T_c+T_{ext}+T_{switch}, d_{2,2}).$$ [Equation 2]

In Tproc,2 of [Equation 2], respective variables may have the following meaning.

N2: the number of symbols determined according to UE processing capability 1 or 2 based on a UE capability and numerology p. N1 may have a value in [Table 11] when UE processing capability 1 is reported according to a UE capability report and may have a value in [Table 12] when UE processing capability 2 is reported and information indicating that UE processing capability 2 can be used is configured through higher-layer signaling.

TABLE 11

| μ | PUSCH preparation time N$_2$ [symbols] |
|---|---|
| 0 | 10 |
| 1 | 12 |
| 2 | 23 |
| 3 | 36 |

TABLE 12

| μ | PUSCH preparation time N$_2$ [symbols] |
|---|---|
| 0 | 5 |
| 1 | 5.5 |
| 2 | 11 for frequency range 1 | d2,1: the number of symbols determined as 0 when all resource elements of a first OFDM symbol in PUSCH transmission include only DM-RSs and, otherwise, determined as 1.

κ: 64.

μ: follows a value making Tproc,2 larger among $\mu_{DL}$ or $\mu_{UL}$. $\mu_{DL}$ is downlink numerology for transmitting a PDCCH including DCI scheduling a PUSCH and $\mu_{UL}$ is uplink numerology for transmitting a PUSCH.

Tc: has $1/(\Delta f_{max} \cdot N_f)$, $\Delta f_{max}=480 \cdot 10^3$ Hz, and $N_f=4096$.

d2,2: follows a BWP switching time when DCI scheduling a PUSCH indicates BWP switching and, otherwise, has 0.

d2: a value of d2 of a PUSCH having a high priority index is used when OFDM symbols of the PUCCH, the PUSCH having the high priority index, and a PUCCH having a low priority index overlap in the time. Otherwise, d2 is 0.

Text: the UE may calculate Text and apply the same to a PUSCH processing time when the UE uses a shared spectrum channel access scheme. Otherwise, it is assumed that Text is 0.

Tswitch: it is assumed that Tswitch is a switching interval time when an uplink switching interval is triggered. Otherwise, it is assumed that Tswitch is 0.

In consideration of time axis resource mapping information of the PUSCH scheduled through DCI and an effect of uplink-downlink timing advance, the BS and the UE may determine that the PUSCH preparation process time is not sufficient when a first symbol of the PUSCH starts earlier than a first uplink symbol at which the CP starts after Tproc,2 from a last symbol of the PDCCH including the DCI scheduling the PUSCH. Otherwise, the BS and the UE determine that the PUSCH preparation process time is sufficient. The UE may transmit the PUSCH only when the PUSCH preparation process time is sufficient, and may ignore scheduling of the PUSCH when the PUSCH preparation process time is not sufficient.

[PUSCH: Repetitive Transmission-Related]

Hereinafter, repetitive transmission of an uplink data channel in a 5G system is described in detail. In the 5G system, two types such as a PUSCH repetitive transmission type A and a PUSCH repetitive transmission type B are supported as the repetitive transmission method of the uplink data channel. The UE may receive a configuration of one of PUSCH repetitive transmission type A or B through higher-layer signaling.

PUSCH repetitive transmission type A

As described above, the symbol length of the uplink data channel and the location of a start symbol may be determined through the time domain resource allocation method within one slot, and the BS may notify the UE of the number of repetitive transmissions through higher-layer signaling (for example, RRC signaling) or L1 signaling (for example, DCI).

The UE may repeatedly transmit uplink data channels having the configured same uplink data channel length and start symbol in successive slots on the basis of the number of repetitive transmissions received from the BS. At this time, when slots which the BS configures in the UE in the downlink or one or more symbols among the symbols of uplink data channels configured in the UE are configured as the downlink, the UE omits uplink data channel transmission but counts the number of repetitive transmissions of the uplink data channel.

PUSCH Repetitive Transmission Type B

As described above, the symbol length of the uplink data channel and the location of a start symbol may be determined through the time domain resource allocation method within one slot, and the BS may notify the UE of the number numberofrepetitions of repetitive transmissions through higher-layer signaling (for example, RRC signaling) or L1 signaling (for example, DCI).

First, nominal repetition of the uplink data channel is determined on the basis of the start symbol and the length of the configured uplink data channel A slot in which nth nominal repetition starts is given by $$K_s + \left\lfloor \frac{S + n \cdot L}{N_{symb}^{slot}} \right\rfloor,$$

and a symbol starting in the slot is given by mod(S+n·L, $N_{symb}^{slot}$) A slot in which nth nominal repetition ends is given by $$K_s + \left\lfloor \frac{S + (n+1) \cdot L - 1}{N_{symb}^{slot}} \right\rfloor,$$

and a symbol ending in the slot is given by mod(S+ (n+1)·L−1, $N_{symb}^{slot}$). Here, n=0, . . . , numberofrepetitions−1, S is a start symbol of a configured uplink data channel, and L is the symbol length of the configured uplink data channel. $K_s$ indicates a slot in which PUSCH transmission starts, and $N_{symb}^{slot}$ indicates the number of symbols per slot.

The UE determines an invalid symbols for the PUSCH repetitive transmission type B. A symbol configured as the downlink by tdd-UL-DL-ConfigurationCommon or tdd-UL-DL-ConfigurationDedicated is determined as an invalid symbol for the PUSCH repetitive transmission type B. In addition, the invalid symbol may be configured in a higher-layer parameter (for example, InvalidSymbolPattern). The higher-layer parameter (for example, InvalidSymbolPattern) provides a symbol level bit map over one or two slots to configure the invalid symbol. In the bitmap, 1 indicates an invalid symbol. In addition, a period and a pattern of the bitmap may be configured through a higher-layer parameter (for example, periodicityAndPattern). When the higher-layer parameter (for example, InvalidSymbolPattern) is configured, the UE applies an invalid symbol pattern if an InvalidSymbolPatternIndicator-ForDCIFormat0_1 or InvalidSymbolPatternIndicator-ForDCIFormat0_2 parameter indicates 1, or the UE may not apply the invalid symbol pattern if the parameter indicates 0. When the higher-layer parameters (for example, InvalidSymbolPattern) is configured and the InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, for each nominal repetition, the UE may consider symbols except for the invalid symbol as valid symbols. When one or more valid symbols are included in each nominal repetition, the nominal repetition may include one or more actual repetitions. Each actual repetition includes successive sets of valid symbols which can be used for the PUSCH repetitive transmissions type B in one slot.

Figure 3:
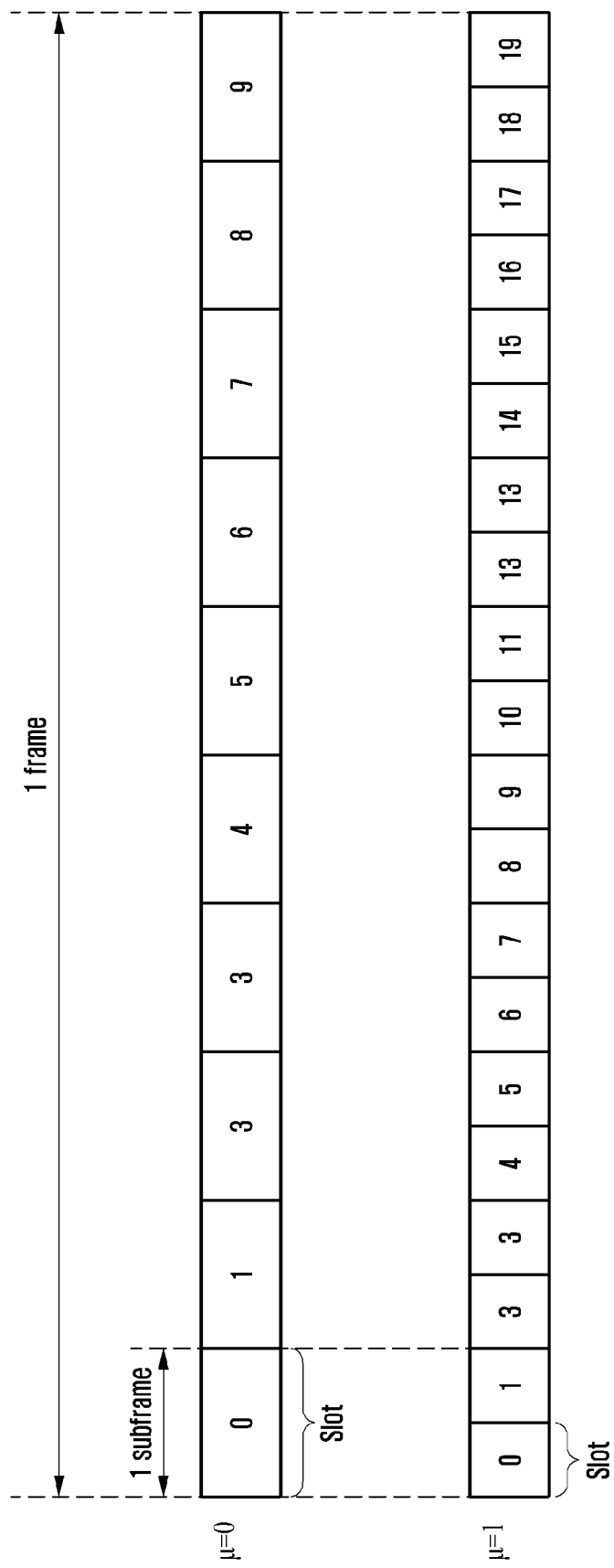
FIG. 3 illustrates an example of a PUSCH repetitive transmission type B in a wireless communication system according to an embodiment of the present disclosure.

FIG. 3 illustrates an example of the PUSCH repetitive transmission type B in a wireless communication system according to an embodiment of the present disclosure. The UE may receive a configuration of the start symbol S of the uplink data channel as 0, the length L of the uplink data channel as 14, and the number of repetitive transmissions as 16. In this case, nominal repetition appears in 16 successive slots as indicated by reference numeral. Thereafter, the UE may determine a symbol configured as a downlink system in each nominal repetition as an invalid symbol. Further, the UE determines symbols configured as 1 in an invalid symbol pattern as invalid symbols. When valid symbols other than the invalid symbol in each nominal repetition includes one or more successive symbols in one slot, the valid symbols are configured as actual repetition and transmitted as indicated by reference number.

Further, for PUSCH repetitive transmission, the following additional methods may be defined for UL grant-based PUSCH transmission and configured grant-based PUSCH transmission beyond the slot boundary in NR Release 16.

Method 1 (mini-slot level repetition): two or more PUSCH repetitive transmissions are scheduled within one slot or beyond the boundary of successive slots through one UL grant. In method 1, time domain resource allocation information within DCI indicates resources of first repetitive transmission. Time domain resource information of the remaining repetitive transmissions may be determined according to the domain resource information of first repetitive transmission and an uplink or downlink direction determined for each symbol. Each repetitive transmission occupies successive symbols.

Method 2 (multi-segment transmission): two or more PUSCH repetitive transmissions are scheduled in successive slots through one UL grant. At this time, one transmission is designated for each slot, and start points or repetition lengths may vary depending on each transmission. In method 2, the time domain resource allocation information within DCI indicates start points and repetition lengths of all repetitive transmissions. When repetitive transmission is performed within a single slot through method 2 and there are sets of successive uplink symbols within the corresponding slot, each repetitive transmission is performed for each uplink symbol set. When there is only one set of successive uplink symbols within the corresponding slot, one PUSCH repetitive transmission is performed according to the method of NR Release 15.

Method 3: two or more PUSCH repetitive transmissions are scheduled in successive slots through two or more UL grants. At this time, one transmission is designated for each slot, and an nth UL grant may be received before PUSCH transmission scheduled by an (n−1)th UL grant ends.

Method 4: one or a plurality of PUSCH repetitive transmissions may be supported within a signal slot or two or more PUSCH repetitive transmissions may be supported over boundaries of successive slots through one UL grant or one configured grant. The number of repetitions which the BS indicates to the UE is only a nominal value, and the number of PUSCH repetitive transmissions which the UE actually performs may be larger than the nominal number of repetitions. Time domain resource allocation information within the DCI or the configured grant is resources of the first repetitive transmission indicated by the BS. Time domain resource information of the remaining repetitive transmissions may be determined with reference to resource information of the first repetitive transmission and uplink or downlink directions of symbols. When the time domain resource information of repetitive transmission indicated by the BS is over the slot boundary or includes an uplink/downlink switching point, the corresponding repetitive transmission may be divided into a plurality of repetitive transmissions. At this time, one repetitive transmission may be included for each uplink period in one slot.

[PUSCH: Frequency Hopping Process]

Hereinafter, frequency hopping of an uplink data channel (physical uplink shared channel (PUSCH)) in a 5G system is described in detail.

In 5G, two methods are supported for each PUSCH repetitive transmission type as the frequency hopping method of the uplink data channel. First, intra-slot frequency hopping and inter-slot frequency hopping are supported in a PUSCH repetitive transmission type A, and inter-repetition frequency hopping and inter-slot frequency hopping are supported in a PUSCH repetitive transmission type B.

The intra-slot frequency hopping method supported in the PUSCH repetitive transmission type A is a method of changing allocated resources in the frequency domain by a frequency offset in two hops within one slot to perform transmission. In intra-slot frequency hopping, a start RB of each hop may be indicated through [Equation 3]:

$$RB_{stat} = \begin{cases} RB_{stat} & i = 0 \\ (RB_{start} + RB_{offset}) \bmod N_{BWP}^{size} & i = 1 \end{cases} \quad \text{[Equation 3]}$$

In [Equation 3], i=0 and i=1 denote a first hop and a second hop, and $RB_{start}$ denotes a start RB in an UL BWP and is calculated by a frequency resource allocation method. $RB_{offset}$ denotes a frequency offset between two hops through a higher-layer parameter. The number of symbols of the first hop may be indicated as $\lfloor N_{symb}^{PUSCH,s}/2 \rfloor$, and the number of symbols of the second hop may be indicated as $N_{symb}^{PUSCH,s} - \lfloor N_{symb}^{PUSCH,s}/2 \rfloor$. $N_{symb}^{PUSCH,s}$ denotes the length of PUSCH transmission within one slot and indicated by the number of OFDM symbols.

Subsequently, the inter-slot frequency hopping method supported in the PUSCH repetitive transmission types A and B is a method by which the UE changes allocated resources in the frequency domain by a frequency offset in every slot to perform transmission. In inter-slot frequency hopping, a start RB during $n_s^\mu$ slots may be indicated through [Equation 4]:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 4]}$$

In [Equation 4], $n_s^\mu$ denotes a current slot number in multi-slot PUSCH transmission, and $RB_{start}$ denotes a start RB in an UP BWP and is calculated by a frequency resource allocation method. $RB_{offset}$ denotes a frequency offset between two hops through a higher-layer parameter.

Subsequently, the inter-repetition frequency hopping method supported in the PUSCH repetitive transmission type B is a method of moving allocated resources in the frequency domain by a configured frequency offset to perform transmission for one or a plurality of repetitions within each nominal repetition. For one or a plurality of actual repetitions within an nth nominal repetition, RBstart(n) which is an index of the start RB in the frequency domain may follow [Equation 5] below:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 5]}$$

In [Equation 5], n denotes an index of nominal repetition, and $RB_{offset}$ denotes an RB offset between two hops through a higher-layer parameter.

[PUSCH: Multiplexing Rule in AP/SP CSI Reporting]

Hereinafter, a method of measuring and reporting a channel state in a 5G communication system is described in detail. Channel state information (CSI) may include a channel quality indicator (channel quality information (CQI)), a precoding matrix index (precoding matric indicator (PMI)), a CSI-RS resource indicator (CRI), an SS/PBCH block resource indicator (SSBRI), a layer indicator (LI), a rank indicator (RI), and/or a L1-reference signal received power (RSRP). The BS may control time and frequency resources for the CSI measurement and report of the UE.

For the CSI measurement and report, the UE may receive a configuration of setting information (CSI-ReportConfig) for N(≥1) CSI reports, setting information (CSI-ResourceConfig) for M(≥1) RS transmission resources, one or two trigger states (CSI-AperiodicTriggerStateList, CSI-SemiPersistentOnPUSCH-TriggerStateList) list information through higher-layer signaling. Configuration information for measuring and reporting the CSI may be as shown in [Table 13] to [Table 18] in more detail.

TABLE 13

CSI-ReportConfig
The IE CSI-ReportConfig is used to configure a periodic or semi-persistent
report sent on PUCCH on the cell in which the CSI-ReportConfig is included, or to configure a
semi-persistent or aperiodic report sent on PUSCH triggered by DCI received on the cell in which
the CSI-ReportConfig is included (in this case, the cell on which the report is sent is determined
by the received DCI). See 3GPP standard specification TS 38.214.

```
CSI-ReportConfig information element
- ASN1START
- TAG-CSI-REPORTCONFIG-START
CSI-ReportConfig ::=                    SEQUENCE {
  reportConfigId                          CSI-ReportConfigId,
  carrier                                 ServCellIndex                    OPTIONAL, -- Need S
  resourcesForChannelMeasurement            CSI-ResourceConfigId,
  csi-IM-ResourcesForInterference           CSI-ResourceConfigId           OPTIONAL,
Need R
  nzp-CSI-RS-ResourcesForInterference       CSI-ResourceConfigId           OPTIONAL,
Need R
  reportConfigType                        CHOICE {
    periodic                              SEQUENCE{
      reportSlotConfig                      CSI-ReportPeriodicityAndOffset,
      pucch-CSI-ResourceList                  SEQUENCE (SIZE (1..maxNrofBWPs)) OF
PUCCH-CSI-Resource
    },
    semiPersistentOnPUCCH                 SEQUENCE {
      reportSlotConfig                      CSI-ReportPeriodicityAndOffset,
      pucch-CSI-ResourceList                  SEQUENCE (SIZE (1..maxNrofBWPs)) OF
PUCCH-CSI-Resource
    },
```

TABLE 13-continued

CSI-ReportConfig
The IE CSI-ReportConfig is used to configure a periodic or semi-persistent
report sent on PUCCH on the cell in which the CSI-ReportConfig is included, or to configure a
semi-persistent or aperiodic report sent on PUSCH triggered by DCI received on the cell in which
the CSI-ReportConfig is included (in this case, the cell on which the report is sent is determined
by the received DCI). See 3GPP standard specification TS 38.214.

```
    semiPersistentOnPUSCH                       SEQUENCE{
        reportSlotConfig                            ENUMERATED {sl5, sl10, sl20, sl40, sl80, sl160,
sl320},
        reportSlotOffsetList                        SEQUENCE (SIZE (1..maxNrofUL-Allocations)) OF
INTEGER(0.32),
        p0alpha                                     P0-PUSCH-AlphaSetId
    },                                          SEQUENCE {
    aperiodic
        reportSlotOffsetList                        SEQUENCE (SIZE (1..maxNrofUL-Allocations)) OF
INTEGER(0.32)
    }
    },
    reportQuantity                              CHOICE {
        none                                        NULL,
        cri-RI-PMI-CQI                              NULL,
        cri-RI-i1                                   NULL,
        cri-RI-i1-CQI                               SEQUENCE{
            pdsch-BundleSizeForCSI                                                      ENUMERATED {n2, n4}
OPTIONAL -- Need S
        },
        cri-RI-CQI                                  NULL,
        cri-RSRP                                    NULL,
        ssb-Index-RSRP                              NULL,
        cri-RI-LI-PMI-CQI                           NULL
    },
    reportFreqConfiguration                     SEQUENCE {
        cqi-FormatIndicator                             ENUMERATED { widebandCQI, subbandCQI }
OPTIONAL, -- Need R
        pmi-FormatIndicator                             ENUMERATED { widebandPMI, subbandPMI }
OPTIONAL, -- Need R
        csi-ReportingBand                               CHOICE {
            subbands3                                   BIT STRING(SIZE(3)),
            subbands4                                   BIT STRING(SIZE(4)),
            subbands5                                   BIT STRING(SIZE(5)),
            subbands6                                   BIT STRING(SIZE(6)),
            subbands7                                   BIT STRING(SIZE(7)),
            subbands8                                   BIT STRING(SIZE(8)),
            subbands9                                   BIT STRING(SIZE(9)),
            subbands10                                  BIT STRING(SIZE(10)),
            subbands11                                  BIT STRING(SIZE(11)),
            subbands12                                  BIT STRING(SIZE(12)),
            subbands13                                  BIT STRING(SIZE(4)),
            subbands14                                  BIT STRING(SIZE(14)),
            subbands15                                  BIT STRING(SIZE(15)),
            subbands16                                  BIT STRING(SIZE(16)),
            subbands17                                  BIT STRING(SIZE(17)),
            subbands18                                  BIT STRING(SIZE(18)),
            ...,
            subbands19-v1530                            BIT STRING(SIZE(19))
        } OPTIONAL -- Need S
    }                                                                               OPTIONAL, -- Need
R
    timeRestrictionForChannelMeasurements                                           ENUMERATED {configured,
notConfigured},
    timeRestrictionForInterferenceMeasurements                                      ENUMERATED {configured,
notConfigured},
    codebookConfig                                                                  CodebookConfig
OPTIONAL, -- Need R
    dummy                                                                           ENUMERATED {n1, n2}
OPTIONAL, -- Need R
    groupBasedBeamReporting                     CHOICE {
        enabled                                     NULL,
        disabled                                    SEQUENCE {
            nrofReportedRS                                                          ENUMERATED {n1, n2, n3, n4}
OPTIONAL -- Need S
        }
    },
    cqi-Table                                       ENUMERATED {table 1, table2, table3, spare 1}
OPTIONAL, -- Need R
    subbandSize                 ENUMERATED {value 1, value2},
    non-PMI-PortIndication                          SEQUENCE (SIZE (1..maxNrofNZP-CSI-RS-
ResourcesPerConfig)) OF PortIndexFor8Ranks OPTIONAL, -- Need R
    ...,
```

TABLE 13-continued

CSI-ReportConfig
The IE CSI-ReportConfig is used to configure a periodic or semi-persistent
report sent on PUCCH on the cell in which the CSI-ReportConfig is included, or to configure a
semi-persistent or aperiodic report sent on PUSCH triggered by DCI received on the cell in which
the CSI-ReportConfig is included (in this case, the cell on which the report is sent is determined
by the received DCI). See 3GPP standard specification TS 38.214.

```
  [[
  semiPersistentOnPUSCH-v1530                         SEQUENCE{
     reportSlotConfig-v1530                           ENUMERATED {sl4, sl8, sl16}
                                                                                    OPTIONAL -- Need
  }
R
  ]],
  [[
  semiPersistentOnPUSCH-v1610                         SEQUENCE {
     reportSlotOffsetListDCI-0-2-r16                     SEQUENCE (SIZE (1.. maxNrofUL-Allocations-
r16)) OF INTEGER(0..32) OPTIONAL, -- Need R
     reportSlotOffsetListDCI-0-1-r16                     SEQUENCE (SIZE (1.. maxNrofUL-Allocations-
r16)) OF INTEGER(0..32) OPTIONAL -- Need R
  }                                                                                 OPTIONAL, -- Need
R
  aperiodic-v1610                                     SEQUENCE {
     reportSlotOffsetListDCI-0-2-r16                     SEQUENCE (SIZE (1.. maxNrofUL-Allocations-
r16)) OF INTEGER(0..32) OPTIONAL, -- Need R
     reportSlotOffsetListDCI-0-1-r16                     SEQUENCE (SIZE (1.. maxNrofUL-Allocations-
r16)) OF INTEGER(0..32) OPTIONAL -- Need R
  }                                                                                 OPTIONAL, -- Need
R
  reportQuantity-r16                                  CHOICE {
     cri-SINR-r16                                        NULL,
     ssb-Index-SINR-r16                                  NULL
  }                                                                                 OPTIONAL, -- Need
R
  codebookConfig-r16                                                                CodebookConfig-r16
OPTIONAL -- Need R
  ]]
}
CSI-ReportPeriodicityAndOffset ::= CHOICE {
  slots4           INTEGER(0..3),
  slots5           INTEGER(0..4),
  slots8           INTEGER(0..7),
  slots10          INTEGER(0..9),
  slots16          INTEGER(0..15),
  slots20          INTEGER(0..19),
  slots40          INTEGER(0..39),
  slots80          INTEGER(0..79),
  slots160         INTEGER(0..159),
  slots320         INTEGER(0..319)
}
PUCCH-CSI-Resource ::=                                SEQUENCE {
  uplinkBandwidthPartId                                 BWP-Id,
  pucch-Resource                                        PUCCH-ResourceId
}
PortIndexFor8Ranks ::=                                CHOICE {
  portIndex8                                          SEQUENCE{
     rank 1-8                                           PortIndex8                  OPTIONAL, --
Need R
     rank2-8                                                    SEQUENCE(SIZE(2)) OF PortIndex8
OPTIONAL, -- Need R
     rank3-8                                                    SEQUENCE(SIZE(3)) OF PortIndex8
OPTIONAL, -- Need R
     rank4-8                                                    SEQUENCE(SIZE(4)) OF PortIndex8
OPTIONAL, -- Need R
     rank5-8                                                    SEQUENCE(SIZE(5)) OF PortIndex8
OPTIONAL, -- Need R
     rank6-8                                                    SEQUENCE(SIZE(6)) OF PortIndex8
OPTIONAL, -- Need R
     rank7-8                                                    SEQUENCE(SIZE(7)) OF PortIndex8
OPTIONAL, -- Need R
     rank8-8                                                    SEQUENCE(SIZE(8)) OF PortIndex8
OPTIONAL -- Need R
  },
  portIndex4                                          SEQUENCE{
     rank 1-4                                           PortIndex4                  OPTIONAL, --
Need R
     rank2-4                                                    SEQUENCE(SIZE(2)) OF PortIndex4
OPTIONAL, -- Need R
     rank3-4                                                    SEQUENCE(SIZE(3)) OF PortIndex4
OPTIONAL, -- Need R
```

TABLE 13-continued

CSI-ReportConfig
The IE CSI-ReportConfig is used to configure a periodic or semi-persistent
report sent on PUCCH on the cell in which the CSI-ReportConfig is included, or to configure a
semi-persistent or aperiodic report sent on PUSCH triggered by DCI received on the cell in which
the CSI-ReportConfig is included (in this case, the cell on which the report is sent is determined
by the received DCI). See 3GPP standard specification TS 38.214.

```
    rank4-4                                                     SEQUENCE(SIZE(4)) OF PortIndex4
OPTIONAL -- Need R
  },
  portIndex2                                  SEQUENCE{
    rank 1-2                                  PortIndex2                              OPTIONAL, --
Need R
    rank2-2                                                     SEQUENCE(SIZE(2)) OF PortIndex2
OPTIONAL - Need R
  },
  portIndex1                                  NULL
}
PortIndex8::=           INTEGER (0..7)
PortIndex4::=           INTEGER (0..3)
PortIndex2::=           INTEGER (0..1)
-- TAG-CSI-REPORTCONFIG-STOP
-- ASN1STOP
```

CSI-ReportConfig field descriptions
  carrier
  Indicates in which serving cell the CSI-ResourceConfig indicated below are to be found.
  If the field is absent, the resources are on the same serving cell as this report
  configuration.
  codebookConfig
  Codebook configuration for Type-1 or Type-2 including codebook subset restriction.
  Network does not configure codebookConfig and codebookConfig-rl6 simultaneously
  to a UE
  cqi-FormatIndicator
  Indicates whether the UE shall report a single (wideband) or multiple (subband) CQI.
  (see TS 38.214 [19], clause 5.2.1.4).
  cqi-Table
  Which CQI table to use for CQI calculation (see TS 38.214 [19], clause 5.2.2.1).
  csi-IM-ResourcesForInterference
  CSI IM resources for interference measurement. csi-ResourceConfigId of a CSi-
  ResourceConfig included in the configuration of the serving cell indicated with the field
  "carrier" above. The CSI-ResourceConfig indicated here contains only CSI-IM
  resources. The bwp-Id in that CSI-ResourceConfig is the same value as the bwp-Id in
  the CSI-ResourceConfig indicated by resourcesForChannelMeasurement.
  csi-ReportingBand
  Indicates a contiguous or non-contiguous subset of subbands in the bandwidth part
  which CSI shall be reported for. Each bit in the bit-string represents one subband. The
  right-most bit in the bit string represents the lowest subband in the BWP. The choice
  determines the number of subbands (subbands3 for 3 subbands, subbands4 for 4
  subbands, and so on) (see TS 38.214 [19], clause 5.2.1.4). This field is absent if there
  are less than 24 PRBs (no sub band) and present otherwise, the number of sub bands
  can be from 3 (24 PRBs, sub band size 8) to 18 (72 PRBs, sub band size 4).
  dummy
  This field is not used in the specification. If received it shall be ignored by the UE.
  groupBasedBeamReporting
  Turning on/off group beam based reporting (see TS 38.214 [19], clause 5.2.1.4).
  non-PMI-PortIndiction
  Port indication for RI/CQI calculation. For each CSI-RS resource in the linked
  ResourceConfig for channel measurement, a port indication for each rank R, indicating
  which R ports to use. Applicable only for non-PMI feedback (see TS 38.214 [19], clause
  5.2.1.4.2).
  The first entry in non-PMI-PortIndiction corresponds to the NZP-CSI-RS-Resource
  indicated by the first entry in nzp-CSI-RS-Resources in the NZP-CSI-RS-ResourceSet
  indicated in the first entry of nzp-CSI-RS-ResourceSetList of the CSI-ResourceConfig
  whose CSI-ResourceConfigId is indicated in a CSI-MeasId together with the above
  CSI-ReportConfigId: the second entry in non-PMI-PortIndiction corresponds to the
  NZP-CSI-RS-Resource indicated by the second entry in nzp-CSI-RS-Resources in the
  NZP-CSI-RS-ResourceSet indicated in the first entry of nzp-CSI-RS-ResourceSetList of
  the same CSI-ResourceConfig, and so on until the NZP-CSI-RS-Resource indicated by
  the last entry in nzp-CSI-RS-Resources in the in the NZP-CSI-RS-ResourceSet indicated
  in the first entry of nzp-CSI-RS-ResourceSetList of the same CSI-ResourceConfig. Then
  the next entry corresponds to the NZP-CSI-RS-Resource indicated by the first entry in
  nzp-CSI-RS-Resources in the NZP-CSI-RS-ResourceSet indicated in the second entry
  of nzp-CSI-RS-ResourceSetList of the same CSI-ResourceConfig and so on.
  nrofReportedRS
  The number (N) of measured RS resources to be reported per report setting in a non-
  group-based report. N <= N_max, where N_max is either 2 or 4 depending on UE
  capability.
  (see TS 38.214 [19], clause 5.2.1.4) When the field is absent the UE applies the value
  1.
  nzp-CSI-RS-ResourcesForInterference TABLE 13-continued CSI-ReportConfig
The IE CSI-ReportConfig is used to configure a periodic or semi-persistent
report sent on PUCCH on the cell in which the CSI-ReportConfig is included, or to configure a
semi-persistent or aperiodic report sent on PUSCH triggered by DCI received on the cell in which
the CSI-ReportConfig is included (in this case, the cell on which the report is sent is determined
by the received DCI). See 3GPP standard specification TS 38.214.

NZP CSI RS resources for interference measurement. csi-ResourceConfigId of a CSI-
ResourceConfig included in the configuration of the serving cell indicated with the field
"carrier" above. The CSI-ResourceConfig indicated here contains only NZP-CSI-RS
resources. The bwp-Id in that CSI-ResourceConfig is the same value as the bwp-Id in
the CSI-ResourceConfig indicated by resourcesForChannelMeasurement.
p0alpha
Index of the p0-alpha set determining the power control for this CSI report transmission
(see TS 38.214 [19], clause 6.2.1.2).
pdsch-BundleSizeForCSI
PRB bundling size to assume for CQI calculation when reportQuantity is
CRI/RI/i1/CQI. If the field is absent, the UE assumes that no PRB bundling is applied
(see TS 38.214 [19], clause 5.2.1.4.2).
p mi-FormatIndicator
Indicates whether the UE shall report a single (wideband) or multiple (subband) PMI.
(see TS 38.214 [19], clause 5.2.1.4).
pucch-CSI-ResourceList
Indicates which PUCCH resource to use for reporting on PUCCH.
reportConfigType
Time domain behavior of reporting configuration.
reportFreqConfiguration
Reporting configuration in the frequency domain, (see TS 38.214 [19], clause 5.2.1.4).
reportQuantity
The CSI related quantities to report, see TS 38.214 [19], clause 5.2.1. If the field
reportQuantity-r16 is present, UE shall ignore reportQuantity (without suffix).
reportSlotConfig
Periodicity and slot offset (see TS 38.214 [19], clause 5.2.1.4). If the field
reportSlotConfig-v1530 is present, the UE shall ignore the value provided in
reportSlotConfig (without suffix).
reportSlotOffsetList, reportSlotOffsetListDCI-0-1, reportSlotOffsetListDCI-0-2
Timing offset Y for semi persistent reporting using PUSCH. This field lists the allowed
offset values. This list must have the same number of entries as the pusch-
TimeDomainAllocationList in PUSCH-Config. A particular value is indicated in DCI.
The network indicates in the DCI field of the UL grant, which of the configured report
slot offsets the UE shall apply. The DCI value 0 corresponds to the first report slot
offset in this list, the DCI value 1 corresponds to the second report slot offset in this
list, and so on. The first report is transmitted in slot n+Y, second report in n+Y+P,
where P is the configured periodicity.
Timing offset Y for aperiodic reporting using PUSCH. This field lists the allowed offset
values. This list must have the same number of entries as the pusch-
TimeDomainAllocationList in PUSCH-Config. A particular value is indicated in DCI.
The network indicates in the DCI field of the UL grant, which of the configured report
slot offsets the UE shall apply. The DCI value 0 corresponds to the first report slot
offset in this list, the DCI value 1 corresponds to the second report slot offset in this
list, and so on (see TS 38.214 [19], clause 6.1.2.1). The field reportSlotOffsetList
applies to DCI format 0_0, the field reportSlotOffsetListDCI-0-1 applies to DCI format
0_1 and the field reportSlotOffsetListDCI-0-2 applies to DCI format 0_2 (see TS 38.214
[19], clause 6.1.2.1).
resourcesForChannelMeasurement
Resources for channel measurement. csi-ResourceConfigId of a CSI-ResourceConfig
included in the configuration of the serving cell indicated with the field "carrier" above.
The CSI-ResourceConfig indicated here contains only NZP-CSI-RS resources and/or
SSB resources. This CSI-ReportConfig is associated with the DL BWP indicated by
bwp-Id in that CSI-ResourceConfig.
subbandSize
Indicates one out of two possible BWP-dependent values for the subband size as
indicated in TS 38.214 [19], table 5.2.1.4-2 . If csi-ReportingBand is absent, the UE
shall ignore this field.
timeRestrictionForChannelMeasurements
Time domain measurement restriction for the channel (signal) measurements (see TS
38.214 [19], clause 5.2.1.1).
timeRestrictionForInterferenceMeasurements
Time domain measurement restriction for interference measurements (see TS 38.214
[19], clause 5.2.1.1).

TABLE 14

CSI-ResourceConfig
The IE CSI-ResourceConfig defines a group of one or more NZP-CSI-RS-ResourceSet, CSI-IM-ResourceSet and/or CSI-SSB-ResourceSet.
CSI-ResourceConfig information element -- ASN1START
-- TAG-CSI-RESOURCECONFIG-START
CSI-ResourceConfig ::=    SEQUENCE {
  csi-ResourceConfigId    CSI-ResourceConfigId,
  csi-RS-ResourceSetList    CHOICE {
    nzp-CSI-RS-SSB        SEQUENCE {
      nzp-CSI-RS-ResourceSetList    SEQUENCE (SIZE (1..maxNrofNZP-CSI-RS-ResourceSetsPerConfig)) OF NZP-CSI-RS-ResourceSetId
                                                                OPTIONAL, --
Need R
      csi-SSB-ResourceSetList        SEQUENCE (SIZE (1..maxNrofCSI-SSB-ResourceSetsPerConfig)) OF CSI-SSB-ResourceSetId OPTIONAL -- Need R
    },
    csi-IM-ResourceSetList        SEQUENCE (SIZE (1..maxNrofCSI-IM-ResourceSetsPerConfig)) OF CSI-IM-ResourceSetId
  },
  bwp-Id        BWP-Id,
  resourceType        ENUMERATED { aperiodic, semiPersistent, periodic },
  ...
}
-- TAG-CSI-RESOURCECONFIG-STOP
-- ASN1STOP
CSI-ResourceConfig field descriptions
  bwp-Id
    The DL BWP which the CSI-RS associated with this CSI-ResourceConfig are located
    in (see TS 38.214 [19], clause 5.2.1.2.
  csi-IM-ResourceSetList
    List of references to CSI-IM resources used for beam measurement and reporting in a
    CSI-RS resource set. Contains up to maxNrofCSI-IM-ResourceSetsPerConfig resource
    sets if resourceType is "aperiodic" and 1 otherwise (see TS 38.214 [19], clause
    5.2.1.2).
  csi-ResourceConfigId
    Used in CSI-ReportConfig to refer to an instance of CSI-ResourceConfig.
  csi-SSB-ResourceSetList
    List of references to SSB resources used for beam measurement and reporting in a
    CSI-RS resource set (see TS 38.214 [19], clause 5.2.1.2).
  nzp-CSI-RS-ResourceSetList
    List of references to NZP CSI-RS resources used for beam measurement and reporting
    in a CSI-RS resource set. Contains up to maxNrofNZP-CSI-RS-
    ResourceSetsPerConfig resource sets if resourceType is "aperiodic" and 1 otherwise
    (see TS 38.214 [19], clause 5.2.1.2).
  resourceType
    Time domain behavior of resource configuration (see TS 38.214 [19], clause 5.2.1.2).
    It does not apply to resources provided in the csi-SSB-ResourceSetList.

TABLE 15

NZP-CSI-RS-ResourceSet
The IE NZP-CSI-RS-ResourceSet is a set of Non-Zero-Power (NZP) CSI-RS
resources (their IDs) and set-specific parameters.
NZP-CSI-RS-ResourceSet information element -- ASN1START
-- TAG-NZP-CSI-RS-RESOURCESET-START
NZP-CSI-RS-ResourceSet ::=            SEQUENCE {
  nzp-CSI-Resource SetId            NZP-CSI-RS-ResourceSetId,
  nzp-CSI-RS-Resources            SEQUENCE (SIZE (1..maxNrofNZP-CSI-RS-ResourcesPerSet)) OF NZP-CSI-RS-ResourceId,
  repetition                ENUMERATED { on, off }
OPTIONAL, -- Need S
  aperiodicTriggeringOffset                INTEGER(0..6)
OPTIONAL, -- Need S
  trs-Info                ENUMERATED {true}
OPTIONAL, -- Need R
  ...,
  [[                    INTEGER(0..31)
  aperiodicTriggeringOffset-r16
OPTIONAL -- Need S
  ]]
}
-- TAG-NZP-CSI-RS-RESOURCESET-STOP
-- ASN1STOP TABLE 15-continued NZP-CSI-RS-ResourceSet
The IE NZP-CSI-RS-ResourceSet is a set of Non-Zero-Power (NZP) CSI-RS
resources (their IDs) and set-specific parameters.
NZP-CSI-RS-ResourceSet information element NZP-CSI-RS-ResourceSet field descriptions
    aperiodicTriggeringOffset, aperiodicTriggeringOffset-r16
    Offset X between the slot containing the DCI that triggers a set of aperiodic NZP CSI-
RS resources and the slot in which the CSI-RS resource set is transmitted. For
aperiodicTriggeringOffset, the value 0 corresponds to 0 slots, value 1 corresponds to
1 slot, value 2 corresponds to 2 slots, value 3 corresponds to 3 slots, value 4
corresponds to 4 slots, value 5 corresponds to 16 slots, value 6 corresponds to 24 slots.
For aperiodicTriggeringOffset-r16, the value indicates the number of slots. The
network configures only one of the fields. When neither field is included, the UE
applies the value 0.
    nzp-CSI-RS-Resources
    NZP-CSI-RS-Resources associated with this NZP-CSI-RS resource set (see TS 38.214
[19], clause 5.2). For CSI, there are at most 8 NZP CSI RS resources per resource set.
    repetition
    Indicates whether repetition is on/off. If the field is set to off or if the field is absent,
the UE may not assume that the NZP-CSI-RS resources within the resource set are
transmitted with the same downlink spatial domain transmission filter (see TS 38.214
[19], clauses 5.2.2.3.1 and 5.1.6.1.2). It can only be configured for CSI-RS resource
sets which are associated with CSI-ReportConfig with report of L1 RSRP or "no
report."
    trs-Info
    Indicates that the antenna port for all NZP-CSI-RS resources in the CSI-RS resource
set is same. If the field is absent or released the UE applies the value false (see TS
38.214 [19], clause 5.2.2.3.1).

TABLE 16

CSI-IM-ResourceSet
The IE CSI-SSB-ResourceSet is used to configure one SS/PBCH block
resource set which refers to SS/PBCH as indicated in ServingCellConfigCommon.
CSI-SSB-ResourceSet information element

```
-- ASN1START
-- TAG-CSI-SSB-RESOURCESET-START
CSI-SSB-ResourceSet ::= SEQUENCE {
   csi-SSB-Resource SetId     CSI-SSB-ResourceSetId,
   csi-SSB-ResourceList       SEQUENCE (SIZE(1..maxNrofCSI-SSB-ResourcePerSet))
OF SSB-Index,
   ...
}
-- TAG-CSI-SSB-RESOURCESET-STOP
-- ASN1STOP
```

45

TABLE 17

CSI-IM-ResourceSet
The IE CSI-IM-ResourceSet is used to configure a set of one or more CSI
Interference Management (IM) resources (their IDs) and set-specific parameters.
CSI-IM-ResourceSet information element

```
-- ASN1START
-- TAG-CSI-IM-RESOURCESET-START
CSI-IM-ResourceSet ::=  SEQUENCE {
   csi-IM-ResourceSetId    CSI-IM-ResourceSetId,
   csi-IM-Resources        SEQUENCE (SIZE(1..maxNrofCSI-IM-ResourcesPerSet))
OF CSI-IM-ResourceId,
   ...
}
-- TAG-CSI-IM-RESOURCESET-STOP
-- ASN1STOP
```
CSI-IM-ResourceSet field descriptions
    csi-IM-Resources
    CSI-IM-Resources associated with this CSI-IM-ResourceSet (see TS 38.214 [19],
clause 5.2)

TABLE 18

CSI-AperiodicTriggerStateList
The CSI-AperiodicTriggerStateList IE is used to configure the UE with a list of
aperiodic trigger states. Each codepoint of the DCI field "CSI request" is associated with one
trigger state. Upon reception of the value associated with a trigger state, the UE may perform
measurement of CSI-RS (reference signals) and aperiodic reporting on L1 according to all entries
in the associatedReportConfigInfoList for that trigger state.
CSI-AperiodicTriggerStateList information element

```
-- ASN1 START
-- TAG-CSI-APERIODICTRIGGERSTATELIST-START
CSI-AperiodicTriggerStateList ::=    SEQUENCE (SIZE (1..maxNrOfCSI-AperiodicTriggers))
OF CSI-AperiodicTriggerState
CSI-AperiodicTriggerState ::=       SEQUENCE {
    associatedReportConfigInfoList                              SEQUENCE
(SIZE(l. .maxNrofReportConfigPerAperiodicTrigger)) OF CSI-AssociatedReportConfigInfo,
    ...
}
CSI-AssociatedReportConfigInfo ::=    SEQUENCE {
    reportConfigId         CSI-ReportConfigId,
    resourcesForChannel        CHOICE {
        nzp-CSI-RS        SEQUENCE {
            resourceSet                                 INTEGER (1..maxNrofNZP-CSI-RS-
ResourceSetsPerConfig),
            qcl-info                            SEQUENCE (SIZE(1..maxNrofAP-CSI-RS-
ResourcesPerSet)) OF TCI-StateId OPTIONAL -- Cond Aperiodic
        },
        csi-SSB-ResourceSet                                 INTEGER (1..maxNrofCSI-SSB-
ResourceSetsPerConfig)
    },
    csi-IM-ResourcesForInterference                             INTEGER(1..maxNrofCSI-IM-
ResourceSetsPerConfig) OPTIONAL,     Cond CSI-IM-ForInterference
    nzp-CSI-RS-ResourcesForInterference   INTEGER   (1..maxNrofNZP-CSI-RS-
ResourceSetsPerConfig) OPTIONAL,     Cond NZP-CSI-RS-ForInterference
    ...
}
-- TAG-CSI-APERIODICTRIGGERSTATELIST-STOP
-- ASN1STOP
```

CSI-AssociatedReportConfigInfo field descriptions
csi-IM-ResourcesForInterference
CSI-IM-ResourceSet for interference measurement. Entry number in csi-IM-ResourceSetList in
the CSI-ResourceConfig indicated by csi-IM-ResourcesForInterference in the CSI-
ReportConfig indicated by reportConfigId above (1 corresponds to the first entry, 2 to the second
entry, and so on). The indicated CSI-IM-ResourceSet should have exactly the same number of
resources like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in
the CSI-ResourceConfig indicated by resourcesForChannelMeasurement in the CSI-
ReportConfig indicated by reportConfigId above (1 corresponds to the first entry, 2 to the second
entry, and so on).
nzp-CSI-RS-ResourcesForInterference
NZP-CSI-RS-ResourceSet for interference measurement. Entry number in nzp-CSI-RS-
ResourceSetList in the CSI-ResourceConfig indicated by nzp-CSI-RS-
ResourcesForInterference in the CSI-ReportConfig indicated by reportConfigId above (1
corresponds to the first entry, 2 to the second entry, and so on).
qcl-info
List of references to TCI-States for providing the QCL source and QCL type for each NZP-CSI-
RS-Resource listed in nzp-CSI-RS-Resources of the NZP-CSI-RS-ResourceSet indicated by
nzp-CSI-RS-ResourcesforChannel. Each TCI-StateId refers to the TCI-State which has this
value for tci-StateId and is defined in tci-StatesToAddModList in the PDSCH-Config included
in the BWP-Downlink corresponding to the serving cell and to the DL BWP to which the
resourcesForChannelMeasuremeni. (in the CSI-ReportConfig indicated by reportConfigId
above) belong to. First entry in qcl-info-forChannel corresponds to first entry in nzp-CSI-RS-
Resources of that NZP-CSI-RS-ResourceSet, second entry in qcl-info-forChannel corresponds
to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-
ResourceSetList in the CSI-ResourceConfig indicated by resourcesForChannelMeasurement in
the CSI-ReportConfig indicated by reportConfigId above (1 corresponds to the first entry, 2 to
the second entry, and so on).

TABLE 18-continued

CSI-AperiodicTriggerStateList
The CSI-AperiodicTriggerStateList IE is used to configure the UE with a list of
aperiodic trigger states. Each codepoint of the DCI field "CSI request" is associated with one
trigger state. Upon reception of the value associated with a trigger state, the UE may perform
measurement of CSI-RS (reference signals) and aperiodic reporting on L1 according to all entries
in the associatedReportConfigInfoList for that trigger state.
CSI-AperiodicTriggerStateList information element

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

TABLE 19

CSI-SemiPersistentOnPUSCH-TriggerStateList
The CSI-SemiPersistentOnPUSCH-TriggerStateList IE is used to configure the
UE with list of trigger states for semi-persistent reporting of channel state information
on L1. See also 3GPP standard specification TS 38.214.
CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList    ::=    SEQUENCE(SIZE
(1..maxNrOfSemiPersistentPUSCH-Triggers)) OF CSI-SemiPersistentOnPUSCH-TriggerState
CSI-SemiPersistentOnPUSCH-TriggerState ::=    SEQUENCE {
   associatedReportConfigInfo       CSI-ReportConfigId,
   ...
}
-- TAG-CSI-SEMIPERSISTENTONPUSCHTRIGGERSTATELIST-STOP
-- ASN1STOP
```

For the CSI report setting (CSI-ReportConfig), each report setting CSI-ReportConfig is CSI resource setting CSI-ResourceConfig associated with the corresponding report setting and may be associated with one downlink (DL) BWP identified by a given higher-layer parameter BWP identifier (bwp-id). As a time domain report operation for each report setting CSI-ReportConfig, "aperiodic," "semi-persistent," and "periodic" schemes may be supported, and may be configured in the UE by the BS through reportConfigType parameters configured by a higher layer. The semi-persistent CSI reporting method supports "PUCCH-based semi-persistent (semi-PersistentOnPUCCH)" and "PUSCH-based persistent (semi-PersistentOnPUSCH)." In the case of the periodic or semi-persistent CSI reporting method, the UE may receive a configuration of PUCCH or PUSCH resources for transmitting the CSI from the BS through higher-layer signaling. A period of PUCCH or PUSCH resources for transmitting the CSI and a slot offset may be given on the basis of numerology of an uplink (UL) BWP configured to transmit the CSI report. In the case of the aperiodic CSI reporting method, the UE may receive scheduling of PUSCH resources for transmitting the CSI from the BS through L1 signaling (DCI format 0_1).

For the CSI resource settings (CSI-ResourceConfig), each CSI resource setting CSI-ReportConfig may include S(≥1) CSI resource sets (configured as a higher-layer parameter csi-RS-ResourceSetList). The CSI resource set list may include a non-zero power (NZP) CSI-RS resource set and an SS/PBCH block set or include a CSI-interference measurement (CSI-IM) resource set. Each CSI resource setting may be located in a downlink (DL) BWP identified by a higher-layer parameter bwp-id, and the CSI resource setting may be connected to a CSI report setting in the same downlink BWP. The time domain operation of CSI-RS resources within the CSI resource settings may be configured as one of "aperiodic," "periodic," or "semi-persistent" from the higher-layer parameter resourceType. For the periodic or semi-persistent CSI resource settings, the number of CSI-RS resource sets may be limited to S=1, and the configured period and slot offset may be given on the basis of numerology of a downlink BWP identified by bwp-id. The UE may receive a configuration of one or more CSI resource settings for channel or interference measurement from the BS through higher-layer signaling, and may include, for example, the following CSI resources.

CSI-IM resources for interference measurement.
NZP CSI-RS resources for interference measurement.
NZP CSI-RS resources for channel measurement.

For CSI-RS resource sets associated with resource setting in which higher-layer parameter resourceType is configured as "aperiodic," "periodic," or "semi-persistent," resource setting for a trigger state for CSI reporting setting in which reportType is configured as "aperiodic" and a channel or interference measurement for one or a plurality of component cells (CCs) may be configured through higher-layer parameter CSI-AperiodicTriggerStateList.

The aperiodic CSI report of the UE may use the PUSCH, the periodic CSI report may use the PUCCH, and the semi-persistent CSI report may use the PUCCH after being activated to the PUSCH or the MAC control element (MAC CE) when triggered or activated by DCI. As described above, the CSI resource setting may also be configured to be aperiodic, periodic, or semi-persistent. Combinations of CSI report settings and CSI resource configurations may be supported on the basis of [Table 20] below.

TABLE 20

Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI reporting may be triggered by a "CSI request" field of DCI format 0_1 corresponding to scheduling DCI for the PUSCH. The UE may monitor the PDCCH, acquire DCI format 0_1, and acquire scheduling information for the PUSCH and a CSI request indicator. The CSI request indicator may be configured as NTS bits (=0, 1, 2, 3, 4, 5, or 6), and may be determined by higher-layer signaling (reportTriggerSize). Among one or a plurality of aperiodic CSI reporting trigger states which can be configured through high-layer signaling (CSI-AperiodicTriggerStateList), one trigger state may be triggered by the CSI request indicator.

When all bits in the CSI request field are 0, it may mean no request for the CSI report.

When the number (M) of CSI trigger states within the configured CSI-AperiodicTriggerStateLite is larger than 2NTs−1, the M CSI trigger states may be mapped to 2NTs−1 according to the predefined mapping relation and one of the 2NTs−1 trigger states may be indicated by the CSI request field.

When the number (M) of CSI trigger states within the configured CSI-AperiodicTriggerStateLite is equal to or smaller than 2NTs−1, one of the M CSI trigger states may be indicated by the CSI request field.

[Table 21] below shows an example of the relation between a CSI request indicator and a CSI trigger state which can be indicated by the corresponding indicator.

TABLE 21

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1, CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may measure CSI resources within the CSI trigger state triggered by the CSI request field and generate the CSI (including one or more of the CQI, the PMI, the CRI, the SSBRI, the LI, the RI, or the L1-RSRP) on the basis thereof. The UE may transmit the acquired CSI by using a PUSCH scheduled by corresponding DCI format 0_1. When 1 bit corresponding to an uplink data indicator (UL-SCH indicator) within DCI format 0_1 indicates "1," uplink data (UL-SCH) and the acquired CSI may be multiplexed and transmitted through PUSCH resources scheduled by DCI format 0_1. When 1 bit corresponding to an uplink data indicator (UL-SCH indicator) within DCI format 0_1 indicates "0," only the CSI may be mapped and transmitted through PUSCH resources scheduled by DCI format 0_1 without uplink data (UL-SCH).

Figure 4:
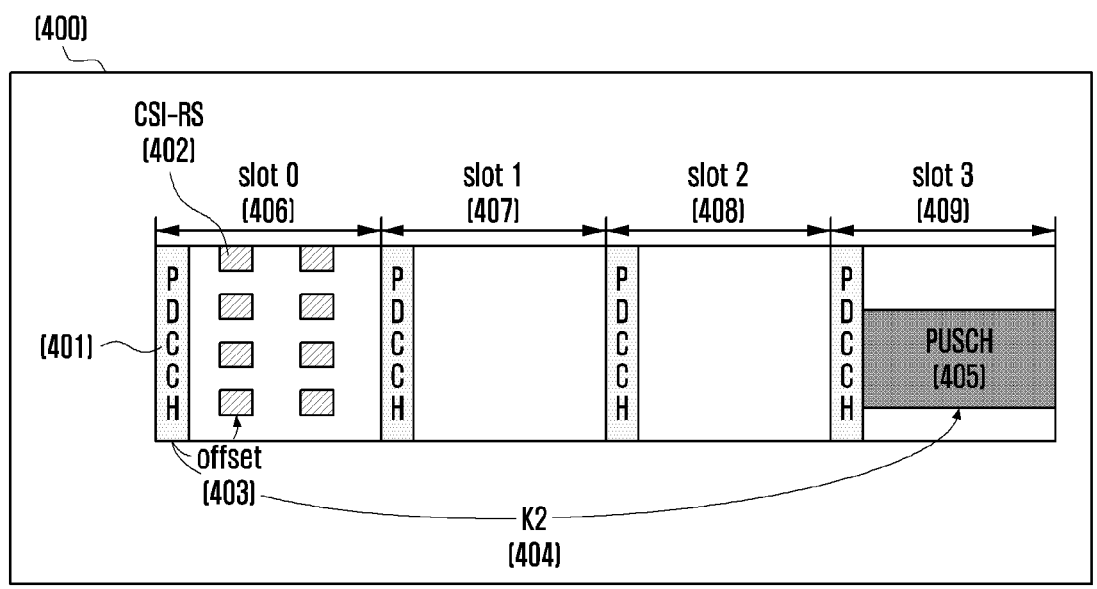
FIG. 4 illustrates an example of an aperiodic CSI report method according to an embodiment of the present disclosure.
Figure 4:
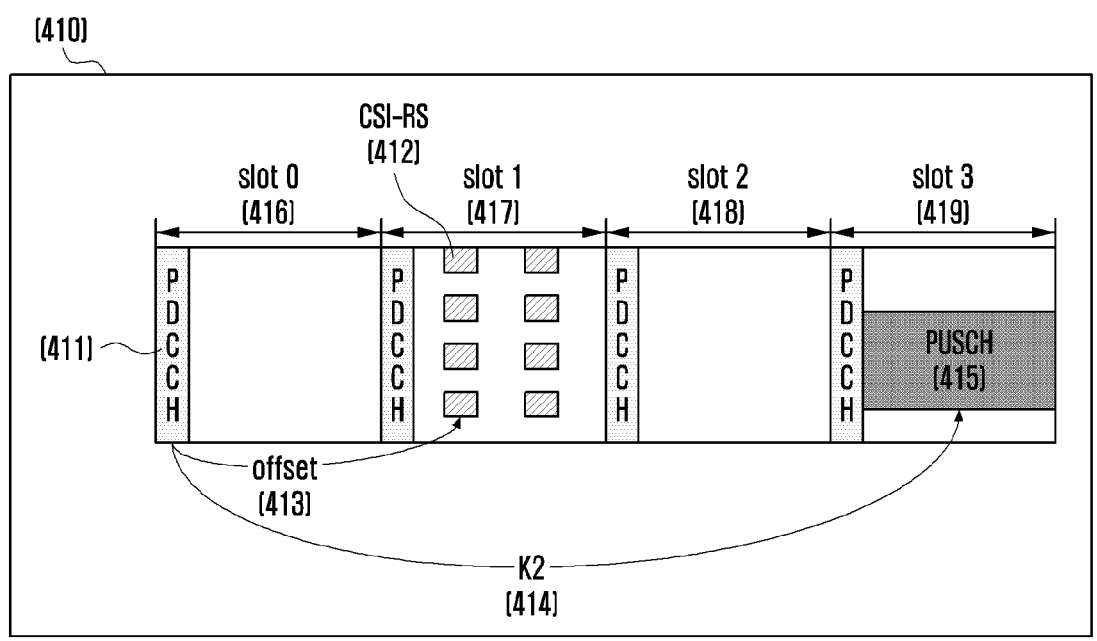

FIG. 4 illustrates an example of an aperiodic CSI report method according to an embodiment of the present disclosure.

In an example 400 of FIG. 4, the UE may acquire DCI format 0_1 by monitoring a PDCCH 401 and acquire scheduling information for a PUSCH 405 and CSI request information therefrom. The UE may acquire resource information for a CSI-RS 402 to be measured from the received CSI request indicator. The UE may determine a time point at which resources of the transmitted CSI-RS 402 are measured on the basis of a time point at which DCI format 0_1 is received and a parameter for an offset (aperiodicTriggeringOffset) within an NZP CSI-RS resource set configuration (for example, NZP-CSI-RS-ResourceSet). More specifically, the UE may receive a configuration of an offset value X of the parameter aperiodicTriggeringOffset within the NZP-CSI-RS resource set configuration from the BS through higher-layer signaling, and the configured offset value X may be an offset between a slot for receiving DCI of triggering the aperiodic CSI report and a slot for transmitting CSI-RS resources. For example, the aperiodicTriggeringOffset parameter value and the offset value X may have a mapping relation shown in [Table 22] below.

TABLE 22

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In the example 400 of FIG. 4, the offset value is configured as X=0. In this case, the UE may receive the CSI-RS 402 in the slot (corresponding to slot #0 406 in FIG. 4) for receiving DCI format 0_1 of triggering the aperiodic CSI reporting and report CSI information measured by the received CSI-RS to the BS through the PUSCH 405. The UE may acquire scheduling information (information corresponding to each field of DCI format 0_1) for the PUSCH 405 for the CSI reporting from DCI format 0_1. For example, the UE may acquire information on a slot for transmitting the PUSCH 405 on the basis of the time domain resource allocation information for the PUSCH 405 in DCI format 0_1. In the example 400 of FIG. 4, the UE may acquire 3 that is a K2 value corresponding to a slot offset value for PDCCH-to-PUSCH, and accordingly, the PUSCH 405 may be transmitted at a time point at which the PDCCH 401 is received in slot #3 406 spaced apart from slot 0 409 by 3 slots.

In an example 410 of FIG. 4, the UE may acquire DCI format 0_1 by monitoring a PDCCH 411 and acquire scheduling information for a PUSCH 415 and CSI request information therefrom. The UE may acquire resource information for a CSI-RS 412 to be measured from the received CSI request indicator. In the example 410 of FIG. 4, the offset value for the CSI-RS is configured as X=1. In this case, the UE may receive the CSI-RS 412 in the slot (corresponding to slot #0 416 in FIG. 4) for receiving DCI format 0_1 of triggering the aperiodic CSI reporting and report CSI information measured by the received CSI-RS to the BS through the PUSCH 415.

Aperiodic CSI reporting may include at least one or all of CSI part 1 or CSI part 2, and when the aperiodic CSI reporting is transmitted through the PUSCH, it may be multiplexed with a transport block. After a CRC is inserted into input bits of the aperiodic CSI for multiplexing, encoding and rate matching may be performed, and then mapping to resource elements within the PUSCH in a specific pattern may be performed for transmission. The CRC insertion may be omitted according to a coding scheme or the length of input bits. In multiplexing of CSI part 1 or CSI part 2 included in the aperiodic CSI reporting, the number of modulation symbols calculated for rate matching may be calculated as shown in [Table 23] below.

TABLE 23

For CSI part 1 transmission on PUSCH not using repetition type B with UL-SCH, the number of coded modulation symbols per layer for CSI part 1 transmission, denoted as $Q_{CSI-part1}'$, is determined as follows:

[Equation 6]

$$Q'_{CSI-1} = \min\left\{\left\lceil\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(l)\right\rceil - Q'_{ACK/CG-UCI}\right\}$$

...

For CSI part 1 transmission on an actual repetition of a PUSCH with repetition Type B with UL-SCH, the number of coded modulation symbols per layer for CSI part 1 transmission, denoted as $Q_{CSI-part1}'$, is determined as follows:

[Equation 7]

$$Q'_{CSI-1} = \min\left\{\left\lceil\frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil,\right.$$

$$\left.\left\lceil\alpha \cdot \sum_{l=0}^{N_{symb,nominal}^{PUSCH}-1} M_{sc,nominal}^{UCI}(l)\right\rceil - Q'_{ACK/CG-UCI}, \sum_{l=0}^{N_{symb,actual}^{PUSCH}-1} M_{sc,actual}^{UCI}(l) - Q'_{ACK/CG-UCI}\right\}$$

...

For CSI part 1 transmission on PUSCH without UL-SCH, the number of coded modulation symbols per layer for CSI part 1 transmission, denoted as $Q_{CSI-part1}'$, is determined as follows: if there is CSI part 2 to be transmitted on the PUSCH,

[Equation 8]

$$Q'_{CSI-1} = \min\left\{\left\lceil\frac{(O_{CSI-1} + L_{CSI-1}) \cdot \beta_{offset}^{PUSCH}}{R \cdot Q_m}\right\rceil, \sum_{l=0}^{N_{symb,all}^{PUSCH}-1} M_{sc}^{UCI}(l) - Q'_{ACK}\right\}$$

TABLE 23-continued else $$Q'_{CSI-1} = \sum_{l=0}^{N_{symb,all}^{PUSCH}-1} M_{sc}^{UCI}(l) - Q'_{ACK}$$

end if

...

For CSI part 2 transmission on PUSCH not using repetition type B with UL-SCH, the number of coded modulation symbols per layer for CSI part 2 transmission, denoted as $Q_{CSI-part2}'$, is determined as follows:

[Equation 9]

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \right\}$$

For CSI part 2 transmission on an actual repetition of a PUSCH with repetition Type B with UL-SCH, the number of coded modulation symbols per layer for CSI part 2 transmission, denoted as $Q_{CSI-part2}'$, is determined as follows:

[Equation 10]

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nominal}^{UCI}(l) \right\rceil - Q'_{ACK/CG-UCI} - Q'_{CSI-1}, \sum_{l=0}^{N_{symb,actual}^{PUSCH}-1} M_{sc,actual}^{UCI}(l) - Q'_{ACK/CG-UCI} - Q'_{CSI-1} \right\}$$

...

For CSI part 2 transmission on PUSCH without UL-SCH, the number of coded modulation symbols per layer for CSI part 2 transmission, denoted as $Q_{CSI-part2}'$, is determined as follows:

[Equation 11]

$$Q'_{CSI-2} = \sum_{l=0}^{N_{symb,all}^{PUSCH}-1} M_{sc}^{UCI}(l) - Q'_{ACK} - Q'_{CSI-1}$$

Particularly, in the PUSCH repetitive transmission schemes A and B, the UE may multiplex and transmit the aperiodic CSI reporting only in the first repetitive transmission of the PUSCH repetitive transmission. This is because the multiplexed aperiodic CSI reporting information is encoded in a polar code type in which case, for multiplexing with a plurality of PUSCH repetitions, respective PUSCH repetitions may have the same frequency and time resources, and respective actual repetitions may have different OFDM symbol lengths particularly in the PUSCH repetition type B, and thus the aperiodic CSI reporting may be multiplexed and transmitted only in the first PUSCH repetition.

When the UE schedules the aperiodic CSI reporting without scheduling of the transport block or receives DCI for activating semi-persistent CSI reporting for the PUSCH repetitive transmission scheme B, it may be assumed that a value of nominal repetition is 1 even though the number of PUSCH repetitive transmissions configured through higher-layer signaling is larger than 1. When the UE schedules or activates the aperiodic or semi-persistent CSI reporting without scheduling of the transport block on the basis of the PUSCH repetitive transmission scheme B, the UE may expect that the first nominal repetition is the same as the first actual repetition. When the first nominal repetition is different from the first actual repetition with respect to the transmitted PUSCH including semi-persistent CSI on the basis of the PUSCH repetitive transmission scheme B without scheduling of DCI after the semi-persistent CSI reporting is activated by the DCI, transmission of the first nominal repetition may be ignored.

[PUCCH: UCI on PUSCH]

In the NR communication system, when an uplink control channel overlaps an uplink data channel and satisfies a transmission time condition or transmission of uplink control information through the uplink data channel by L1 signaling or higher signaling is indicated, the uplink control information may be included in the uplink data channel and transmitted. At this time, total of three pieces of uplink control information such as HARQ-ACK, CSI part 1, and CSI part 2 may be transmitted through the uplink data channel, and each piece of the uplink control information may be mapped to the PUSCH by a predetermined multiplexing rule. More specifically, when the number of HARQ-ACK information bits which may be included in the PUSCH is equal to or smaller than 2 in the first step, the UE reserves in advance REs for transmitting HARQ-ACK. At this time, a method of determining reserved resources is the same as that in the second step.

However, the number and location of reserved Res are determined on the basis of the assumption that the number of HARQ-ACK bits is 2. That is, they are calculated on the basis of Oack=2 in [Equation 11]. When the number of HARQ-ACK information bits to be transmitted by the UE is larger than 2 in the second step, the UE may map HARQ-ACK from the first OFDM symbol including no DMRS after the first DMRS symbol. In a third step, the UE may map CSI part 1 to the PUSCH. At this time, CSI part 1 may be mapped from the first OFDM symbol rather than the DMRS, and may not be mapped to a reserved RE in the first step and an RE to which HARQ-ACK is mapped in the second step. In a fourth step, the UE may map CSI part 2 to the PUSCH. At this time, CSI part 2 may be mapped from the first OFDM symbol rather than the DMRS, and may not be mapped to an RE at which CSI part 1 is located and an RE at which HARQ-ACK mapped to the RE is located in the second step. However, CSI part 2 may be mapped to the reserved RE in the first step.

When a UL-SCH exists, the UE may map the UL-SCH to the PUSCH. At this time, the UL-SCH may be mapped from the first OFDM symbol rather than the DMRS, and may not be mapped to an RE at which CSI part 1 is located, and an RE at which HARQ-ACK mapped to the RE is located and an RE at which CSI part 2 is located in the second step. However, CSI part 2 may be mapped to the reserved RE in the first step. In a fifth step, when HARQ-ACK is smaller than 2 bits, the UE may puncture and map HARQ-ACK to the reserved RE in the first step. The number of Res to which the HARQ-ACK is mapped is calculated on the basis of the actual number of HARQ-ACKs. That is, the number of reserved Res in the first step may be smaller than the actual number of REs to which the HARQ-ACK is mapped. The puncturing means that, even though CSI part 2 or the UL-SCH is mapped to the RE to which the HARQ-ACK may be mapped in the fourth step, ACK is mapped instead of the pre-mapped CSI part 2 or UL-SCH. CSI part 1 is not mapped to the reserved RE, and thus puncturing by HARQ-ACK is not generated. This means that CSI part 1 has a higher priority than CSI part 2 allows better decoding.

When the number of bits of uplink control information to be mapped to the PUSCH (or the number of modulated symbols) is larger than the number of bits (or REs) for mapping uplink control information within the corresponding OFDM symbol to be mapped, a frequency-axis RE interval d between modulated symbols of the uplink control information to be mapped may be configured as d=1. When the number of bits of uplink control information to be mapped to the PUSCH (or the number of modulated symbols) is smaller than the number of bits (or REO) for mapping uplink control information within the corresponding OFDM symbol to be mapped, a frequency-axis RE interval d between modulated symbols of the uplink control information to be mapped may be configured as d=floor(# of available bits on 1-OFDM symbol/# of unmapped UCI bits at the beginning of 1-OFDM symbol).

[PUCCH Format]

Subsequently, various PUCCH formats provided in 5G NR are described. 5G NR provides a total of 5 PUCCH formats (hereinafter, formats) and the type thereof includes format 0, format 1, format 2, format 3, and format 4. Format 0 and format 2 support CP-OFDM, and the length of available OFDM symbols is 1 or 2 symbols. This is called a short PUCCH format. The purpose of introduction thereof is to provide a short delay time due to the short symbol length. Format 1, format 3, and format 4 support DFT-s-OFRM, and the length of available OFDM symbols is 4 to 14 symbols. This is called a long PUCCH format. The purpose of introduction thereof is to provide wide uplink coverage due to the long symbol length. Format 0 may have the size of one RB and include only information having UCI payload equal to or smaller than 2 bits.

Further, as a maximum of 3 or 6 UEs use different code resources in one RE, multiplexing is possible. Format 1 may have various RB sizes and include only information having UCI payload larger than or equal to 3 bits. Unlike format 0, format 1 does not support UE multiplexing for a specific RB. Format 2 may have the size of one RB and include only information having UCI payload equal to or smaller than 2 bits. Further, as 1 to 7 UEs use different code resources in one RE, multiplexing is possible. Format 3 may have various RB sizes and include only information having UCI payload larger than or equal to 3 bits. Further, UE multiplexing is not supported for a specific RB. Format 4 may have the size of one RB and include only information having UCI payload larger than or equal to 3 bits. Further, multiplexing of 2 or 4 UEs is supported within one RB.

[PUSCH Power Control]

PUSCH transmission power may be determined through [Equation 12] below:

$$P_{PUSCH}(i, j, q_d, l) = \min \left\{ \begin{array}{l} P_{CMAX,f,c}(i), \\ P_{O_{PUSCH},b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\} [dBm].$$

[Equation 12]

In [Equation 12], $P_{CMAX,f,c}(i)$ denotes maximum transmission power configured in the UE for a carrier f of a serving cell c at a PUSCH transmission time point i. $P_{O_{PUSCH},b,f,c}(j)$ denotes a reference configuration transmission power configuration value according to an activated uplink bandwidth part (BWP) b of the carrier f of the serving cell c. Further, the values may be various according to the case in which PUSCH transmission is a message 3 PUSCH for random access, the case in which a PUSCH is a configured grant PUSCH, or a scheduled PUSCH. $M_{RB,b,f,c}^{PUSCH}(i)$ denotes the size of a frequency to which the PUSCH is allocated. $\alpha_{b,f,c}(j)$ denotes a compensation rate degree value for path loss of UL BWP b of the carrier f of the serving cell c, and may be configured by a higher-layer signal and may have different values according to j. $PL_{b,f,c}(q_d)$ denotes a downlink path loss estimation value of the UL BWP b of the carrier f of the serving c and may use a value measured through a reference signal in an activated downlink BWP section. The reference signal may be an SS/PBCH block or a CSI-RS. In another embodiment of the disclosure, the UE may measure reference signal received power (RSRP) from a path attenuation estimation signal transmitted by the BS and estimate a downlink path attenuation value as shown in [Equation 13]. Further, an uplink transmission power value for transmitting the random access preamble and message 3 may be configured on the basis of the estimated path attenuation value.

Downlink path attenuation=transmission power of
signal of BS–RSRP measured by UE. [Equation 13]

In [Equation 13], transmission power of the signal of the BS is transmission power of a downlink path attenuation estimation signal transmitted by the BS. As shown in [Equation 13], the downlink path loss may be calculated. In another embodiment of the disclosure, $PL_{b,f,c}(q_d)$ denotes a downlink path attenuation value and corresponds to path attenuation calculated by the UE as shown in [Equation 13]. The UE calculates path attenuation on the basis of reference signal resources associated with the SS/PBCH block or the CSI-RS according to whether a higher-layer signal is configured. For the reference signal resources, one of a plurality of reference signal resource sets is selected by a higher-layer signal or an L1 signal, and the UE calculates path attenuation on the basis of the reference signal resources. $\Delta_{TF,b,f,c}(i)$ denotes a value determined by a modulation and coding scheme (MCS) value of the PUSCH at the PUSCH transmission time point i of the UL BWP b of the carrier f of the serving cell c. $f_{b,f,c}(i,l)$ denotes a power control adaption value and may dynamically control a power value by a TPC command.

The TPC command is divided into an accumulated mode and an absolute mode, and one of the two modes is determined by a higher-layer signal. In the accumulated mode, the currently determined power control adaption value is accumulated on a value indicated by the TPC command and may increase or decrease according to the TPC command, and has the relation of $f_{b,f,c}(i,l)=f_{b,f,c}(i-i_0,l)+\Sigma\hat{o}_{PUSCH,b,f,c}$. $\hat{o}_{PUSCH,b,f,c}$ is a value indicated by the TPC command. In the absolute mode, the value is determined by the TPC command regardless of the currently determined power control adaption value, and has the relation of $f_{b,f,c}(i,l)=\hat{o}_{PUSCH,b,f,c}$. [Table 24] below shows values which can be indicated by the TPC commands.

TABLE 24

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
| --- | --- | --- |
| 0 | −1 | −4 |
| 1 | 0 | −1 |
| 2 | 1 | 1 |
| 3 | 3 | 4 |

[PUCCH Power Control]
[Equation 14] is an equation of determining PUCCH transmission power.

In [Equation 14], $P_{O_{PUCCH},b,f,c}(q_u)$ denotes a reference configuration transmission power configuration value, and may have different values according to various transmission types $q_u$ and be changed by a higher-layer signal such as RRC or an MAC CE. When the value is changed by the MAC CE and a slot for transmitting HARQ-ACK is k for a PDSCH receiving the MAC CE, the UE determines that the corresponding value is applied starting at a slot k+koffset. Koffset may have different values according to subcarrier spacing and have, for example, 3 ms. $M_{RB,b,f,c}^{PUCCH}(i)$ is the size of a frequency resource area to which the PUCCH is allocated. $PL_{b,f,c}(q_d)$ denotes a path attenuation estimation value of the UE and is calculated by the UE on the basis of a specific reference signal among various CSI-RSs or SS/PBCHs according to whether a higher signal is configured and according to the type thereof as shown in [Equation 7]. The same $q_d$ is applied to repeatedly transmitted PUCCHs. The same $q_u$ is applied to repeatedly transmitted PUCCHs.

[PUCCH: HARQ-ACK Codebook]

Hereinafter, a semi-static HARQ-ACK codebook (or Type 1 HARQ-ACK codebook) configuration method in the NR system is described. In a situation in which the number of HARQ-ACK PUCCHs which can be transmitted by the UE within one slot is limited to one, when the UE receives a semi-static HARQ-ACK codebook higher configuration, the UE may report HARQ-ACK information for PDSCH reception or SPS PDSCH release through an HARQ-ACK codebook in a slot indicated by a value of a PDSCH-to-HARQ_feedback timing indicator in DCI format 1_0 or DCI format 1_1. The UE reports, as NACK, an HARQ-ACK information bit value within the HARQ-ACK codebook in a slot which is not indicated by the PDSCH-to-HARQ feedback timing indicator field in DCI format 1_0 or DCI format 1_1. If the UE reports only HARQ-ACK information for one SPS PDSCH release or one PDSCH reception in the cases of MA,c for reception of candidate PDSCHs and the report is scheduled by DCI format 1_0 including information indicating 1 by a counter DAI field in the Pcell, the UE may determine one HARQ-ACK codebook for the corresponding SPS PDSCH release or the corresponding PDSCH reception.

In other cases, an HARQ-ACK codebook determination method follows the following method.

When a set of PDSCH reception candidates in a serving cell c is MA,c, MA,c may be obtained through the following steps of [pseudo-code 1].

[Equation 14]

$$P_{PUCCH,b,f,c}(i, q_u, q_d, l) = \min\left\{\begin{array}{l}P_{CMAX,f,c}(i), \\ P_{O_{PUCCH},b,f,c}(q_u) + 10\log_{10}(2^\mu \cdot M_{RB,b,f,c}^{PUCCH}(i)) + PL_{b,f,c}(q_d) + \Delta_{F_{PUCCH}}(i) + \Delta_{TF,b,f,c}(i) + f_{b,f,c}(i, l)\end{array}\right\}[dBm]$$

[pseudo-code 1 starts]
- Step 1: initializes j to 0 and MA,c to a null set k which is an HARQ-ACK transmission timing index is initialized to 0.
- Step 2: configures R as a set of rows in a table including information on a slot to which the PDSCH is mapped, start symbol information, the number of symbols, or length information. When a mapping information of an available PDSCH indicated by each value of R is configured as an UL symbol according to the configured DL and UL configuration, the corresponding row is deleted from R.
- Step 3-1: the UE may receive one PDSCH for unicast in one slot, and one PDSCH is added to a set of MA,c if R is not a null set.
- Step 3-2: when the UE can receive one or more PDSCHs for unicast in one slot, the number of PDSCHs which can be allocated to different symbols is counted in the calculated R and the corresponding number is added to MA,c.
- Step 4: increases k by 1 and start from step 2 again.
[pseudo-code 1 ends]

In a specific slot, step 3-2 is described through [Table 7] (default PDSCH time domain resource allocation A for normal CP) below.

TABLE 25

| Row index | dmrs-TypeA-Position | PDSCH mapping type | $K_0$ | S | L | Ending | Order |
|---|---|---|---|---|---|---|---|
| 1 | 2 | Type A | 0 | 2 | 12 | 13 | 1x |
|   | 3 | Type A | 0 | 3 | 11 | 13 | 1x |
| 2 | 2 | Type A | 0 | 2 | 10 | 11 | 1x |
|   | 3 | Type A | 0 | 3 | 9 | 11 | 1x |
| 3 | 2 | Type A | 0 | 2 | 9 | 10 | 1x |
|   | 3 | Type A | 0 | 3 | 8 | 10 | 1x |
| 4 | 2 | Type A | 0 | 2 | 7 | 8 | 1x |
|   | 3 | Type A | 0 | 3 | 6 | 8 | 1x |
| 5 | 2 | Type A | 0 | 2 | 5 | 6 | 1x |
|   | 3 | Type A | 0 | 3 | 4 | 6 | 1x |
| 6 | 2 | Type B | 0 | 9 | 4 | 12 | 2x |
|   | 3 | Type B | 0 | 10 | 4 | 13 | 3 |
| 7 | 2 | Type B | 0 | 4 | 4 | 7 | 1x |
|   | 3 | Type B | 0 | 6 | 4 | 9 | 2 |
| 8 | 2,3 | Type B | 0 | 5 | 7 | 11 | 1x |
| 9 | 2,3 | Type B | 0 | 5 | 2 | 6 | 1x |
| 10 | 2,3 | Type B | 0 | 9 | 2 | 10 | 2x |
| 11 | 2,3 | Type B | 0 | 12 | 2 | 13 | 3x |
| 12 | 2,3 | Type A | 0 | 1 | 13 | 13 | 1x |
| 13 | 2,3 | Type A | 0 | 1 | 6 | 6 | 1x |
| 14 | 2,3 | Type A | 0 | 2 | 4 | 5 | 1 |
| 15 | 2,3 | Type B | 0 | 4 | 7 | 10 | 1x |
| 16 | 2,3 | Type B | 0 | 8 | 4 | 11 | 2x |

[Table 25] is a time resource allocation table in which the UE operates by default before receiving allocation of time resources through a separate RRC signal. For reference, a PDSCH time resource allocation value is determined by dmrs-TypeA-Position which is a UE-common RRC signal in addition to an indication of a row index value through separate RRC. In [Table 25] above, an encoding column and an order column are separately added for convenience of description, and they may not be actually exist. The ending column means an end symbol of the scheduled PDSCH, and the order column means a code location value located within a specific codebook in a semi-static HARQ-ACK codebook. The corresponding table is applied to time resource allocation applied in DCI format 1_0 in the common-search area of the PDCCH.

The UE performs the following steps in order to determine the HARQ-ACK codebook by calculating the maximum number of PDSCHs that do not overlap within a specific slot.
  Step 1: search for a PDSCH allocation value first ending within a slot among all rows in the PDSCH time resource allocation table. In corresponding [Table 7], 14 of a row index first ends. This is expressed as 1 in the order column. Other row indexes which overlap with the corresponding order index 14 in at least one symbol are expressed as 1x in the order column.
  Step 2: search for a PDSCH allocation value which first ends in the remaining row indexes which are not expressed in the order column. In [Table 7], the PDSCH allocation value corresponds to a row having a row index of 7 and a dmrs-TypeA-Position value of 3. Other row indexes which overlap with the corresponding order index in at least one symbol are expressed as 2x in the order column.
  Step 3: increase and express an order value by repeating step 2. For example, a PDSCH allocation value which first ends in row indexes which are not expressed in the order column of [Table 7] is searched for. In [Table 7], the PDSCH allocation value corresponds to a row having a row index of 6 and a dmrs-TypeA-Position value of 3. Other row indexes which overlap with the corresponding order index in at least one symbol are expressed as 3x in the order column.
  Step 4: end the process when all row indexes are expressed in the order. The size of the corresponding order is the maximum number of PDSCHs which can be scheduled in the corresponding slot without time overlapping. Scheduling having no time overlapping means that different PDSCHs are scheduled by TDM.

In the order column of [Table 25], a maximum value of order means the size of the HARQ-ACK codebook of the corresponding slot, and the order value means an HARQ-ACK codebook point at which an HARQ-ACK feedback bit for the corresponding scheduled PDSCH is located. For example, a row index 16 in [Table 25] means a second code location in a semi-static HARQ-ACK codebook having the size of 3. When a set of occasions for candidates PDSCH receptions in the serving cell c is MA,c, the UE transmitting HARQ-ACK feedback may calculate MA,c through the steps of [pseudo-code 1] or [pseudo-code 2]. MA,c may be used to determine the number of HARQ-ACK bits which the UE may transmit. Specifically, the HARQ-ACK codebook may be configured using cardinality of the MA,c set.

In another example, matters which may be considered to determine the semi-static HARQ-ACK codebook (or type 1 HARQ-ACK codebook) are described below.
  a) on a set of slot timing values $K_1$ associated with the active UL BWP.
    a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0.

b) If the UE is configured to monitor PDCCH for DCI format 1_1 for serving cell c, $K_1$ is provided by dl-DataToUL-ACK for DCI format 1_1.

b) on a set of row indexes R of a table that is provided either by a first set of row indexes of a table that is provided by PDSCH-TimeDomainResourceAllocationList in PDSCH-ConfigCommon or by Default PDSCH time domain resource allocation A in 3GPP standard specification TS 38.214, or by the union of the first set of row indexes and a second set of row indexes, if provided by PDSCH-TimeDomainResourceAllocationList in PDSCH-Config, associated with the active DL BWP and defining respective sets of slot offsets K0, start and length indicators SLIV, and PDSCH mapping types for PDSCH reception as described in 3GPP standard specification TS 38.214.

c) on the ratio $2^{\mu_{DL}-\mu_{UL}}$ between the downlink SCS configuration $\mu_{DL}$ and the uplink SCS configuration $\mu_{UL}$ provided by subcarrierSpacing in BWP-Downlink and BWP-Uplink for the active DL BWP and the active UL BWP, respectively.

d) if provided, on TDD-UL-DL-ConfigurationCommon and TDD-UL-DL-ConfigDedicated as described in Sub-clause 11.1.

In another example, pseudo-code for determining the HARQ-ACK codebook may be described below.

```
[pseudo-code 2 starts]
    For the set of slot timing values K₁, the UE determines a set of M_{A,c}
occasions for candidate PDSCH receptions or SPS PDSCH releases according to the following
pseudo-code. A location in the Type-1 HARQ-ACK codebook for HARQ-ACK information
corresponding to a SPS PDSCH release is same as for a corresponding SPS PDSCH reception.
    Set j=0 - index of occasion for candidate PDSCH reception or SPS PDSCH
release:
    Set B=0
    Set M_{A,c}=0
    Set c(K₁) to the cardinality of set K₁
    Set k =0 - index of slot timing values K_{1,k}, in descending order of the slot timing values,
in set K₁ for serving cell c
    while k<c(K₁)
        if mod(n_U-K_{1,k}+1,max(2^{μUL-μDL},1))=0
    Set n_D=0 - index of a DL slot within an UL slot
    while n_D<max(2^{μDL-μUL},1)
        Set R to the set of rows
        Set c(R) to the cardinality of R
        Set r=0 - index of row in set R
        if slot n_U starts at a same time as or after a slot for an active DL BWP change
on serving cell c or an active UL BWP change on the PCell and slot
⌊ (n_U-K_{1,k})*2^{μDL-μUL} ⌋ +n_D is before the slot for the active DL BWP change on serving
cell c or the active UL BWP change on the PCell
            continue;
        else
            while r<c(R)
                if the UE is provided TDD-UL-DL-ConfigurationCommon or
TDD-UL-DL-ConfigDedicated and, for each slot from slot ⌊ (n_U-K_{1,k})*2^{μDL-μUL} ⌋ +n_D-N_{PDSCH}^{repeat}+1
to slot ⌊ (n_U-K_{1,k})*2^{μDL-μUL} ⌋ +n_D, at least one symbol of the PDSCH time resource
derived by row r is configured as UL where K_{1,k} is the k-th slot timing value in set K₁
,
                    R=R/r;
                end if
                r=r+1;
            end while
            if the UE does not indicate a capability to receive more than one unicast
PDSCH per slot and R≠0,
                M_{A,c}=M_{A,c} ∪ j;
                j=j+1;
                The UE does not expect to receive SPS PDSCH release and
unicast PDSCH in a same slot;
            else
                Set c(R) to the cardinality of R
                Set m to the smallest last OFDM symbol index, as determined
by the SLIV, among all rows of R
                while R≠0
                    Set r=0
                    while r<c(R)
                        if S≤m for start OFDM symbol index S for row r
                            b_{r,k,n_D}=j; - index of occasion for candidate
PDSCH reception or SPS PDSCH release associated with row r
                            R=R/r;
                            B=B ∪_{r,k,n_D};
                        end if
                        r=r+1;
                    end while
                    M_{A,c}=M_{A,c} ∪ j;
                    j=j+i;
                    Set m to the smallest last OFDM symbol index among
all rows of R;
                end while
            end if
        end if
        n_D=n_D+;
```

```
    end while
  end if
  k=k+1.
end while.
    [pseudo-code 2 ends]
```

In [pseudo-code 2], the location of the HARQ-ACK codebook including HARQ-ACK information for DCI indicating DL SPS release is based on the location at which the DL SPS PDSCH is received. For example, when a start symbol of transmission of the DL SPS PDSCH is a fourth OFDM symbol based on the slot and the length thereof is 5 symbols, it is assumed that HARQ-ACK information including DL SPS release indicating the release of the corresponding SPS starts from the fourth OFDM symbol of the slot in which the DL SPS release is transmitted and a PDSCH having the length of 5 symbols is mapped and HARQ-ACK information corresponding thereto is determined through a PDSCH-to-HACK timing indicator and a PUSCH resource indicator included in control information indicating DL SPS release.

In another example, when a start symbol of transmission of the DL SPS PDSCH is a fourth OFDM symbol based on the slot and the length thereof is 5 symbols, it is assumed that HARQ-ACK information including DL SPS release indicating the release of the corresponding SPS starts from the fourth OFDM symbol of the slot indicated by time domain resource allocation (TDRA) of DCI that is the DL SPS release and a PDSCH having the length of 5 symbols is mapped and HARQ-ACK information corresponding thereto is determined through a PDSCH-to-ACK timing indicator and a PUSCH resource indicator included in control information indicating DL SPS release.

Subsequently, a dynamic HARQ-ACK codebook in the NR system is described. The UE transmits HARQ-ACK information transmitted within one PUCCH in corresponding slot n on the basis of a PDSCH-to-HARQ feedback timing value for PUCCH transmission of HARQ-ACK information in slot n for PDSCH reception or SPS PDSCH release and K0 that is transmission slot location information of the PDSCH scheduled in DCI format 1_0 or 1_1. Specifically, for the HARQ-ACK information transmission, the UE determines an HARQ-ACK codebook of the PUCCH transmitted in the slot determined by the PDSCH-to-HARQ feedback timing and K0 on the basis of DAI included in the DCI indicating the PDSCH or SPS PDSCH release.

The DAI includes counter DAI and total DAI. The counter DAI is information informing of the location of HARQ-ACK information corresponding to the PDSCH scheduled in DCI format 1_0 or DCI format 1_1 within the HARQ-ACK codebook. Specifically, a value of the counter DAI within DCI format 1_0 or 1_1 indicates an accumulated value of PDSCH reception or SPS PDSCH release scheduled by DCI format 1_0 or DCI format 1_1 in a specific cell c. The accumulated value is configured on the basis of PDCCH monitoring occasion in which the scheduled DCI exists and the serving cell.

The total DAI is a value informing the size of the HARQ-ACK codebook. Specifically, a value of the total DAI means a total number of PDSCH or SPS PDSCH releases scheduled before a time point at which the DCI is scheduled. The total DAI is a parameter used when HARQ-ACK information in the serving cell includes HARQ-ACK information for the PDSCH scheduled in another cell including the serving cell c in carrier aggregation (CA). In other words, in a system operated by one cell, there is no total DAI parameter.

[General: MBS Operation]

Meanwhile, various embodiments of the disclosure provide various methods of groupcast service or multicast service, which is described below in detail.

First, in various embodiments of the disclosure, transmission of the same data from one UE to a plurality of UEs or transmission of the same data from the BS to a plurality of UEs may be referred to as groupcast or multicast, and it may be noted that groupcast and multicast can be interchangeably used in various embodiments of the disclosure.

Further, in various embodiments of the disclosure, the term "base station (BS)" may indicate a predetermined component (or a set of components) configured to provide radio access, such as a transmission point (TP), a transmit-receive point (TRP), an enhanced node B (eNodeB or eNB), a 5G base station (gNB), a macro cell, a femto cell, a WiFi access point (AP), or other wireless enable devices. The BSs may provide radio access according to one or more wireless protocols, for example, 5G 3GPP new wireless interface/access (NR), long-term evolution (LTE), LTE-advanced (LTE-A), high speed packet access (HSPA), Wi-Fi 802.11a/b/g/n/ac, and the like.

Further, in various embodiments of the disclosure, the term "terminal" may indicate a predetermined component, such as "user equipment (UE)," "mobile station," "subscriber station," "remote terminal," "wireless terminal," "receive point," or "user device." For convenience, the term "UE" is used to indicate a device accessing the BS in various embodiments of the disclosure regardless of whether the terminal should be considered as a mobile device (mobile phone or smartphone) or a stationary device (for example, desktop computer or vending machine).

Figure 5:
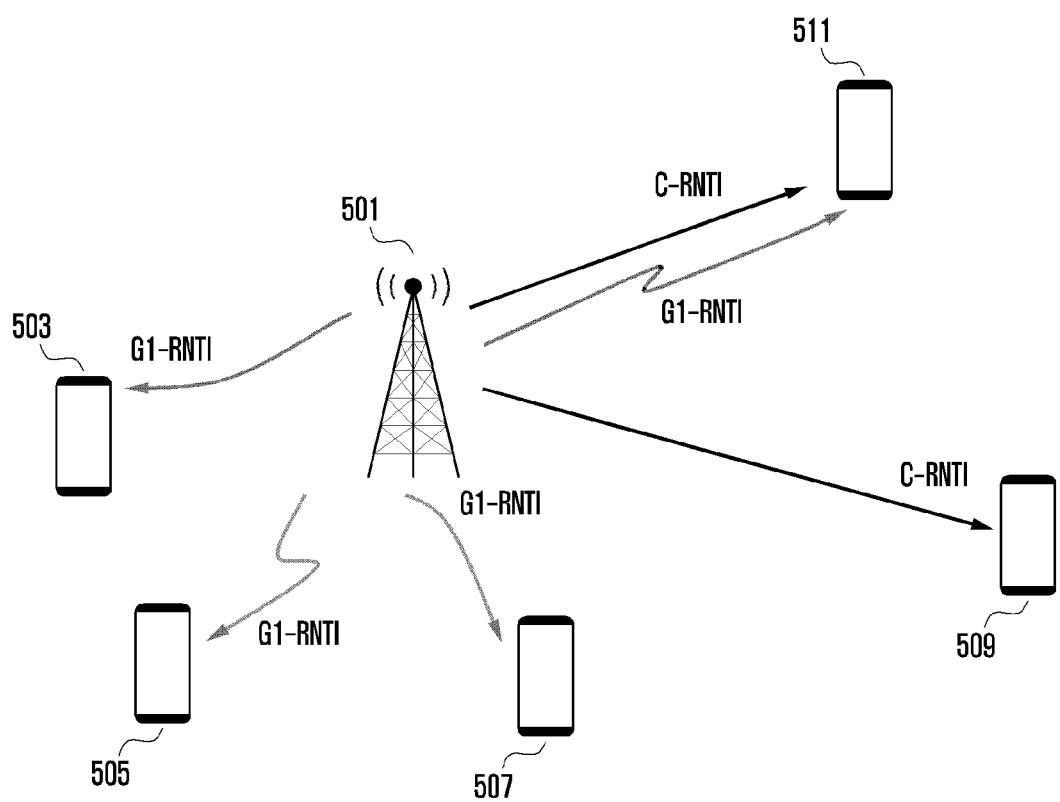
FIG. 5 schematically illustrates an example of a signal transmission/reception scheme for a groupcast service in a wireless communication system according to various embodiments of the present disclosure.

An example of a signal transmission/reception method for a groupcast service in a wireless communication system according to various embodiments of the disclosure is described with reference to FIG. 5. FIG. 5 schematically illustrates an example of the signal transmission/reception method for the groupcast service in the wireless communication system according to various embodiments of the disclosure.

In FIG. 5, an example of groupcast in which a BS 501 transmits the same control information and the same data to a plurality of UEs, for example, UEs 503, 505, 507, and 511 is described. First, the BS informs the UEs 503, 505, 507, and 511 of a G-RNTI which can be used to receive control information for groupcast through a system information block (SIB), preconfigured information, or a preconfigured message. The G-RNTI is a group radio network temporary identifier (hereafter, referred to as a G-RNTI).

Each of the UEs 503, 505, 507, and 511 may receive the G-RNTI transmitted by the BS 501 and receive control information for groupcast by using the G-RNTI. The G-RNTI may be scrambled and transmitted with a cyclic redundancy check (CRC) of control information for groupcast, for example, downlink control information (DCI).

In FIG. 5, the UE 509 may be a UE accessing the BS 501 or a UE receiving a cell radio network temporary identifier (C-RNTI) from the BS 501. Further, the UE 511 may be a UE accessing the BS 501 or a UE receiving both the C-RNTI and the G-RNTI for groupcast from the BS 501.

Meanwhile, the case in which the same control information and data are transmitted and one or a plurality of UEs can receive the same transmitted control information and data may be referred to as groupcast for the control information and data. Further, in FIG. 5, the case in which the UE 509 or the UE 511 receives a C-RNTI or a UE-specific RNTI and only specific UEs receive control information and data by using the C-RNTI or the UE-specific RNTI may be referred to as unicast for the control information and data.

Meanwhile, in various embodiments of the disclosure, the UE may be configured to receive a control channel signal and a data channel signal for groupcast from a transmitting side A and receive a control channel signal and a data channel signal for unicast from a transmitting side B. In various embodiments of the disclosure, the transmitting side A and the transmitting side B may be the same transmitting side or different transmitting sides. Further, in various embodiments of the disclosure, the transmitting side A and the transmitting side B may be BSs, vehicles, or normal UEs.

The case in which the transmitting side A and the transmitting side B are BSs may be the case in which groupcast data and unicast data are transmitted from the BS, that is, through a Uu link.

Unlike this, when the transmitting side A and the transmitting side B are vehicles or normal UEs, the groupcast transmission and the unicast transmission may be sidelink transmission. At this time, each of the transmitting side A and the transmitting side B may be a UE serving as a leader node or an anchor node in the corresponding group, and accordingly may be a UE capable of performing groupcast transmission to at least one other UE within the corresponding group and performing an operation of receiving control information from the at least one other UE. Further, in various embodiments of the disclosure, the transmitting side A may be a vehicle and the transmitting side B may be a BS. In addition, various embodiments of the disclosure are described on the basis of the assumption that the transmitting side A and the transmitting side B are one transmitting side, but the various embodiments of the disclosure may be applied to the case in which the transmitting side A and the transmitting side B are different transmitting sides.

Meanwhile, the UE may receive an RNTI corresponding to a unique identifier (ID) in order to receive a control channel signal and a data channel signal for groupcast (in the following description, it may be noted that the RNTI corresponding to the unique ID to receive the control channel signal and the data channel signal for groupcast can be interchangeably used with a G-RNTI, a group-common RNTI, or a group identifier) through a BS or another UE within the group (corresponding to the leader node). The UE may receive a control channel signal for groupcast by using the G-RNTI and receive a data channel signal on the basis of the control channel signal for the groupcast.

Further, in various embodiments of the disclosure, a control channel for data scheduling can be interchangeably used with a physical downlink control channel (PDCCH) or a physical sidelink control channel (PSCCH), a data channel can be interchangeably used with a physical downlink shared channel (PDSCH) or a physical sidelink shared channel (PSSCH), and a feedback channel can be interchangeably used with a physical uplink control channel (PUCCH) or a PSCCH. In addition, in various embodiments of the disclosure, the control information for scheduling, received by the UE is assumed as, for example, DCI, but can be implemented in various forms other than the DCI.

In various embodiments of the disclosure, transmission of the same data from one UE to a plurality of UEs or transmission of the same data from the BS to a plurality of UEs may be referred to as groupcast or multicast. In various embodiments of the disclosure, it should be noted that the groupcast can be interchangeably used with multicast.

Further, in various embodiments of the disclosure, "data" may include a transport block (TB) transmitted through a shared channel such as a PDSCH, a PUSCH, or a PSSCH.

In the disclosure, an example of description of the higher signal (or a higher-level signal or a high-level signal) may be UE-common higher signals such as an MIB or an SIB or UE-specific higher signals such as RRC or an MAC CE.

In the disclosure, an example of description of the L1 signal may be a specific field within DCI, DCI formation information, RNTI information scrambled with the CRC of DCI, or control area resource information for transmitting and receiving DCI.

In various embodiments of the disclosure, signal transmission/reception methods for groupcast or multicast according to the following embodiments are provided, which is described below in detail.

When data for groupcast is transmitted to UEs, the UEs are RRC_connected UEs, and data for unicast or broadcast is received along with the data for groupcast, embodiments of the signal transmission/reception methods for groupcast or multicast may provide a method and an apparatus indicating which data is received and how to transmit HARQ feedback information in response to the received data. Hereinafter, for convenience of description, the data for groupcast is referred to as "groupcast data," and the data for unicast is referred to as "unicast data." Further, the control information for groupcast is referred to as "groupcast control information," and the control information for unicast is referred to as "unicast control information."

First, in various embodiments of the disclosure, prioritization of reception of specific data may mean that the specific data is decoded and data other than the specific data is not decoded. Decoding of data may include a process of demodulating the data and storing a calculated log likelihood ratio (LLR) value in a soft buffer. Alternatively, decoding of data may include a process of transmitting HARQ feedback information for the data and not transmitting HARQ feedback information for data other than the data, transmitting an NACK value, or feeding back a predetermined value for data other than the data.

In various embodiments of the disclosure, groupcast data and unicast data may be divided according to a DCI bit field or according to an RNTI value scrambled with the CRC of the DCI. Various embodiments of the disclosure describe an example of processing for groupcast data and unicast data, but may be similarly applied to processing for groupcast control information and unicast control information.

In various embodiments of the disclosure, for example, when groupcast DCI and unicast DCI are simultaneously received or are received in the same slot, the following various methods may be considered to determine which DCI among the groupcast DCI and the unicast DCI is preferentially decoded.

In various embodiments of the disclosure, simultaneous reception of groupcast data and unicast data may include overlapping of at least some resources (for example, symbols) in a resource area to which data for groupcast is allocated and a resource area to which data for unicast is allocated in terms of at least time resources, or include overlapping of at least some resources in terms of time and frequency resources.

In various embodiments of the disclosure, groupcast data and unicast data can be scheduled by respective control information or scheduled without separate control information. Scheduling of data without separate control information may be semi-persistent scheduling (SPS) or configured grant (CG) scheduling, and the SPS or the CG scheduling may pre-transmission of scheduling information through higher-layer signaling and the start of triggering and transmission by indicating scheduling resources or a transmission time point through DCI or the start of data transmission without DCI transmission. Unlike this, dynamic scheduling may be a mode in which information such as transmission resources, a transmission time point, a modulation and coding scheme (MCS), and an HARQ process ID is provided and scheduled through DCI whenever data is transmitted. Accordingly, groupcast data may be semi-persistently scheduled or dynamically scheduled, and similarly, unicast data may be semi-persistently scheduled or dynamically scheduled.

In various embodiments of the disclosure, simultaneous reception of scheduling of groupcast data and unicast data by the UE may mean scheduling in one carrier (cell), one bandwidth part (BWP), or different carriers.

In various embodiments of the disclosure, the UE may not except reception of simultaneous scheduling of groupcast data and unicast data, and when such scheduling is generated, consider the scheduling as an error case or randomly receive one of two data. UEs reporting a specific UE capability may correspond thereto or UEs which do not report a UE capability related thereto (that is, default UE operation) may correspond thereto.

In various embodiments of the disclosure, the UE may receive simultaneous scheduling of groupcast data and unicast data and simultaneously receive the same. In this case, the UE decodes all of specific data without prioritization. UEs reporting a specific UE capability may correspond thereto or UEs which do not report a UE capability related thereto (that is, default UE operation) may correspond thereto.

Embodiment 1: Broadcast PDSCH Scheduling

The HARQ processes are used for individual data transmission/reception and retransmission by the UE. In 5G NR, the UE can process data for each of a maximum of 16 HARQ processes. The HARQ processes may have separate different numbers. Different HARQ process numbers can physically or logically have different buffer spaces. Accordingly, a buffer corresponding to a first HARQ process number and a buffer corresponding to a second HARQ process number may be physically or logically different. The buffer may be a storage space of the receiving side. For each of specific HARQ process numbers, the UE may differently process the conventionally stored data in the corresponding HARQ process according to whether the scheduled data is for initial transmission or for retransmission.

When the scheduled data is for initial transmission, the UE may remove the conventionally stored data and store a value before demodulation/decoding of the initially transmitted data or a value after demodulation/decoding in the HARQ process buffer. When the scheduled data is for retransmission, the UE may perform HARQ combining on the data stored in the buffer and the retransmitted data and perform demodulation/decoding. Whether the scheduled data is for retransmission or initial transmission is determined through toggling of an NDI value included in scheduled control information. Specifically, the NDI value includes one bit and, the UE determines that the data indicated by the corresponding scheduled DCI is for retransmission when the NDI value is not changed (for example, from 0 to 0 or from 1 to 1) and that the data indicated by the corresponding scheduled DCI is for initial transmission when the NDI value is changed (for example, from 0 to 1 or from 1 to 0).

Figure 6:
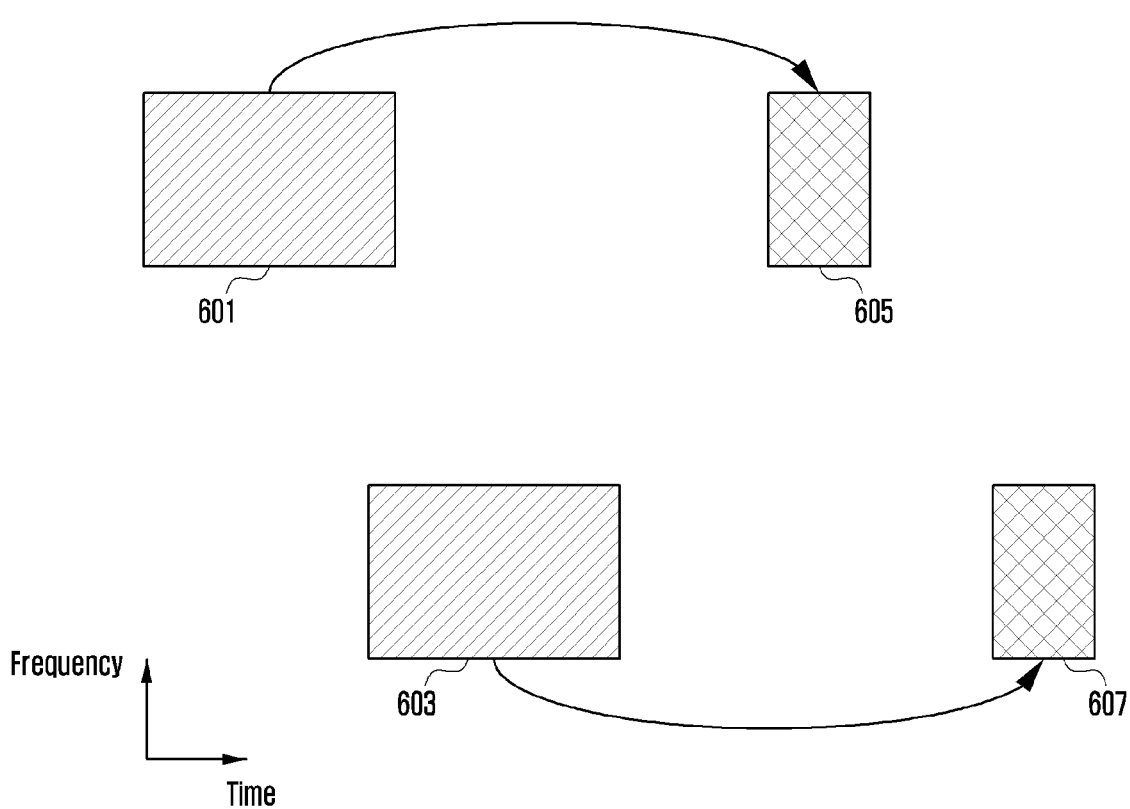
FIG. 6 illustrates a process of transmitting and receiving control information and data according to an embodiment of the present disclosure.
Figure 7:
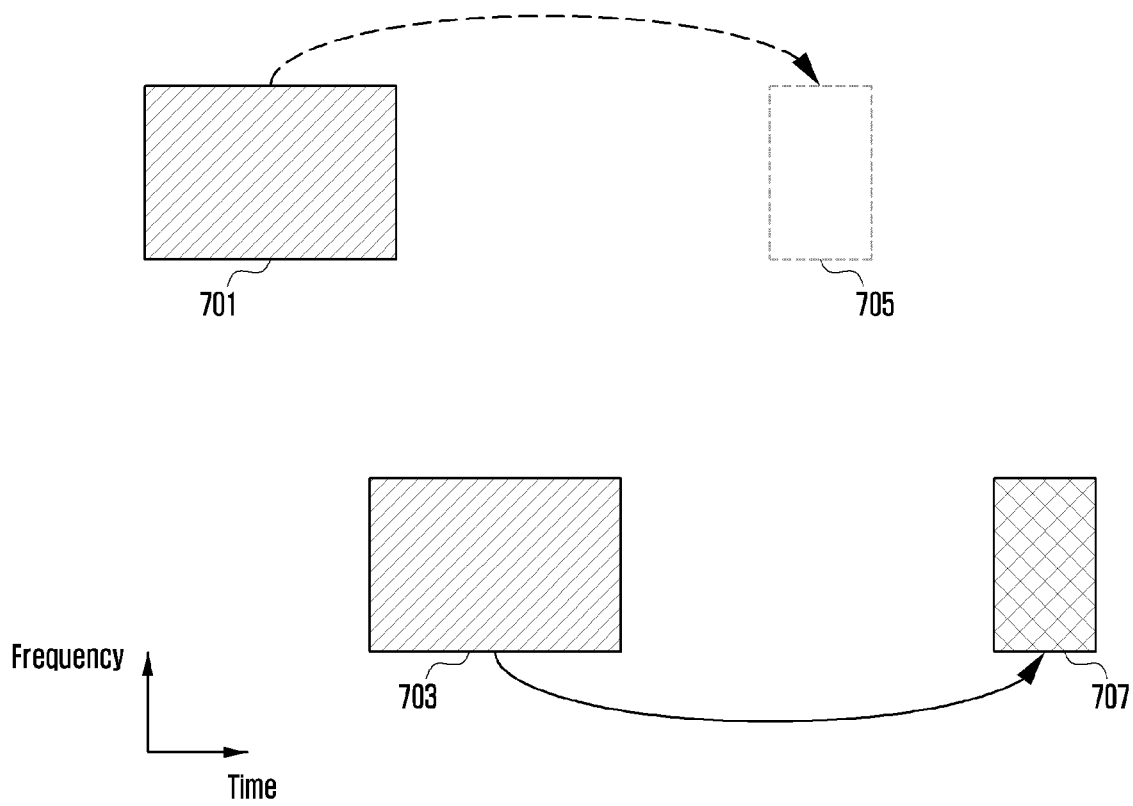
FIG. 7 illustrates a process of transmitting and receiving control information and data according to an embodiment of the present disclosure.

FIG. 6 illustrates a process of transmitting and receiving control information and data according to an embodiment of the present disclosure, and FIG. 7 illustrates a process of transmitting and receiving control information and data according to an embodiment of the disclosure.

Specifically, FIG. 6 illustrates a process in which the UE generally receives PDSCHs 601 and 603 and transmits PUCCHs or PUSCHs 605 and 607 including HARQ-ACK information therefor. When 601 and 603 have different HARQ process numbers, the UE may separately store 601 and 603 in HARQ process buffers and process the same in parallel. However, when 601 and 603 have the same HARQ process number, the UE may be influenced during a process of processing reception of the conventional data. Specifically, the UE may sequentially perform process steps designed in a series of pipelines in order to receive the PDSCH 601 and report HARQ information as indicated by reference numeral 605 and, when the PDSCH 603 having the same HARQ process number is scheduled before transmission 605 of the HARQ-ACK information, may have to stop the corresponding process designed in pipelining in the middle.

Accordingly, the UE may have to change the reception operation in consideration thereof, and thus UE implementation complexity may increase. Accordingly, in 5G NR, the BS may not perform scheduling such that the PDSCH having the first HARQ process number is transmitted and received before the PUCCH or PDSCH 605 including HARQ information for the PDSCH 601 scheduled with the first HARQ process number is transmitted. When scheduling is performed such that the PDSCH having the first HARQ process number is transmitted and received before the PUCCH or PUSCH 605 including HARQ information for the PDSCH 601 scheduled with the first HARQ process number is transmitted, the UE may consider it as an error case, drop at least one of the PDSCH 601 or the PDSCH 603 the UE operation therefor, and also drop HARQ-ACK transmission therefor or process all thereof. Alternatively, the BS may perform scheduling such that the PDSCH having the first HARQ process number is transmitted and received after the PUCCH or PUSCH 605 including HARQ information for the PDSCH 601 scheduled with the first HARQ process number is transmitted.

When the PDSCH 701 is unidirectionally transmitted data (for example, broadcast or multicast data) without HARQ-ACK transmission information 705, the BS may have difficulty in determining till when the UE can demodulate/decode the corresponding PDSCH. Whether to transmit HARQ-ACK for the PDSCH may be determined by a higher signal or an L1 signal, and examples of the L1 signal may have the type of a DCI format, a DCI field, a DCI search area, or an RNTI. Accordingly, in the case of the PDSCH 701 having no HARQ-ACK transmission, since there is no HARQ-ACK transmission time point, it is required to define a time point at which the PDSCH 703 having the same HARQ process number as the corresponding PDSCH 701 is transmitted and received on the basis of the last symbol in which the PDSCH 701 is transmitted and received. For example, the BS may schedule transmission (or retransmission) of the second PDSCH 703 having the first HARQ process number after N symbols from the last symbol of the first PDSCH 701 including no HARQ-ACK information having the same HARQ process number.

Alternatively, when receiving the first PDSCH 701 including no HARQ-ACK information having the first HARQ process number, the UE may not expect reception of scheduling of initial transmission or retransmission of the second PDSCH 703 having the same HARQ process number before N symbols from the last symbol of the corresponding PDSCH and, when such scheduling is generated, consider it as an error case. N may have different values according to subcarrier spacing, and for example, N=12 when subcarrier spacing is 15 kHz, N=13 when subcarrier spacing is 30 kHz, N=20 when subcarrier spacing is 60 kHz, and N=24 when subcarrier spacing is 120 kHz. Alternatively, when scheduling is performed in advance such that the PDSCH 701 including no HARQ-ACK information having the first HARQ process number is repeatedly transmitted, the PDSCH may be successively transmitted and received regardless of N. In the above example, HARQ-ACK transmission 707 for the second PDSCH 703 may or may not exist.

Figure 8:
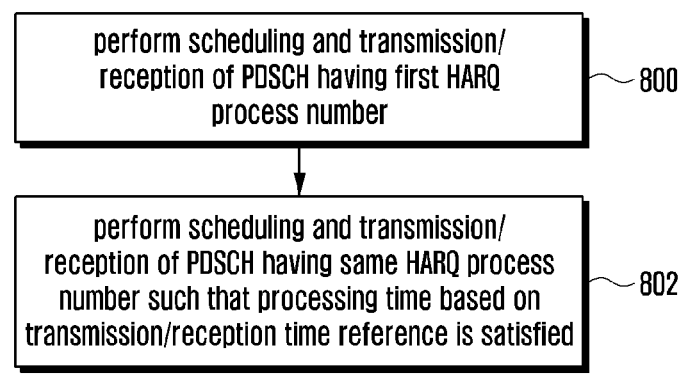
FIG. 8 is a block diagram illustrating a data scheduling condition of the BS according to an embodiment of the present disclosure.

FIG. 8 is a block diagram illustrating a data scheduling condition of the BS according to an embodiment of the present disclosure. Specifically, FIG. 8 is a block diagram illustrating a BS operation according to the method described with reference to FIGS. 6 to 7. The BS may perform scheduling and transmission/reception on a first PDSCH having a first HARQ process number in operation 800. Thereafter, when a second PDSCH having the same HARQ process number is scheduled as retransmission or initial transmission, the BS may identify whether there is HARQ-ACK information transmission for the first PDSCH scheduled in operation 800. When there is HARQ-ACK information transmission for the first PDSCH, the UE may make scheduling of the second PDSCH performed after at least the HARQ-ACK information transmission or make transmission/reception of the second PDSCH performed after at least the HARQ-ACK information transmission. When there is no HARQ-ACK information transmission for the first PDSCH, the UE make scheduling of the second PDSCH performed after N symbols from at least the last symbol of the first PDSCH or make transmission/reception of the second PDSCH performed after N symbols from at least the last symbol of the first PDSCH in operation 802.

Embodiment 2: UCI Multiplexing in NACK-Only Feedback

When the PDSCH is transmitted to one or more UEs through multicast or broadcast (multicast broadcast service (MBS)) and HARQ-ACK feedback is introduced, it is possible to support a more reliable MBS. However, as the number of UEs receiving the MBS service increases, HARQ-ACK feedback overhead may increase in proportion to the number of UEs, which may reduce resource efficiency of the BS. Accordingly, when the PDSCH including the MBS is scheduled, a second HARQ-ACK information report scheme of transmitting only NACK information without transmitting ACK information may be used rather than a first HARQ-ACK information report scheme of reporting ACK or NACK information. According to the second HARQ-ACK information report scheme, the UE may transmit NACK through the corresponding resources in the case of NACK and may not perform transmission in the case of ACK according to a demodulation/decoding result of the scheduled PDSCH. Further, since ACK resources used in the first HARQ-ACK information report scheme (that is, frequency, time, or code resources) can be used as NACK report resources of another UE in the second HARQ-ACK information report scheme, more UEs can report HARQ-ACK information for the MBS in the given resources.

Figure 9:
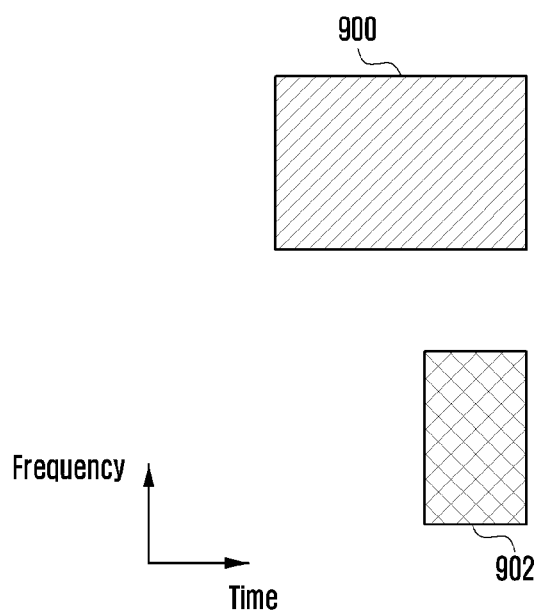
FIG. 9 illustrates a situation in which an NACK-only PUCCH overlaps other uplink channels according to an embodiment of the present disclosure.

FIG. 9 illustrates a situation in which an NACK-only PUCCH overlaps other uplink channels according to an embodiment of the present disclosure.

The second HARQ-ACK information report is basically transmitted through the PUCCH (hereinafter, referred to as a PUCCH or NACK-only PUCCH including second HARQ-ACK information), and it is required to define UE and BS operations in the case in which the corresponding PUCCH 902 overlaps or does not overlap at least one PUCCH or PUSCH 900 in time (or frequency) resources.

Case 1: NACK-Only PUCCH

Determination of whether HARQ-ACK information transmitted by the UE corresponds to the first HARQ-ACK information report scheme or the second HARQ-ACK information report scheme may be indicated by a higher signal or an L1 signal, and an example of the L1 signal may be a DCI format, a DCI field, a DCI search area, or an RNTI. When the UE receives scheduling indicated by the second HARQ-ACK information report (that is, NACK-only), the UE may insert information indicating NACK into the corresponding scheduled PUCCH and transmit PUCCH NACK is generated (or determined) according to a PDSCH demodulation/decoding result and may not transmit the scheduled PUCCH when ACK is generated (or determined).

Case 2: NACK-Only PUCCH Overlaps PUSCH

In Case 1, the UE considers the case in which the NACK-only PUCCH overlaps another PUSCH. At this time, when NACK is generated (or determined) as the demodulation/decoding result of the PDSCH corresponding to the NACK-only PUCCH, at least one of the following operations may be performed.

Case 2-1: multiplexes NACK information to PUSCHs and transmits the PUSCHs.

Case 2-2: transmits PUSCHs without multiplexing to the PUSCHs even though NACK information is generated.

On the other hand, when ACK is generated (or determined), the UE may perform at least one of the following operations.

Case 2-3: multiplexes ACK information to PUSCHs and transmits the PUSCHs.

Case 2-4: transmits PUSCHs without multiplexing to the PUSCHs even though ACK information is generated.

Case 3: NACK-Only PUCCH Overlaps PUSCH in UL Skipping

In Case 2, the case in which UL skipping is configured is considered. For reference, the UL skipping operation means no PUSCH transmission by the UE when there is data to be transmitted in a UE buffer. However, when the PUCCH including the first HARQ information report or CSI information overlaps the PUSCH, the UE may basically multiplex the first HARQ information report or CSI information to PUSCHs to perform transmission even though there is no data to be transmitted in the PUSCH. The following description may be applied only to the case in which the second HARQ information report overlaps the PUSCH in UL skipping. When NACK is generated (or determined) as the demodulation/decoding result of the PDSCH corresponding to the NACK-only PUCCH, at least one of the following operations may be performed.

Case 3-1: multiplexes NACK information to PUSCHs and transmits the PUSCHs.

Case 3-2: transmits the NACK-only PUCCH without multiplexing NACK information to PUSCHs.

On the other hand, when ACK is generated (or determined), the UE may perform at least one of the following operations.

Case 3-3: multiplexes ACK information to PUSCHs and transmits the PUSCHs.

Case 3-4: does not multiplex ACK information to PUSCHs and does not transmit all of the NACK-only PUCCH and the PUSCH.

Case 4: NACK-Only PUCCH Overlaps PUCCH Including SR or CSI Information

In Case 1, the UE considers the case in which the NACK-only PUCCH overlaps another PUCCH including SR or CSI information. When NACK is generated (or determined) as the demodulation/decoding result of the PDSCH corresponding to the NACK-only PUCCH, the UE may perform at least one of the following operations. Hereinafter, the description of the PUCCH including SR information may be equally applied to the PUCCH including CSI information.

Case 4-1: NACK information is transmitted through multiplexing with the PUCCH including SR or CSI information, and the NACK-only PUCCH is not transmitted.

Case 4-2: when the NACK-only PUCCH is PUCCH format 0 and the PUCCH including SR information (hereinafter, referred to as an SR PUCCH) is PUCCH format 0 or PUCCH format 1, the UE multiplexes NACK information with PUCCH format 0 or PUCCH format 1 corresponding to the SR PUCCH to transmit the same and does not transmit PUCCH format 0 corresponding to the NACK-only PUCCH.

Case 4-3: when the NACK-only PUCCH is PUCCH format 1 and the PUCCH including SR information is PUCCH format 0, the UE transmits PUCCH format 1 corresponding to the NACK-only PUCCH and does not transmit (or drops) PUCCH format 0 corresponding to the SR PUCCH. That is, multiplexing of the SR and the NACK information is not performed.

Case 4-4: when the NACK-only PUCCH is PUCCH format 1 and the PUCCH including SR information is PUCCH format 1, the UE multiplexes the NAC information with PUCCH format 1 corresponding to the SR PUCCH and transmits the same regardless of whether the SR information is positive or negative and does not transmit PUCCH format 1 corresponding to the NACK-only PUCCH.

Case 4-5: when the NACK-only PUCCH is PUCCH format 1 and the PUCCH including SR information is PUCCH format 1, the UE transmits PUCCH format 1 corresponding to the NACK-only PUCCH and does not transmit (or drops) PUCCH format 1 corresponding to the SR PUCCH. That is, multiplexing of the SR and the NACK information is not performed.

Case 4-6: when the NACK-only PUCCH is PUCCH format 2, format 3, or format 4 and the PUCCH including SR information is PUCCH format 0 or 1, the UE transmits only the NACK-only PUCCH and does not transmit (or drops) the SR PUCCH. That is, the UE does not perform multiplexing of the SR and NACK information.

On the other hand, when ACK is generated (or determined), the UE can perform at least one of the following operations.

Case 4-7: the UE multiplexes ACK information with the PUCCH including SR or CSI information and transmits the same, and does not transmit the NACK-only PUCCH.

Case 4-8: when the NACK-only PUCCH is PUCCH format 0 and the PUCCH including SR information (hereinafter, referred to as the SR PUCCH) is PUCCH format 0 or PUCCH format 1, the UE multiplexes the ACK information with PUCCH format 0 or PUCCH format 1 corresponding to the SR PUCCH and transmits the same, and does not transmit PUCCH format 0 corresponding to the NACK-only PUCCH.

Case 4-9: When the NACK-only PUCCH is PUCCH format 0 and the PUCCH including SR information (hereinafter, referred to as the SR PUCCH) is PUCCH format 0 or PUCCH format 1, the UE inserts only the SR information into PUCCH format 0 or PUCCH format 1 corresponding to the SR PUCCH and transmits the same, and does not transmit PUCCH format 0 corresponding to the NACK-only PUCCH. That is, multiplexing of the SR and the ACK information is not performed, and the ACK information is dropped.

Case 4-10: when the NACK-only PUCCH is PUCCH format 1 and the PUCCH including SR information is PUCCH format 0, the UE inserts only the SR information into PUCCH format 0 corresponding to the SR PUCCH and transmits the same, and does not transmit PUCCH format 1 corresponding to the NACK-only PUCCH. That is, the UE drops ACK information without multiplexing of the SR and ACK information.

Case 4-11: when the NACK-only PUCCH is PUCCH format 1 and the PUCCH including SR information is PUCCH format 1, the UE multiplexes ACK information with PUCCH format 1 corresponding to the SR PUCCH and transmits the same regardless of whether the SR information is positive or negative and does not transmit PUCCH format 1 corresponding to the NACK-only PUCCH.

Case 4-12: when the NACK-only PUCCH is PUCCH format 1 and the PUCCH including SR information is PUCCH format 1, the UE inserts only SR information into PUCCH format 1 corresponding to the SR PUCCH and transmits the same and does not transmit PUCCH format 1 corresponding to the NACK-only PUCCH. That is, the UE drops ACK information without multiplexing of the SR and ACK information.

Case 5: NACK-Only PUCCH Overlaps PUCCH Including First HARQ-ACK Information

In Case 1, the UE considers the case in which the NACK-only PUCCH overlaps a PUCCH including first HARQ-ACK information. When NACK is generated (or determined) as the demodulation/decoding result of the PDSCH corresponding to the NACK-only PUCCH, the UE may perform at least one of the following operations.

Case 5-1: when a first HARQ-ACK information report is configured as a Type 1 HARQ-ACK codebook, the UE maps the NACK information to an HARQ-ACK codebook associated with the location at which the PDSCH is transmitted and received, and then transmits the PUCCH including the first HARQ-ACK information and does not transmit the NACK-only PUCCH.

Case 5-2: when the first HARQ-ACK information report is configured as a Type 2 HARQ-ACK codebook, the UE appends the NACK information after the first HARQ-ACK information, and then transmits the PUCCH including the first HARQ-ACK information and does not transmit the NACK-only PUCCH. When there is HARQ-ACK for an SPS PDSCH, the NACK information is appended after HARQ-ACK for the SPS PDSCH.

On the other hand, when ACK is generated (or determined), the UE can perform at least one of the following operations.

Case 5-3: when the first HARQ-ACK information report is configured as the Type 1 HARQ-ACK codebook, the UE maps the ACK information to the HARQ-ACK codebook associated with the location at which the PDSCH is transmitted and received, and then transmits the PUCCH including the first HARQ-ACK information and does transmit the NACK-only PUCCH.

Case 5-4: when the first HARQ-ACK information report is configured as the Type 2 HARQ-ACK codebook, the UE appends the ACK information after the first HARQ-ACK information, and then transmits the PUCCH including the first HARQ-ACK information and does not transmit the NACK-only PUCCH. When there is HARQ-ACK for the SPS PDSCH, the ACK information is appended after the HARQ-ACK for the SPS PDSCH.

Case 5-5: when the first HARQ-ACK information report is configured as the Type 2 HARQ-ACK codebook, the UE drops the ACK information without inserting the ACK information into the HARQ-ACK codebook. That is, the UE transmits only the first HARQ-ACK information to the corresponding PUCCH and does not transmit the NACK-only PUCCH.

Case 6: NACK-Only PUCCH Overlaps Another NACK-Only PUCCH

For two different MBSs, NACK-only PUCCHs for scheduled PDSCHs in the UE may overlap in terms of time resources. At this time, the UE may determine priority information of the PDSCH associated with the NACK-only PUCCH through a higher signal or an L1 signal (for example, a DCI format, a DCI field, a DCI search area, or an RNTI). Priorities of different NACK-only PUCCHs may be determined according to priorities of PDSCHs associated with the respective NACK-only PUCCHs. At this time, the UE can perform at least one of the following operations.

Case 6-1: when a first NACK-only PUCCH has a higher priority than a second NACK-only PUCCH and NACK is generated (or determined) as the demodulation/decoding result of a PDSCH corresponding to the first NACK-only PUCCH by the UE, the UE transmits the first NACK-only PUCCH and does not transmit the second NACK-only PUCCH regardless of the demodulation/decoding result of a PDSCH corresponding thereto.

Case 6-2: when the first NACK-only PUCCH has a higher priority than the second NACK-only PUCCH and ACK is generated (or determined) as the demodulation/decoding result of a PDSCH corresponding to the first NACK-only PUCCH by the UE, the UE does not transmit the first NACK-only PUCCH. When NACK is generated (or determined) as the demodulation/decoding result of the PDSCH corresponding to the second NACK-only PUCCH by the UE, the UE transmits the second NACK-only PUCCH.

Case 6-3: when the first NACK-only PUCCH has a higher priority than the second NACK-only PUCCH and ACK is generated (or determined) as the demodulation/decoding result of the PDSCH corresponding to the first NACK-only PUCCH by the UE, the UE does not transmit the first NACK-only PUCCH. When ACK is generated (or determined) as the demodulation/decoding result of the PDSCH corresponding to the second NACK-only PUCCH by the UE, the UE does not transmit the second NACK-only PUCCH.

Case 6-4: when the first NACK-only PUCCH has a higher priority than the second NACK-only PUCCH and ACK is generated (or determined) as the demodulation/decoding result of the PDSCH corresponding to the first NACK-only PUCCH by the UE, the UE does not transmit the first NACK-only PUCCH. When NACK is generated (or determined) as the demodulation/decoding result of the PDSCH corresponding to the second NACK-only PUCCH by the UE, the UE does not transmit the second NACK-only PUCCH.

Case 6-5: when priorities of the first NACK-only PUCCH and the second NACK-only PUCCH are the same and ACK is generated (or determined) as all of the PDSCH demodulation/decoding results, the UE does not transmit all of the two NACK-only PUCCHs. When priorities of the first NACK-only PUCCH and the second NACK-only PUCCH are the same and NACK is generated (or determined) as one PDSCH demodulation/decoding result, and ACK is generated (or determined) as the other one PDSCH demodulation/decoding result, the UE transmits the NACK-only PUCCH for which NACK is generated and does not transmits the NACK-only PUCCH for which ACK is generated. When priorities of the first NACK-only PUCCH and the second NACK-only PUCCH are the same and NACK is generated (or determined) as all of the PDSCH demodulation/decoding results, the UE transmits only one of the first NACK-only PUCCH or the second NACK-only PUCCH. A method of selecting on NACK-only PUCCH may include a method of randomly selecting one by the UE, selecting a PUCCH having an earlier start symbol among the two PUCCHs, or prioritizing a short PUCCH format than a long PUCCH format.

Case 7: NACK-Only PUCCH Overlaps Another PUCCH and PUSCH

In this case, the UE can operate according to a least one of or a combination of some of cases 2 to 5. For example, when the demodulation/decoding result of the PDSCH corresponding to the NACK-only PUCCH is NACK and another PUCCH includes CSI information, the UE multiplexes and transmits the NACK information and CSI information to PUSCHs (further, transmission of the NACK-only PUCCH and another PUCCH is not performed).

Case 8: NACK-Only PUCCH Overlaps SRS

In Case 1, the UE considers the case in which the NACK-only PUCCH overlaps the SRS. When NACK is generated (or determined) as the demodulation/decoding result of the PDSCH corresponding to the NACK-only PUCCH, the UE can perform at least one of the following operations.

Case 8-1: the UE transmits the NACK-only PUCCH and does not transmit only the SRS overlapping the NACK-only PUCCH in terms of time resources. That is, the UE can transmit the SRS which does not overlap the NACK-only PUCCH in terms of time resources.

On the other hand, when ACK is generated (or determined), the UE may perform at least one operation among the following operations.

Case 8-2: the UE does not transmit the NACK-only PUCCH and only the SRS overlapping the NACK-only PUCCH in terms of time resources. That is, the UE can transmit the SRS which does not overlap the NACK-only PUCCH in terms of time resources.

Case 8-3: the UE does not transmit the NACK-only PUCCH and transmits the SRS.

Case 9: NACK-Only PUCCH Overlaps PRACH

In case 1, when the NACK-only PUCCH overlaps the PRACH or even though they do not overlap, if the NACK-only PUCCH and the PRACH exist in the same slot or symbol difference between the NACK-only PUCCH and the PRACH is equal to or smaller than a predetermined value (K), the UE can transmit the PRACH and is able to not transmit the NACK-only PUCCH regardless of the ACK or NACK result.

Case 10: NACK-Only PUCCH Having High Priority Overlaps PUSCH, PUCCH, or SRS Having Low Priority In case 1, the UE considers the case in which the NACK-only PUCCH is indicated (or configured) as a high priority and another overlapping PUSCH, PUCCH, or SRS is indicated (or configured) as a low priority. When NACK is generated (or determined) as the demodulation/decoding result of the PDSCH corresponding to the NACK-only PUCCH, the UE can perform at least one of the following operations.

Case 10-1: the UE transmits the NACK-only PUCCH and does not transmit only the SRS overlapping the NACK-only PUCCH in terms of time resources. That is, the UE can transmit the SRS which does not overlap the NACK-only PUCCH in terms of time resources.

Case 10-2: the UE transmits the NACK-only PUCCH but does not transmit the PUCCH or PUSCH overlapping the NACK-only PUCCH. Specifically, the UE does not perform transmission from the first symbol of the PUCCH or PUSCH overlapping the NACK-only PUCCH.

On the other hand, when ACK is generated (or determined), the UE can perform at least one of the following operations.

Case 10-3: the UE does not transmit the NACK-only PUCCH and the SRS overlapping the NACK-only PUCCH in terms of time resources. That is, the UE can transmit the SRS which does not overlap the NACK-only PUCCH in terms of time resources.

Case 10-4: the UE does not transmit the NACK-only PUCCH and the PUCCH or PUSCH overlapping the NACK-only PUCCH. Specifically, the UE does not perform transmission from the first symbol of the PUCCH or PUSCH overlapping the NACK-only PUCCH.

Case 10-5: the UE does not transmit the NACK-only PUCCH but transmits the SRS (or PUCCH or PUSCH).

The UE can operate in at least one of or a combination of some of case 1 to case 10, and when there are a plurality of combinations, can manage one operation by a UE capability report or a BS higher signal configuration (or L1 signal indication). For example, the UE can operate in a combination of case 2-3 and case 3-4. That is, the UE may multiplex and transmit ACK information through the PUSCH when the UE has data to be transmitted through the PUSCH, but may not multiplex ACK information to the PUSCH and not transmit the PUSCH when there is not data to be transmitted. At this time, the UE assumes that the NACK-only PUCCH is not transmitted. Alternatively, the UE can operate in a combination of case 8-1 and case 8-3. That is, overlapping SRS symbols are not transmitted in the case of NACK, but the SRS symbols may be transmitted in the case of ACK.

Alternatively, the UE can operate in a combination of case 8-2 and case 8-3. Even though the same ACK is generated (or determined), the UE can perform different operations according to a predetermined threshold value of difference between the corresponding SRS transmission resources and PDSCH transmission resources for generating (or determining) ACK. This is because determination of whether the SRS is transmitted according to ACK/NACK information determination may be burden to the UE in terms of a processing time. When difference between the last symbol of the PDSCH and the first symbol of the SRS is larger than a predetermined threshold value, a time for preparing SRS transmission may be sufficient. Accordingly, at this time, the UE can perform SRS transmission. On the other hand, when difference between the last symbol of the PDSCH and the first symbol of the SRS is smaller than a predetermined threshold value, a time for preparing SRS transmission by the UE may lack. Accordingly, the UE is able to not perform SRS transmission for overlapping symbols even though ACK is generated (or determined). The threshold value may be fixed to one value or may be a value determined by a higher signal (or UE capability report).

When time difference between the PDSCH and the SRS is considered, the combination of cases 8-2 and 8-3 may be equally applied to a combination of at least some of cases 10-3 to 10-5. For example, even though the same ACK is generated (or determined), the UE can perform different operations according to a predetermined threshold value of difference between PUSCH (or PUCCH) transmission resources having the corresponding low priority and PDSCH transmission resources for generating (or determining) ACK. This is because determination of whether the PUSCH (or PUCCH) is transmitted according to ACK/NACK information determination may be burden to the UE in terms of a processing time. Accordingly, when difference between the last symbol of the PDSCH and the first symbol of the PUSCH (or PUCCH) is larger than a predetermined threshold value, a time for preparing PUSCH (or PUCCH) transmission may be sufficient. Therefore, at this time, the UE can perform PUSCH (or PUCCH) transmission. On the other hand, when difference between the last symbol of the PDSCH and the first symbol of the PUSCH (or PUCCH) is smaller than a predetermined threshold value, a time for preparing PUSCH (or PUCCH) transmission may lack. Accordingly, the UE may not perform PUSCH (or PUCCH) transmission from the first symbol overlapping the NACK-only PUCCH even though ACK is generated (or determined). The threshold value may be fixed to one value or may be a value determined by a higher signal (or UE capability report).

Figure 10:
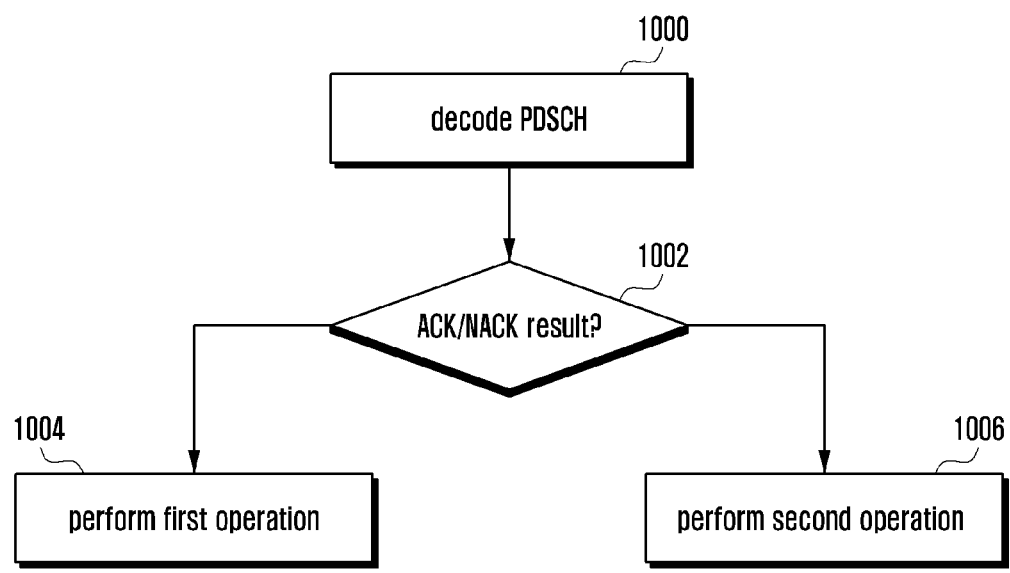
FIG. 10 is a flowchart illustrating an available UE operation in the case in which, when an NACK-only PUCCH is scheduled, the NACK-only PUCCH overlaps another PUCCH, a PUSCH, an SRS, or a PRACH according to an embodiment of the present disclosure.

FIG. 10 is a flowchart illustrating an available UE operation in the case in which, when an NACK-only PUCCH is scheduled, the NACK-only PUCCH overlaps another PUCCH, a PUSCH, an SRS, or a PRACH according to an embodiment of the disclosure. Thereafter, ACK or NACK is determined according to a decoding result in operation 1102. The UE performs a first operation in operation 1004 or a second operation in operation 1006 according to case 1 to case 10 described in the embodiments. At this time, the first operation and the second operation may be operations including at least one of or a combination of some of case 1 to case 10.

Embodiment 3: Transmission Power Control in Multi-Cell Environment

When different uplink channels are scheduled for each cell in the state in which a plurality of serving cells operate (for example, carrier aggregation) and a total sum of transmission power allocated to uplink channels scheduled at a specific time is larger than maximum transmission power supported by the UE, the UE can allocate transmission power according to a priority shown in [Table 26] below. The sum of transmission power is defined as a sum of linear values of UE transmission power for PUSCHs, PUCCHs, PRACHs, or SRSs in one symbol of one slot. When determining the total sum of transmission power in a specific symbol i, the UE does not include transmission power information transmitted and received after the symbol i. Maximum transmission power of the UE may have a different value according to whether the UE transmits CA.

TABLE 26

Figure 11:
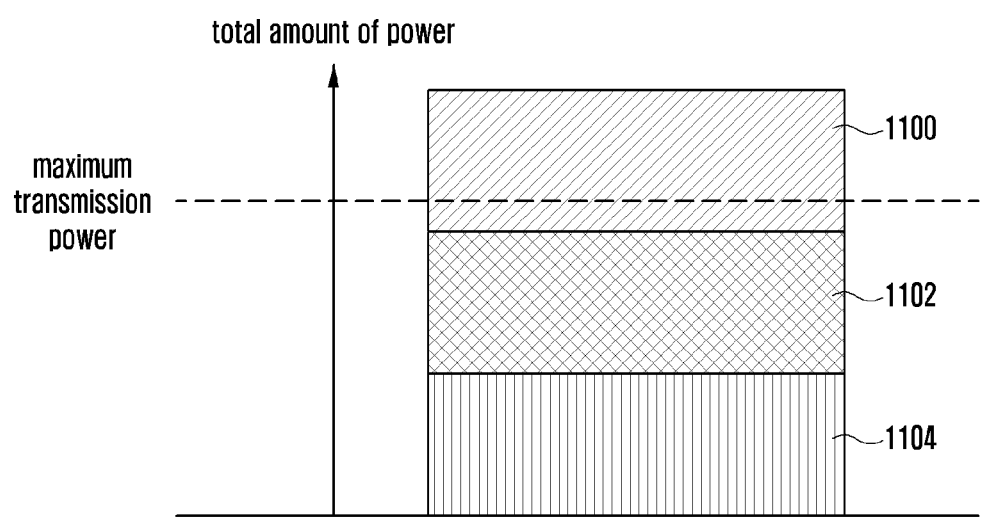
FIG. 11 illustrates a situation in which an uplink transmission channel is scheduled for each serving cell according to an embodiment of the present disclosure.

PRACH transmission on the PCell
PUCCH or PUSCH transmissions with higher priority index according to
Clause 9
For PUCCH or PUSCH transmissions with same priority index
PUCCH transmission with HARQ-ACK information, and/or SR, and/or LRR,
or PUSCH transmission with HARQ-ACK information
PUCCH transmission with CSI or PUSCH transmission with CSI
PUSCH transmission without HARQ-ACK information or CSI and, for Type-
2 random access procedure, PUSCH transmission on the PCell
SRS transmission, with aperiodic SRS having higher priority than semi-
persistent and/or periodic SRS, or PRACH transmission on a serving cell other than the
PCell FIG. 11 illustrates a situation in which an uplink transmission channel is scheduled for each serving cell according to an embodiment of the present disclosure.

Referring to FIG. 11, transmission power is allocated in the order of 1104, 1102, and 1100, and when 1104 is a PRACH of a Pcell, 1102 is a PUCCH including HARQ-ACK information, and 1100 is an SRS, the UE can drop SRS transmission or scale down transmission power to maximum transmission power of the UE and perform transmission. When the PUCCH is an NACK-only PUCCH, whether to actually transmit the NACK-only PUCCH may be transmitted according to ACK or NACK information state. In other words, the UE does not transmit 1102 in the case of ACK, and transmits 1102 in the case of NACK. In this case, 1100 may be dropped or transmitted without drop according to whether 1102 is transmitted or may be scaled down or not. Since whether to actually transmit the NACK-only PUCCH is determined according to an ACK or NACK state value after PDSCH demodulation/decoding rather than according to a higher signal or an L1 signal unlike another PUSCH or PUCCH, a processing time enough to control transmission power of the UE may not be secured.

Accordingly, it may be required to include the NACK-only PUCCH in calculations of transmission power when transmission power priority is determined according to [Table 26] above even though ACK is determined (or generated) and actual transmission power is not performed. However, other UEs are not subject thereto and may consider actually transmitted PUCCH transmission power as the NACK-only PUCCH calculated in [Table 26]. Accordingly, respective UEs may individually perform one of the operations for considering the actually transmitted NACK-only PUCCH (operation A) and always calculating NACK-only PUCCH transmission power regardless of actual transmission (operation B), which may be determined by a UE capability report. Alternatively, the UE can perform one of the two operations by a higher signal from the BS according to the UE capability report. In the case of operation B, the UE can prioritize transmission power according to [Table 27] below.

TABLE 27

PRACH transmission on the PCell
PUCCH or PUSCH transmissions with higher priority index according to
Clause 9
For PUCCH or PUSCH transmissions with same priority index
PUCCH transmission with HARQ-ACK information, and/or SR, and/or LRR,
or PUSCH transmission with HARQ-ACK information, PUCCH allocation with
HARQ-ACK information including only NACK, if UE capability is given.
PUCCH transmission with CSI or PUSCH transmission with CSI
PUSCH transmission without HARQ-ACK information or CSI and, for Type-
2 random access procedure, PUSCH transmission on the PCell
SRS transmission, with aperiodic SRS having higher priority than semi-
persistent and/or periodic SRS, or PRACH transmission on a serving cell other than the
PCell Further, a similar operation can be performed in a situation in which PUSCH skipping exists. As described above, PUSCH skipping is an operation in which no transmission is performed when the UE has no data to be actually transmitted. Specifically, when there is no data to be transmitted through corresponding resources even though the UE receives allocation of PUSCH transmission resources by a higher signal or an L1 signal, PUSCH transmission is not performed. Further, when there is no protocol data unit (PDU) generated from the MAC, the UE may consider that PUSCH transmission is not performed. In consideration thereof, for example, when 1104 is a PRACH of a Pcell, 1102 is a PUSCH, and 1104 is an SRS in FIG. 11, a method of allocating SRS transmission power may vary depending on whether the PUSCH is actually transmitted and received. Accordingly, like the NACK-only PUCCH, in the case of PUSCH skipping, it may be required to include PUSCH transmission power in the transmission power priority according to a specific UE capability even though the PUSCH is not actually transmitted. Thereafter, the transmission power priority may be determined in consideration of PUSCH skipping as shown in [Table 28] below.

TABLE 28

PRACH transmission on the PCell
PUCCH or PUSCH transmissions with higher priority index according to Clause
9, PUSCH allocation regardless of UL skipping if UE capability is given
For PUCCH or PUSCH transmissions with same priority index
PUCCH transmission with HARQ-ACK information, and/or SR, and/or
LRR, or PUSCH transmission with HARQ-ACK information,
PUCCH transmission with CSI or PUSCH transmission with CSI
PUSCH transmission without HARQ-ACK information or CSI and, for
Type-2 random access procedure, PUSCH transmission on the PCell. PUCCH
allocation with HARQ-ACK information including only NACK, if UE
capability is given.
SRS transmission, with aperiodic SRS having higher priority than semi-
persistent and/or periodic SRS, or PRACH transmission on a serving cell other than
the PCell In [Table 27] and [Table 28], transmission means the operation in which the UE actually transmits the corresponding channel, and allocation means the operation in which the UE receives allocation regardless of actual transmission of the corresponding channel. Accordingly, while transmission considers a transmission power value on the basis of actually transmitted channels, allocation considers a transmission power value calculated on the basis of scheduled information even though there is no actual transmission. The terms "allocation" and "transmission" are not limited thereto and may be replaced with other expressions having intent of the description.

Figure 12:
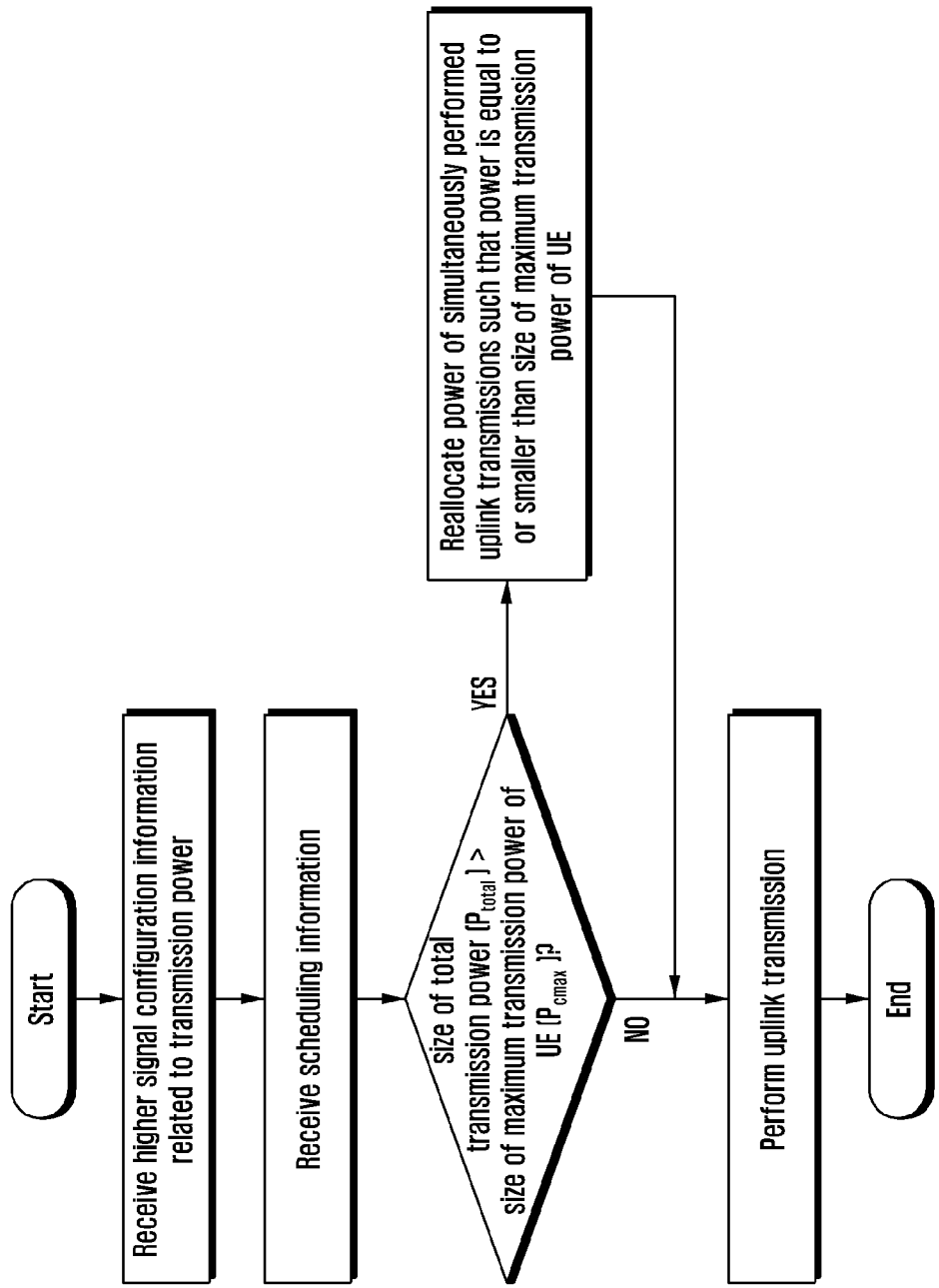
FIG. 12 is a block diagram illustrating a method of determining transmission power of the UE according to embodiments of the present disclosure.

FIG. 12 is a block diagram illustrating a method of determining transmission power of the UE according to the embodiments of the present disclosure. After receiving higher signal configuration information related to transmission power, the UE determines transmission resources to perform uplink transmission according to another higher signal or an L1 signal. Further, at a specific time point, the UE determines whether the size of transmission power of scheduled channels is larger than the size of maximum transmission power supported by the UE. When the size of transmission power is not larger than the size of maximum transmission power, the UE transmits scheduled uplink channels. On the other hand, when the size of transmission power is larger than the size of maximum transmission power, the UE sequentially allocates power uplink transmission according to priority to be equal to or smaller than the size of maximum transmission power according to at least one or some of [Equation 26] to [Equation 28].

Figure 13:
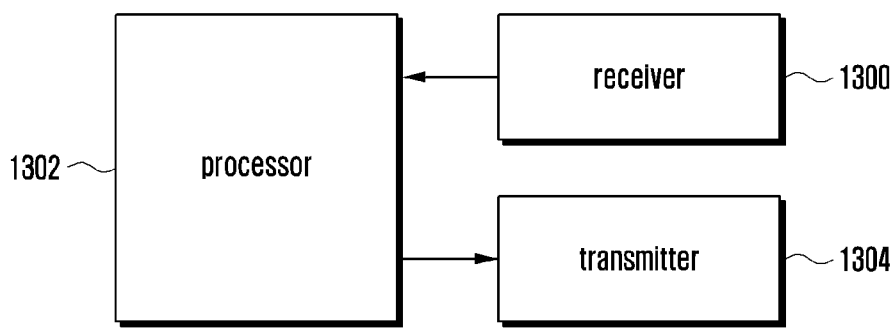
FIG. 13 is a block diagram schematically illustrating the internal structure of the UE according to embodiments of the present disclosure.

FIG. 13 is a block diagram schematically illustrating the internal structure of the UE according to embodiments of the present disclosure.

The UE may include a receiver 1300, a transmitter 1304, and a processor 1302. The receiver 1300 and the transmitter 1304 may be commonly called a transceiver in embodiments of the disclosure. The transceiver may transmit and receive a signal to and from the BS. The signal may include control information and data. To this end, the transceiver may include an RF transmitter for up-converting and amplifying a frequency of a transmitted signal and an RF receiver for low-amplifying a received signal and down-converting a frequency.

Subsequently, the internal structure of the BS according to embodiments of the disclosure is described with reference to FIG. 14.

Figure 14:
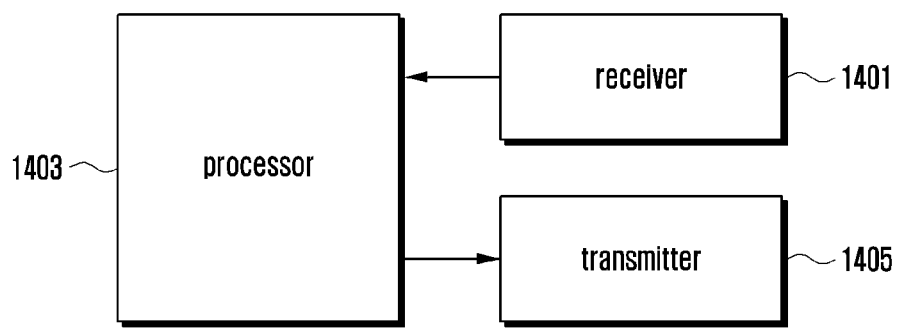
FIG. 14 is a block diagram schematically illustrating the internal structure of the BS according to embodiments of the present disclosure.

FIG. 14 is a block diagram schematically illustrating the internal structure of the BS according to embodiments of the present disclosure.

As illustrated in FIG. 14, the BS may include a receiver 1401, a transmitter 1405, and a processor 1403. The receiver 1401 and the transmitter 1405 may be commonly called a transceiver in embodiments of the disclosure. The transceiver may transmit and receive a signal to and from the UE. The signal may include control information and data. To this end, the transceiver may include an RF transmitter for up-converting and amplifying a frequency of a transmitted signal and an RF receiver for low-noise amplifying a received signal and down-converting a frequency. Further, the transceiver may receive a signal through a radio channel, output the signal to the processor 1403, and transmit the signal output from the processor 1403 through the radio channel. The BS processor 1403 may control a series of processes such that the BS can operate according to the embodiments of the disclosure.

An aspect of the disclosure is to provide a method and an apparatus for transmitting and receiving signals for groupcast and/or multicast in a wireless communication system.

Another aspect of the disclosure is to provide a method and an apparatus for transmitting/receiving HARQ feedback information for data for groupcast and/or multicast in a wireless communication system.

Another aspect of the disclosure is to provide a method and an apparatus for transmitting/receiving signals in consideration of the relation between data for groupcast and/or multicast and data for unicast and/or broadcast in a wireless communication system.

Another aspect of the disclosure is to provide a method and an apparatus for processing data of an RRC_connected UE and transmitting/receiving HARQ feedback information when data for groupcast and/or multicast and data for unicast and/or broadcast are received together in a wireless communication system.

Another aspect of the disclosure is to provide a method and an apparatus for receiving data for groupcast and/or multicast according to a capability of the RRC_connected UE by the RRC_connected UE receiving the data for groupcast and/or multicast in a wireless communication system.

A method of a transmission device in a wireless communication system provided in various embodiments of the disclosure includes: a process of generating information indicating whether hybrid automatic repeat request (HARQ) feedback information for groupcast data is transmitted; a process of generating information related to a priority of processing of groupcast data, unicast data, and/or broadcast data; and a process of transmitting at least one piece of the information indicating whether the HARQ feedback information for the groupcast data is transmitted and the information related to the priority of processing of the groupcast data, the unicast data, and/or the broadcast data.

A method of a reception device in a wireless communication system provided in various embodiments of the disclosure includes: a process of receiving a signal from a transmission device; and a process of identifying, from the signal, at least one piece of information indicating whether hybrid automatic repeat request (HARQ) feedback information for groupcast data is transmitted and information related to a priority of processing of groupcast data, unicast data, and/or broadcast data.

A transmission device in a wireless communication system provided in various embodiments of the disclosure includes: a transceiver configured to transmit and receive signals; and a processor configured to generate information indicating whether hybrid automatic repeat request (HARQ) feedback information for groupcast data is transmitted, generate information related to a priority of processing of groupcast data, unicast data, and/or broadcast data, and transmit at least one piece of the information related to whether the HARQ feedback information for the groupcast data is transmitted and the information related to the priority of processing of the groupcast data, the unicast data, and/or the broadcast data.

A reception device in a wireless communication system provided in various embodiments of the disclosure includes: a transceiver configured to receive a signal from a transmission device; and a processor configured to identify, from the signal, at least one piece of information indicating whether hybrid automatic repeat request (HARQ) feedback information for groupcast data is transmitted and information related to a priority of processing of groupcast data, unicast data, and/or broadcast data.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, embodiments 1 and 2 may be applied in combination. In addition, other variants based on the technical idea of the embodiments of the disclosure may be implemented in LTE, 5G, and other systems.

Although the disclosure has been described with reference to exemplary embodiments, various modifications and changes may be provided to those skilled in the art. The disclosure is intended to include changes and modifications falling within the scope of the appended claims. In the detailed description of the disclosure, any specific element, process, or function shall not read as meaning an essential element that must be included in the scope of the claims. The scope of the subject matter to be patented is defined by the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A terminal in a communication system, the terminal comprising:
   a transceiver; and
   a controller operably coupled to the transceiver, the controller configured to:
      receive, from a base station, a physical downlink shared channel (PDSCH),
      identify hybrid automatic repeat request-acknowledgement (HARQ-ACK) information for the PDSCH;
      identify a HARQ-ACK reporting mode between a first HARQ-ACK reporting mode and a second HARQ-ACK reporting mode based on whether the HARQ-ACK information is multiplexed with a first physical uplink control channel (PUCCH) or a physical uplink shared channel (PUSCH); and
      transmit the HARQ-ACK information according to the first HARQ-ACK reporting mode in the first PUCCH or the PUSCH in case that the HARQ-ACK information is multiplexed with the first PUCCH or the PUSCH.

2. The terminal of claim 1, wherein the HARQ-ACK information with an ACK value or a negative ACK (NACK) value is transmitted based on the first HARQ-ACK reporting mode.

3. The terminal of claim 1, wherein the HARQ-ACK information with a negative ACK (NACK) value is transmitted based on the second HARQ-ACK reporting mode in a second PUCCH in case that the HARQ-ACK information is not multiplexed with the first PUCCH or the PUSCH.

4. The terminal of claim 1, wherein, the HARQ-ACK information with an ACK value is not transmitted based on the second HARQ-ACK reporting mode in a second PUCCH in case that the HARQ-ACK information is not multiplexed with the first PUCCH or the PUSCH.

5. The terminal of claim 1, wherein the PDSCH is associated with a group radio network temporary identifier (G-RNTI) defined for multicast broadcast service (MBS).

6. A method performed by a terminal in a communication system, the method comprising:
   receiving, from a base station, a physical downlink shared channel (PDSCH),
   identifying hybrid automatic repeat request-acknowledgement (HARQ-ACK) information for the PDSCH;
   identifying a HARQ-ACK reporting mode between a first HARQ-ACK reporting mode and a second HARQ-ACK reporting mode based on whether the HARQ-ACK information is multiplexed with a first physical uplink control channel (PUCCH) or a physical uplink shared channel (PUSCH); and
   transmitting the HARQ-ACK information according to the first HARQ-ACK reporting mode in the first PUCCH or the PUSCH in case that the HARQ-ACK information is multiplexed with the first PUCCH or the PUSCH.

7. The method of claim 6, wherein the HARQ-ACK information with an ACK value or a negative ACK (NACK) value is transmitted based on the first HARQ-ACK reporting mode.

8. The method of claim 6, wherein the HARQ-ACK information with negative ACK (NACK) value is transmitted based on the second HARQ-ACK reporting mode in a second PUCCH in case that the HARQ-ACK information is not multiplexed with the first PUCCH or the PUSCH.

9. The method of claim 6, wherein the HARQ-ACK information with an ACK value is not transmitted based on the second HARQ-ACK reporting mode in a second PUCCH in case that the HARQ-ACK information is not multiplexed with the first PUCCH or the PUSCH.

10. The method of claim 6, wherein the PDSCH is associated with a group radio network temporary identifier (G-RNTI) defined for multicast broadcast service (MBS).

11. A base station in a communication system, the base station comprising:
- a transceiver; and
- a controller operably coupled to the transceiver, the controller configured to:
  - transmit, to a terminal, a physical downlink shared channel (PDSCH), and
  - receive hybrid automatic repeat request-acknowledgement (HARQ-ACK) information for the PDSCH based on a first HARQ-ACK reporting mode or a second HARQ-ACK reporting mode,
- wherein the HARQ-ACK information is received based on the first HARQ-ACK reporting mode in a first physical uplink control channel (PUCCH) or a physical uplink shared channel (PUSCH) in case that the HARQ-ACK information is multiplexed with the first PUCCH or the PUSCH.

12. The base station of claim 11, wherein the HARQ-ACK information with an ACK value or a negative ACK (NACK) value is received based on the first HARQ-ACK reporting mode.

13. The base station of claim 11, wherein the HARQ-ACK information with a negative ACK (NACK) value is received according to the second HARQ-ACK reporting mode in a second PUCCH in case that the HARQ-ACK information is not multiplexed with the first PUCCH or the PUSCH.

14. The base station of claim 11, wherein, the HARQ-ACK information with an ACK value is not received according to the second HARQ-ACK reporting mode in a second PUCCH in case that the HARQ-ACK information is not multiplexed with the first PUCCH or the PUSCH.

15. The base station of claim 11, wherein the PDSCH is associated with a group radio network temporary identifier (G-RNTI) defined for multicast broadcast service (MBS).

16. A method performed by a base station in a communication system, the method comprising:
- transmitting, to a terminal, a physical downlink shared channel (PDSCH); and
- receiving hybrid automatic repeat request-acknowledgement (HARQ-ACK) information for the PDSCH based on a first HARQ-ACK reporting mode or a second HARQ-ACK reporting mode,
- wherein the HARQ-ACK information is received based on the first HARQ-ACK reporting mode in a first physical uplink control channel (PUCCH) or a physical uplink shared channel (PUSCH) in case that the HARQ-ACK information is multiplexed with the first PUCCH or the PUSCH.

17. The method of claim 16, wherein the HARQ-ACK information with an ACK value or a negative ACK (NACK) value is received based on the first HARQ-ACK reporting mode.

18. The method of claim 16, wherein the HARQ-ACK information with a negative ACK (NACK) value is received according to the second HARQ-ACK reporting mode in a second PUCCH in case that the HARQ-ACK information is not multiplexed with the first PUCCH or the PUSCH.

19. The method of claim 16, wherein, the HARQ-ACK information with an ACK value is not received according to the second HARQ-ACK reporting mode in a second PUCCH in case that the HARQ-ACK information is not multiplexed with the first PUCCH or the PUSCH.

20. The method of claim 16, wherein the PDSCH is associated with a group radio network temporary identifier (G-RNTI) defined for multicast broadcast service (MBS).

* * * * *